(12) United States Patent
Covelli et al.

(10) Patent No.: US 11,912,378 B2
(45) Date of Patent: Feb. 27, 2024

(54) VISUAL DISTRESS SIGNAL DEVICE

(71) Applicant: Sirius Signal, LLC, Encinitas, CA (US)

(72) Inventors: Anthony W. Covelli, La Costa, CA (US); Richard Harold Gunderson, Santee, CA (US)

(73) Assignee: SIRIUS SIGNAL, LLC

(*) Notice: Subject to any disclaimer, the term of this patent is extended or adjusted under 35 U.S.C. 154(b) by 0 days.

(21) Appl. No.: 17/586,929

(22) Filed: Jan. 28, 2022

(65) Prior Publication Data
US 2022/0194529 A1    Jun. 23, 2022

Related U.S. Application Data

(63) Continuation-in-part of application No. PCT/US2020/044471, filed on Jul. 31, 2020.

(60) Provisional application No. 62/881,471, filed on Aug. 1, 2019.

(51) Int. Cl.
| | |
|---|---|
| *B63B 45/04* | (2006.01) |
| *G08B 5/00* | (2006.01) |
| *G08B 5/38* | (2006.01) |
| *H04W 4/80* | (2018.01) |
| *H04W 4/90* | (2018.01) |

(52) U.S. Cl.
CPC .............. *B63B 45/04* (2013.01); *G08B 5/002* (2013.01); *G08B 5/38* (2013.01); *H04W 4/80* (2018.02); *H04W 4/90* (2018.02); *B63B 2201/08* (2013.01)

(58) Field of Classification Search
CPC ........ G08B 5/002; G08B 5/38; G08B 25/016; G08B 5/36; B63C 9/20
See application file for complete search history.

(56) References Cited

U.S. PATENT DOCUMENTS

| | | |
|---|---|---|
| 2,492,837 A | 12/1949 | Briggs |
| 4,077,076 A | 3/1978 | Masters |
| 4,099,282 A | 7/1978 | Townsend |
| 4,560,356 A | 12/1985 | Burr |
| 5,034,847 A | 7/1991 | Brain |
| 5,280,270 A | 1/1994 | Correa et al. |
| 5,594,433 A | 1/1997 | Terlep |
| 5,806,965 A | 9/1998 | Deese |

(Continued)

FOREIGN PATENT DOCUMENTS

| | | |
|---|---|---|
| CA | 2313469 | 6/1999 |
| CN | 104902621 A | 9/2015 |

(Continued)

*Primary Examiner* — Hongmin Fan
(74) *Attorney, Agent, or Firm* — The Belles Group, P.C.

(57) ABSTRACT

A visual distress signal device that generates and emits bright light and/or infrared light to alert bystanders during times of distress. The device may be particularly suited for use on boats. The device may comprise a heat sink assembly that includes a screw-on collar that is attached to a housing of the device, such that the screw-on collar dissipates heat generated by electromagnetic radiation emitting elements away from an interior of the housing. The device may be configured for activation by a mobile phone or other mobile device which may be connected to the device via wireless communication. Furthermore, the mobile device may comprise a software application that can be used to alert persons in a contact list regarding the user's location and emergency status.

15 Claims, 51 Drawing Sheets

(56) References Cited

U.S. PATENT DOCUMENTS

| | | |
|---|---|---|
| 6,007,219 A | 12/1999 | O'Meara |
| 6,163,247 A | 12/2000 | O'Meara |
| 6,168,288 B1 | 1/2001 | St. Claire |
| 6,280,057 B1 | 8/2001 | O'Meara |
| 6,295,007 B1 | 9/2001 | O'Meara |
| 6,483,254 B2 | 11/2002 | Vo et al. |
| 6,549,121 B2 | 4/2003 | Povey et al. |
| 6,598,998 B2 | 7/2003 | West et al. |
| 6,607,286 B2 | 8/2003 | West et al. |
| 6,679,621 B2 | 1/2004 | West et al. |
| 6,688,755 B2 | 2/2004 | O'Meara |
| 6,805,467 B2 | 10/2004 | Wolf |
| 7,153,002 B2 | 12/2006 | Kim |
| 7,182,479 B1 | 2/2007 | Flood |
| 7,320,631 B1 | 1/2008 | Distefano et al. |
| 7,703,950 B2 | 4/2010 | Ewert et al. |
| 7,950,820 B2 | 5/2011 | Spartano |
| 7,988,336 B1 | 8/2011 | Harbers et al. |
| 8,072,345 B2 | 12/2011 | Gallo |
| 8,220,950 B1 | 7/2012 | Sunshine |
| 8,646,938 B1 | 2/2014 | Sunshine |
| 8,702,256 B2 | 4/2014 | Alkjaer |
| 8,727,581 B2 | 5/2014 | Saccomanno |
| 8,917,187 B2 | 12/2014 | Matte |
| 9,255,675 B1 | 2/2016 | Salzinger et al. |
| D826,762 S | 8/2018 | Smith |
| D845,809 S | 4/2019 | Knapp |
| 10,753,578 B2 | 8/2020 | Ang |
| 2003/0132852 A1 | 7/2003 | Povey et al. |
| 2004/0012962 A1 | 1/2004 | Wolf |
| 2005/0225971 A1 | 10/2005 | Melnik |
| 2005/0237740 A1 | 10/2005 | Watanabe et al. |
| 2006/0232962 A1 | 10/2006 | Altman |
| 2007/0164875 A1 | 7/2007 | Fredericks et al. |
| 2007/0241887 A1 | 10/2007 | Bertagna et al. |
| 2008/0247161 A1 | 10/2008 | Hulsey et al. |
| 2010/0026571 A1 | 2/2010 | Batty |
| 2011/0075409 A1 | 3/2011 | Zheng |
| 2011/0089696 A1 | 4/2011 | Davis et al. |
| 2011/0122609 A1 | 5/2011 | Dahlin |
| 2015/0300581 A1 | 10/2015 | Huang |
| 2017/0219188 A1* | 8/2017 | Veloskey ............... F21V 29/70 |
| 2018/0224111 A1* | 8/2018 | Emerson ............... F21V 29/67 |
| 2019/0161149 A1 | 5/2019 | Covelli et al. |

FOREIGN PATENT DOCUMENTS

| | | |
|---|---|---|
| WO | 2008048899 A2 | 4/2008 |
| WO | 2012024359 A2 | 2/2013 |

\* cited by examiner

US 11,912,378 B2

VISUAL DISTRESS SIGNAL DEVICE

CROSS-REFERENCE TO RELATED APPLICATIONS

The present application is a continuation-in-part of PCT/US2020/044471, filed Jul. 31, 2020, which claims priority to U.S. Provisional Patent Application Ser. No. 62/881,471, filed Aug. 1, 2019, the entireties of which are incorporated herein by reference.

FIELD OF THE INVENTION

This application relates to devices used in search and rescue of vessels and persons in distress, especially but not limited to in a marine environment. More particularly, the present application provides an emergency beacon having a high-intensity hemispherical pattern of light. This device can be used as a replacement for pyrotechnic flares utilized in search and rescue of vessels and persons in distress, especially in a marine environment.

BACKGROUND OF THE INVENTION

Title 46 of the Code of Federal Regulations requires boaters to carry a visual distress signal when on coastal waters. A visual distress signal is a device designed to alert others that you are in distress and to help others locate you. There are a variety of signaling devices, both pyrotechnic and non-pyrotechnic, that can be carried to meet the requirements of the regulations. One major issue with pyrotechnic devices such as flares is that they expire 42 months after the date of manufacture. Thus, boaters who do not check for the expiration date are often caught on their boat without an acceptable visual distress signal device, which can lead to a dangerous situation. Pyrotechnic flares may also be dangerous because they can burn the people using them and/or start a fire on the vessels. Furthermore, such pyrotechnic flares create environmental issues due to improper or illegal disposing. Therefore, a need exists for an improved electronic distress signaling device that is suitable for use and approved by Coast Guard regulations.

SUMMARY OF THE INVENTION

The device described in the present application can be used to locate marine vessels and/or persons in distress, with a high-intensity portable LED signaling light that is compliant within current and future published governmental regulations for devices utilized in search and rescue operations.

The invention may be directed to a visual distress signal device that generates and emits bright light and/or infrared light to alert bystanders during times of distress. The device may be particularly suited for use on boats. The device may comprise a heat sink assembly that includes a screw-on collar that is attached to a housing of the device, such that the screw-on collar dissipates heat generated by electromagnetic radiation emitting elements away from an interior of the housing. The device may be configured for activation by a mobile phone or other mobile device which may be connected to the device via wireless communication. Furthermore, the mobile device may comprise a software application that can be used to alert persons in a contact list regarding the user's location and emergency status.

In one aspect, the invention may be a visual distress signal device comprising: a housing comprising a cavity having an open top end; a first power source located within the cavity of the housing; an electromagnetic radiation emitting module detachably coupled to the housing to close the open top end of the cavity of the housing in a water tight manner, the electromagnetic radiation emitting module comprising: a heat sink assembly comprising: a collar that engages the housing to detachably couple the electromagnetic radiation emitting module to the housing, an outer surface of the collar being exposed to an ambient environment; a plate member having a bottom surface and a top surface that supports a plurality of electromagnetic radiation emitting elements; and a heat transfer member in contact with the bottom surface of the plate member and with the collar to transfer heat generated by the plurality of electromagnetic radiation emitting elements from the plate member to the collar; and a lens member covering the plurality of electromagnetic radiation emitting elements so that electromagnetic radiation generated by the electromagnetic radiation emitting elements is emitted through the lens member.

In another aspect, the invention may be a visual distress signal device comprising: a housing comprising a cavity; an electrical circuit comprising, in operable cooperation: a first power source located within the cavity of the housing; a plurality of electromagnetic radiation emitting elements; a microprocessor that controls an illumination pattern of the plurality of electromagnetic radiation emitting elements; and a switch alterable between at least an off position and an on position; a lens member through which electromagnetic radiation generated by the plurality of electromagnetic radiation emitting elements emits; and wherein the microprocessor monitors a charge of the first power source so that when the switch is in the on position and the charge of the first power source is above a first threshold value each of the plurality of electromagnetic radiation emitting elements generate electromagnetic radiation in accordance with the illumination pattern and when the switch is in the on position and the charge of the first power source is below the first threshold value a subset of the plurality of electromagnetic radiation emitting elements generate electromagnetic radiation in accordance with the illumination pattern and a remainder of the plurality of electromagnetic radiation emitting elements do not generate electromagnetic radiation.

In yet another embodiment, the invention may be a visual distress signal device comprising: a housing comprising a cavity; an electrical circuit comprising, in operable cooperation: a first power source located within the cavity of the housing; a plurality of electromagnetic radiation emitting elements; a microprocessor that controls an illumination pattern of the plurality of electromagnetic radiation emitting elements; and a switch alterable between at least an off position and an on position; a lens member through which electromagnetic radiation generated by the plurality of electromagnetic radiation emitting elements emits; and wherein when the switch is in the on position, the microprocessor is configured to illuminate all of the plurality of electromagnetic radiation emitting elements in accordance with the illumination pattern for a first period of time, and upon expiration of the first period of time the microprocessor is configured to illuminate a first subset of the plurality of electromagnetic radiation emitting elements in accordance with the illumination pattern while a second subset of the plurality of electromagnetic radiation emitting elements are not illuminated.

In still another embodiment, the invention may be a visual distress alert and locate system comprising: a visual distress signal device comprising: a housing comprising a cavity; and an electrical circuit comprising, in operable cooperation:

a power source located within the cavity of the housing; a plurality of electromagnetic radiation emitting elements; a wireless communication module; and a switch alterable between an off position in which the plurality of electromagnetic radiation emitting elements are deactivated, an on position in which the plurality of electromagnetic radiation emitting elements are activated in accordance with an illumination pattern, and a wireless communication position; and a mobile device comprising a wireless communication module and a memory storing a software application associated with the visual distress signal device, the electronic device configured to be wirelessly coupled to the visual distress signal device when the switch is in the wireless communication position and the mobile device is within a predefined distance from the visual distress signal device; and wherein the mobile device is configured to control activation and deactivation of the plurality of electromagnetic radiation emitting elements using the software application when the switch is in the wireless communication position and the mobile device is wirelessly coupled to the visual distress signal device.

In a further embodiment, the invention may be a visual distress signal device comprising: a housing comprising a cavity having an open top end; a first power source located within the cavity of the housing; an electromagnetic radiation emitting module comprising: a metal collar detachably coupled to the housing between an attached state and a detached state, an outer surface of the metal collar being exposed to an ambient environment; a metal plate member having a top surface and a bottom surface, a plurality of electromagnetic radiation emitting elements coupled to the top surface of the metal plate member; a lens member covering the plurality of electromagnetic radiation emitting elements so that electromagnetic radiation generated by the electromagnetic radiation emitting elements is emitted through the lens member; a metal ring member having a top surface and a bottom surface, the top surface of the metal ring member in contact with the bottom surface of the metal plate member; and a metal disc member having a top surface, a bottom surface, and a peripheral edge, the top surface of the metal disc member in contact with the bottom surface of the metal ring member and at least one of the bottom surface and the peripheral edge of the metal disc member in contact with the metal collar so that heat generated by the plurality of electromagnetic radiation emitting elements passes from the metal plate member to the metal collar; and a circuit board comprising a microprocessor that controls an illumination pattern of the plurality of electromagnetic radiation emitting elements when activated; and wherein when the collar of the electromagnetic radiation emitting module is in the attached state, the disc member covers the open top end of the cavity and engages a gasket located along a distal end of the housing to form a first hermetic seal between the electromagnetic radiation emitting module and the housing and the collar engages a second gasket located along a neck portion of the housing to form a second hermetic seal between the electromagnetic radiation emitting module and the housing.

In a still further embodiment, the invention may be a visual distress signal device comprising: a housing comprising a cavity; a first power source located within the cavity of the housing; a heat sink assembly detachably coupled to the housing between an attached state and a detached state, wherein in the attached state the heat sink assembly closes the cavity of the housing in a water tight manner, the heat sink assembly comprising: a collar that engages the housing to detachably couple the heat sink assembly to the housing; a plate member having a top surface and a bottom surface; and a heat transfer member in contact with the bottom surface of the plate member and with the collar to transfer heat from the plate member to the collar; a plurality of electromagnetic radiation emitting elements coupled to the top surface of the plate member and operably coupled to the first power source; a lens member covering the plurality of electromagnetic radiation emitting elements so that electromagnetic radiation generated by the electromagnetic radiation emitting elements is emitted through the lens member; and wherein heat generated by the plurality of electromagnetic radiation emitting elements passes from the plate member to the collar of the heat sink assembly which is exposed to an ambient environment.

In still another embodiment, the invention may be a visual distress signal device comprising: a housing comprising a cavity having an open top end; a power source located within the cavity of the housing; an electromagnetic radiation emitting module detachably coupled to the housing to close the open top end of the cavity of the housing in a water tight manner, the electromagnetic radiation emitting module comprising: a heat sink assembly comprising: a collar that engages the housing to detachably couple the electromagnetic radiation emitting module to the housing, an outer surface of the collar being exposed to an ambient environment; and a plate member that supports a plurality of electromagnetic radiation emitting elements, wherein the plate member is directly or indirectly coupled to the collar so that heat generated by the electromagnetic radiation emitting elements is transmitted conductively from the plate member to the collar; a lens member covering the plurality of electromagnetic radiation emitting elements so that electromagnetic radiation generated by the electromagnetic radiation emitting elements is emitted through the lens member.

In another embodiment, the invention may be a visual distress signal device comprising: a housing comprising a cavity; an electromagnetic radiation emitting module detachably coupled to the housing to close the cavity, the electromagnetic radiation emitting module comprising: a plurality of electromagnetic radiation emitting elements configured to emit electromagnetic radiation; and a wireless communication module configured to place the visual distress signal device into operable communication with a mobile device; a first power source operably coupled to the electromagnetic radiation emitting elements to power the electromagnetic radiation emitting elements; and a second power source operably coupled to the wireless communication module to power the wireless communication module.

In yet another embodiment, the invention may be a visual distress signal device comprising: a housing; an electromagnetic radiation emitting module detachably coupled to the housing, the electromagnetic radiation emitting module configured to perform a first electrical function and at least a second electrical function; a first power source operably coupled to the electromagnetic radiation emitting module to power the first electrical function; and a second power source operably coupled to the electromagnetic radiation emitting module to power the second electrical function.

In a further embodiment, the invention may be a visual distress signal device comprising: a power source; a plurality of electromagnetic radiation emitting elements operably coupled to the power source, the plurality of electromagnetic radiation emitting elements comprising at least one first light source that emits light in a first color and at least one second light source that emits light in a second color; a switch alterable between an off position whereby power is not supplied from the power source to the plurality of electromagnetic radiation emitting elements and an on position whereby power is supplied from the power source to the plurality of electromagnetic radiation emitting elements; and wherein when the switch is in the on position, the plurality of electromagnetic radiation emitting elements emit light in accordance with an illumination pattern that comprises, in order: a first flashing sequence comprising the at least one first light source flashing on and off three times, each flash having an on time period of approximately 125 ms and an off time period of approximately 125 ms; a second flashing sequence comprising the at least one second light source flashing on and off three times, each flash having an on time period of approximately 375 ms and an off time period of approximately 125 ms; a third flashing sequence comprising the at least one first light source flashing on and off three times, each flash having an on time period of approximately 125 ms and an off time period of approximately 125 ms; and an off sequence of approximately 500 ms; and wherein the first, second, and third flashing sequences and the off sequence continue sequentially until the switch is altered into the off position or a power level of the power source falls below a threshold.

In a still further embodiment, the invention may be a visual distress signal device comprising: a power source; a plurality of electromagnetic radiation emitting elements operably coupled to the power source, the plurality of electromagnetic radiation emitting elements comprising: a plurality of first light emitting diodes that are configured to emit light in a first color and a plurality of second light emitting diodes that are configured to emit light in a second color that is different than the first color, the plurality of first and second light emitting diodes arranged along a circle in an alternating manner; and at least one third light emitting diode configured to emit infrared light and positioned at a centerpoint of the circle; and a switch alterable between an off position whereby power is not supplied from the power source to the plurality of electromagnetic radiation emitting elements and an on position whereby power is supplied from the power source to the plurality of electromagnetic radiation emitting elements.

In yet another embodiment, the invention may be a boat lighting system comprising: a boat comprising a light receiving socket and a switch; a light device configured to be coupled to the light receiving socket of the boat to electrically couple the light device to the switch; and a processor; wherein upon the switch being actuated from an off state to an on state, the processor is configured to activate the light device in accordance with a first mode of operation; and wherein with the light device being activated in accordance with the first mode of operation, upon the switch being actuated from the on state to the off state and then from the off state back to the on state within a predetermined period of time, the processor is configured to activate the light device in accordance with a second mode of operation that is different than the first mode of operation.

In another embodiment, the invention may be a boat comprising: a switch; a light device operably coupled to the switch; wherein upon activation of the switch from an off state to an on state, the light device is activated accordance with a first mode of operation; and wherein with the light device activated in accordance with the first mode of operation, upon the switch being actuated from the on state to the off state and then from the off state back to the on state within a predetermined period of time, the light device is altered from being activated in accordance with the first mode of operation to being activated in accordance with a second mode of operation that is different than the first mode of operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
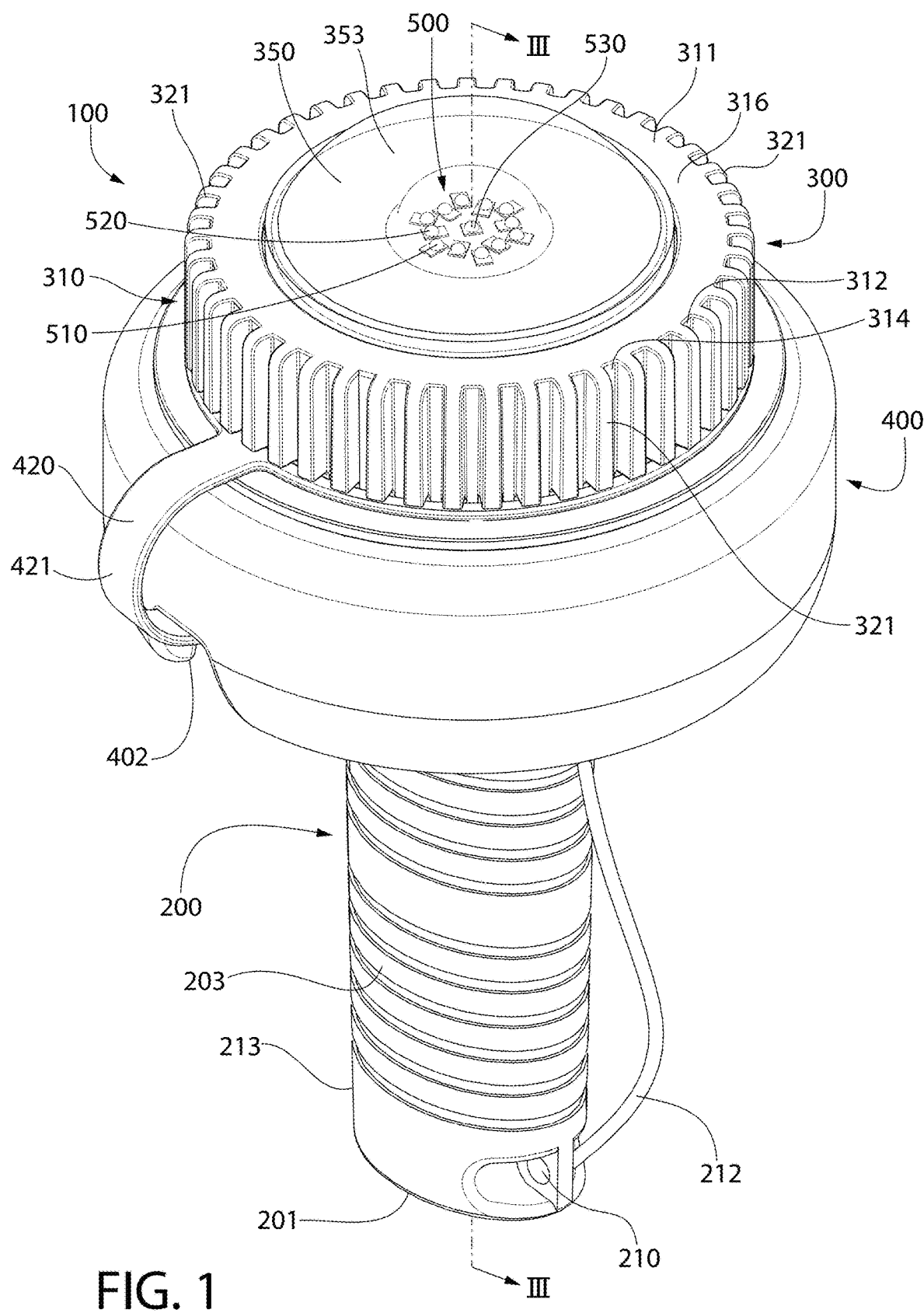
FIG. 1 is a perspective view of a visual distress signal device in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring first to FIGS. 1-5, a visual distress signal device 100 is illustrated in accordance with an exemplified embodiment of the present invention. The visual distress signal device 100 is an electric distress light that is configured to emit electromagnetic radiation as visible light, infrared light, or both for purposes of alerting others that the user of the visual distress signal device 100 is in distress and requires assistance. The visual distress signal device 100 emits the electromagnetic radiation (particularly the visible light thereof) in a hemispherical pattern when activated to provide the best opportunity for bystanders to see the electromagnetic radiation for purposes of offering aid when needed. The visible light is intended to be sufficiently bright and luminous so that it may be visible from up to ten miles away, or more. The infrared light may be received by an overhead satellite so that the overhead satellite can provide the location of the boater in distress to the Coast Guard, first responders, government agencies, towing services, other boaters, and/or any other individual or agency who may be able to provide assistance. The visual distress signal device 100 is particularly geared for use by boaters to be activated in an emergency situation or other situations of distress, although it may be used by non-boaters under appropriate circumstances. The infrared light may also be detected via night vision goggles.

Figure 7A:
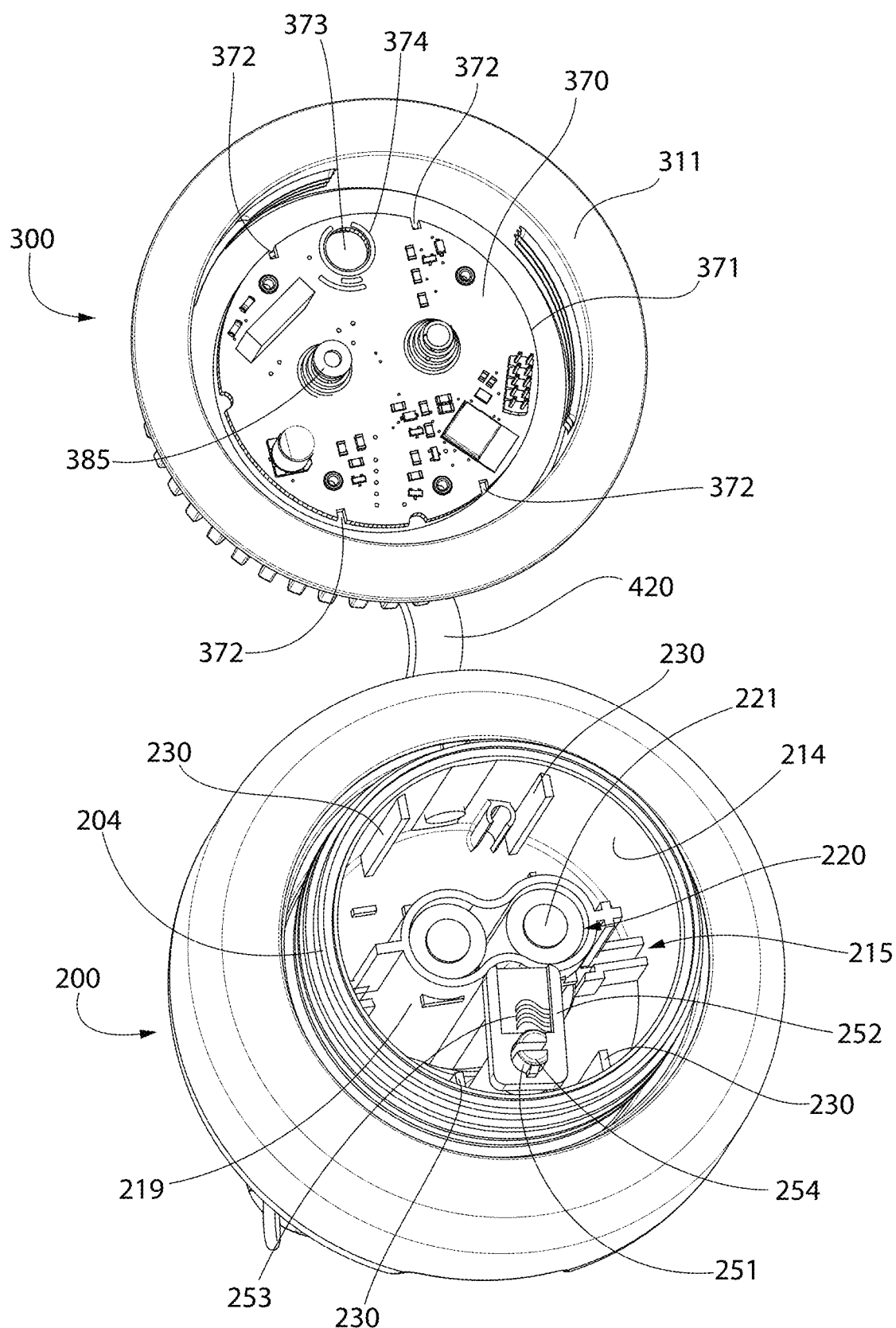
FIG. 7A is a top perspective view of the visual distress signal device of FIG. 1 with an electromagnetic radiation emitting module thereof detached from a housing thereof.
Figure 7B:
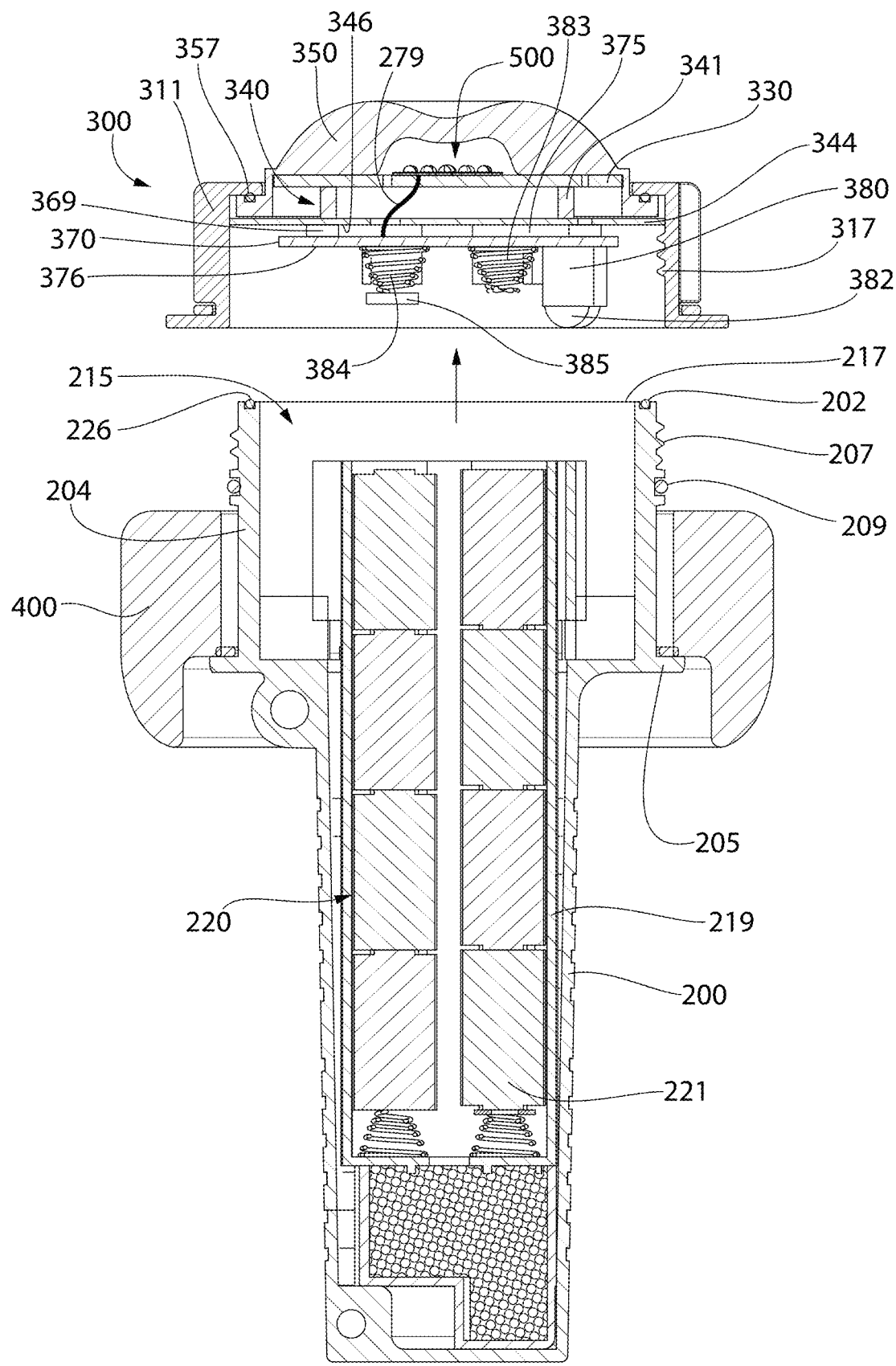
FIG. 7B is a cross-sectional view taken along line VII-VII of FIG. 6 with the electromagnetic radiation emitting module detached from the housing.

The visual distress signal device 100 comprises a housing 200, an electromagnetic radiation emitting module 300, and a float member 400, each of which will be described in greater detail herein below. The electromagnetic radiation emitting module 300 is detachably coupled to the housing 200. Thus, while the electromagnetic radiation emitting module 300 is illustrated attached to the housing 200 (i.e., in an attached state) in FIGS. 1-3, it can be detached from the housing 200 as shown in FIGS. 7A and 7B for purposes of replacing a power source thereof on an as-needed basis.

The housing 200 extends from a proximal end 201 to a distal end 202 (see FIGS. 5 and 9, for example) along a longitudinal axis A-A. The housing 200 comprises an elongated handle portion 203 and a neck portion 204 that extends from the elongated handle portion 203 to the distal end 202. The elongated handle portion 203 is designed to be readily gripped in a single hand of a user so that the user's other hand may be free in an emergency situation that requires use of the visual distress signal device 100. Furthermore, the elongated handle portion 203 may be specifically sized and configured so that it fits within a conventional cup holder or fishing rod holder on a boat. This may allow a user to have a predefined location to position the visual distress signal device 100 during use and non-use, such as for storage. The housing 200 may be formed from a plastic material in some embodiments, although this is not required in all embodiments and other materials could be used as may be desired based upon availability and weight considerations. The elongated handle portion 203 may have ribs, depressions, rubber overlays, or the like for purposes of enhancing the grip thereof by the user.

The neck portion 204 of the housing 200 has a greater width than the handle portion 203 of the housing 200. Specifically, the housing 200 comprises a shoulder portion 235 that delineates the transition from the handle portion 203 to the neck portion 204. The neck portion 204 comprises a support ledge 205 that supports the float member 400 as described in more detail below. The support ledge 205 is located at a bottom end of the neck portion 204 adjacent to the handle portion 203 and is an extension of the shoulder portion 235 which delineates the transition region between the handle portion 203 and the neck portion 204. The support ledge 205 is annular and extends outwardly from the shoulder portion 235 in a direction away from the longitudinal axis A-A of the housing 200. The neck portion 204 has an outer surface 206 having threads 207 thereon that are configured to mate with threads on the electromagnetic radiation emitting module 300 as described below to facilitate the coupling of the electromagnetic radiation emitting module 300 to the housing 200. While it may be possible to omit the threads whereby the electromagnetic radiation emitting module 300 and the housing 200 are coupled together using other techniques, such as friction fit, male and female mating parts, fasteners, or the like, the screw threads are preferred in some embodiments for ease of use while still ensuring that a water tight seal is created between the electromagnetic radiation emitting module 300 and the housing 200.

Figure 3:
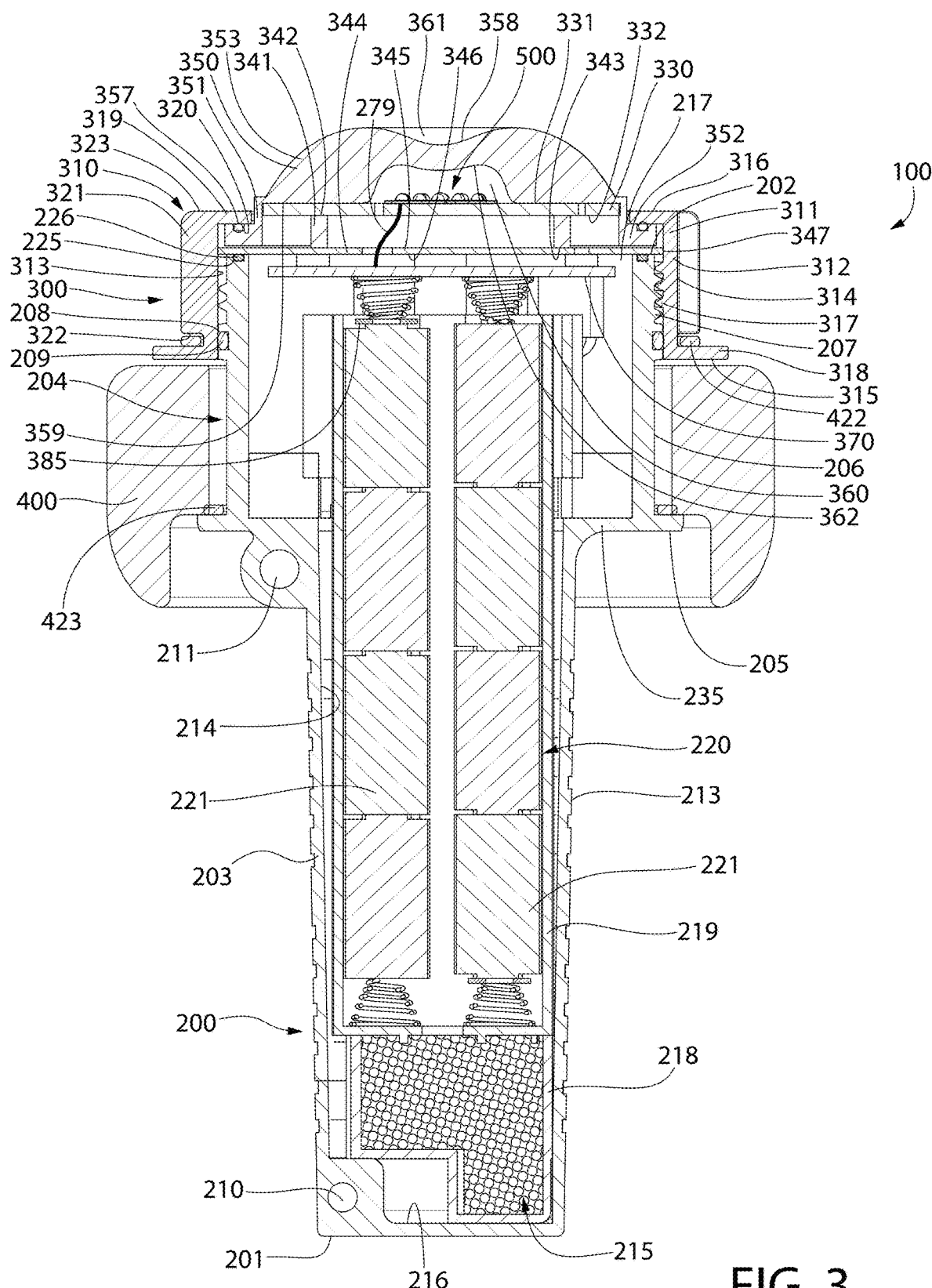
FIG. 3 is a cross-sectional view taken along line III-III of FIG. 1.
Figure 4:
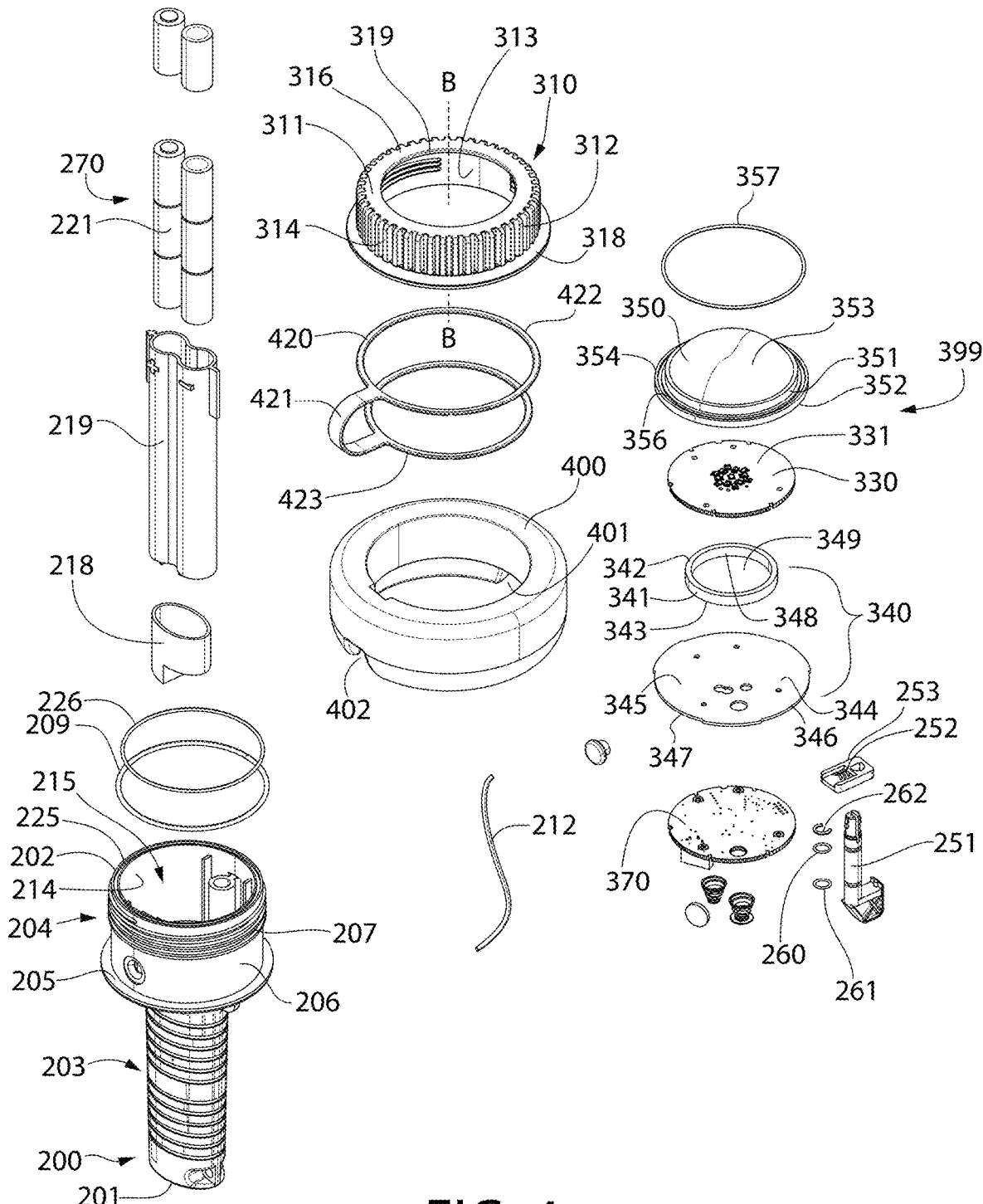
FIG. 4 is a top perspective exploded view of the visual distress signal device of FIG. 1.
Figure 5:
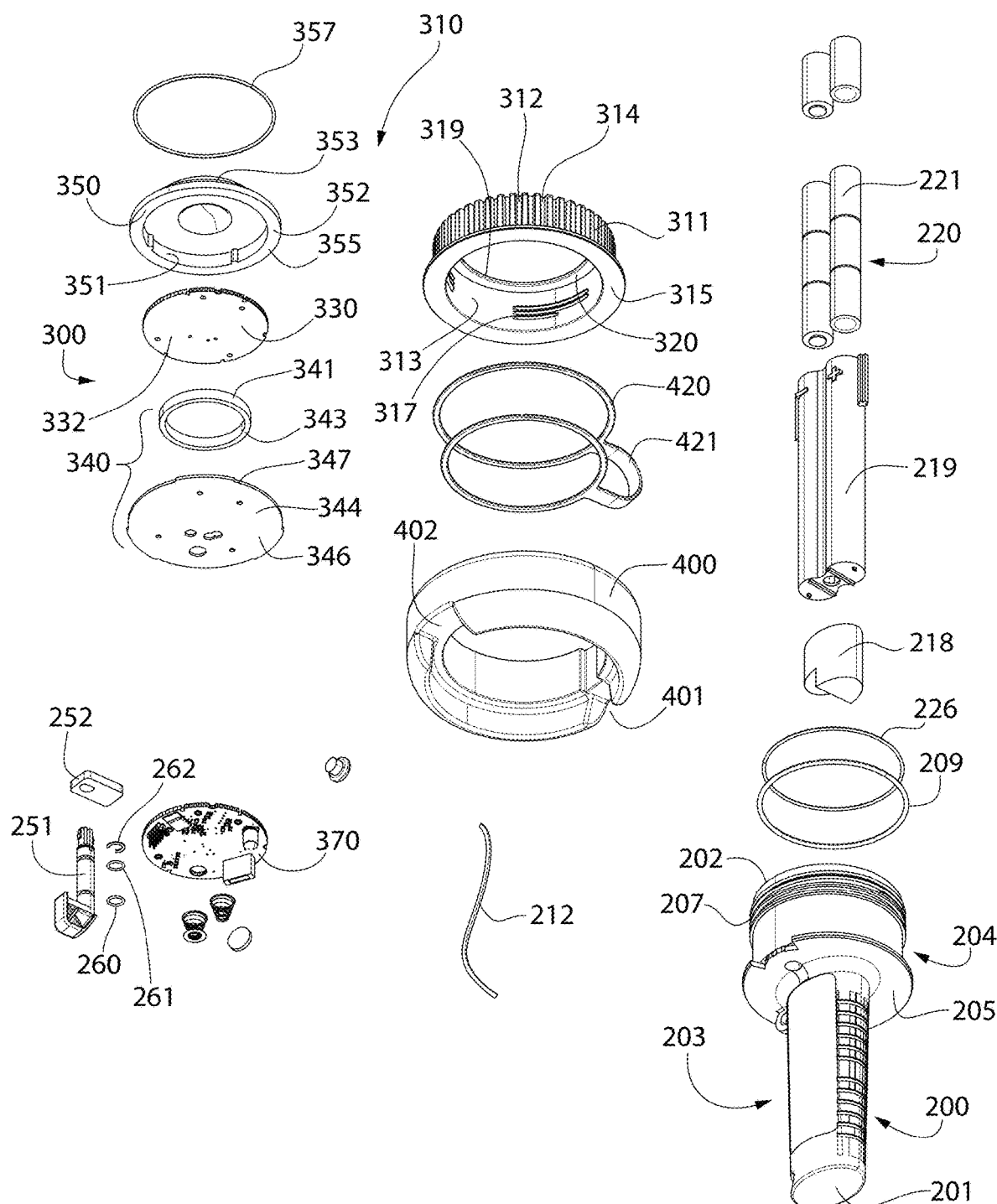
FIG. 5 is a bottom perspective exploded view of the visual distress signal device of FIG. 1.

Furthermore, located beneath the threads 207 and therefore between the threads 207 and the support ledge 205, an annular channel 208 is formed into the neck portion 204 of the housing 200. The annular channel 208 is located immediately below the threads 207 in the exemplified embodiment to ensure that a portion of the electromagnetic radiation emitting module 300 overlies the annular channel 208 when it is coupled to the housing 200. A gasket 209 is disposed within the annular channel 208 for purposes of forming a liquid tight hermetic seal between the electromagnetic radiation emitting module 300 and the housing 200 when the two are coupled together. The gasket 209 (and all other gaskets described herein) may be an O-ring or the like, and may be formed from a variety of different materials including PTFE, Teflon, rubber, or even metals. In one particular embodiment, the gasket 209 is formed from rubber. The gasket 209 is annular in shape and it is positioned around the neck portion 204 of the housing 200 within the annular channel 208 so as to circumferentially surround the neck portion 204. The gasket 209 has a thickness that may be slightly greater than a depth of the annular channel 208 so that the gasket 209 sticks out from the annular channel 208 and is compressed by the electromagnetic radiation emitting module 300 when in the attached state as shown in FIG. 3.

The housing 200 includes a first aperture 210 located at a bottom of the handle portion 203 adjacent to the proximal end 201 of the housing 200 and a second aperture 211 located just below the support ledge 205 at the junction between the handle portion 203 and the neck portion 204. A lanyard 212 may be coupled to the housing 200 by passing the lanyard through the first and second apertures 210, 211. The lanyard 212 may be used to enhance the user's grip on the handle portion 203 and may also be used for purposes of attaching the visual distress signal device 100 to another structure so that it does not need to be handheld at all times (i.e., tying and/or tethering). The visual distress signal device 100 is reasonably small and can be held and activated with a single hand in some embodiments.

Figure 2:
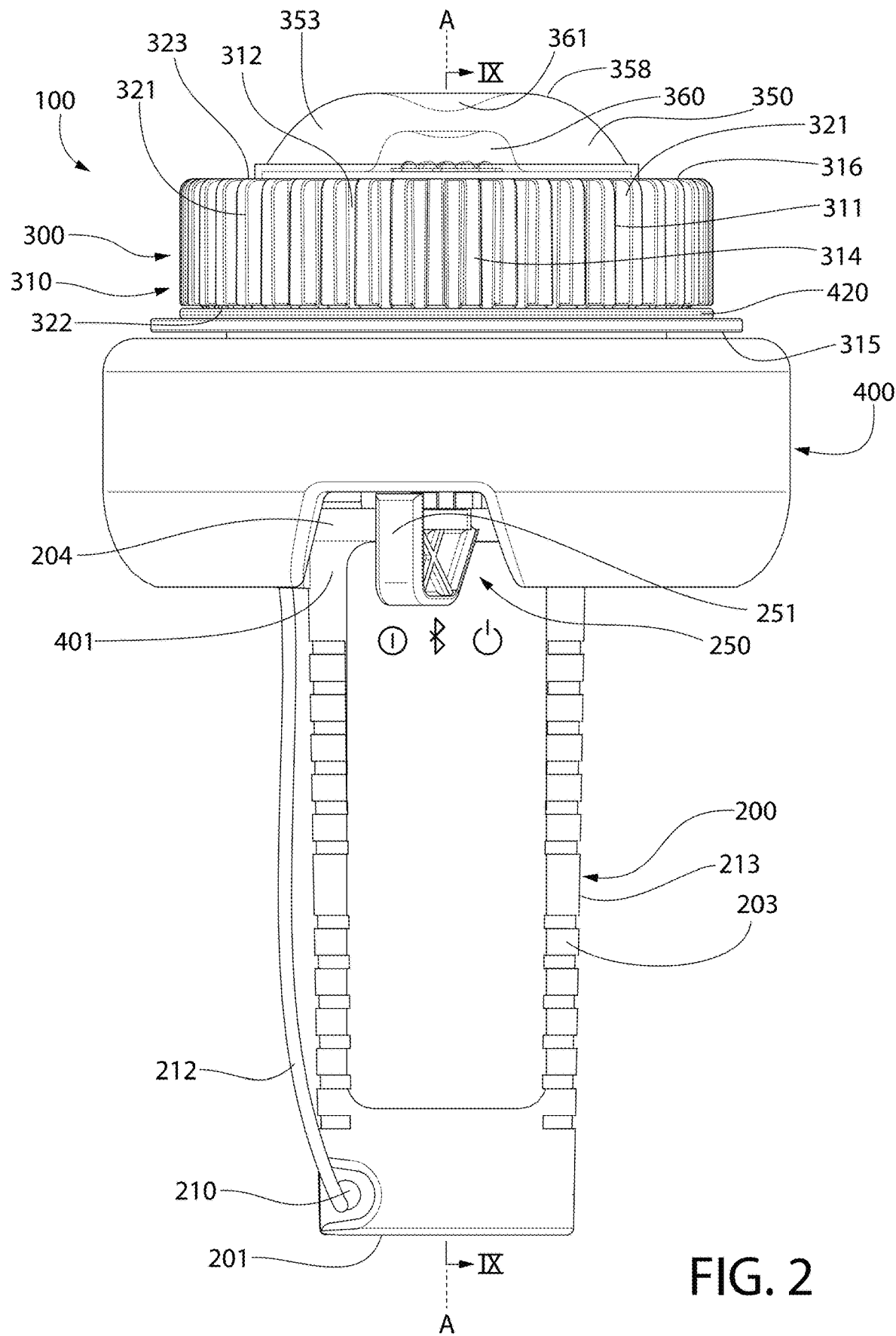
FIG. 2 is a front view of the visual distress signal device of FIG. 1.

The housing 200 comprises an outer surface 213 (which includes the outer surface 206 of the neck portion 204 and an outer surface of the handle portion 203) and an inner surface 214. The inner surface 214 defines a cavity 215 that is located within both the handle portion 203 and the neck portion 204. The cavity 215 is a continuous, uninterrupted volume of space within both the handle portion 203 and the neck portion 204 of the housing 200. The cavity 215 extends from a floor 216 which forms a closed bottom end of the cavity 215 to an open top end 217, with the open top end 217 being located at the distal end 202 of the housing 200. The open top end 217 of the cavity 216 is closed (in a water-tight manner) by the electromagnetic radiation emitting module 300 when the electromagnetic radiation emitting module 300 is coupled to the housing 200 as shown in FIGS. 1-3. However, as will be described in greater detail below, the electromagnetic radiation emitting module 300 may be detached from the housing 200 to expose the open top end 217 of the cavity 216 for reasons which will become apparent from the description below.

A standoff 218 is positioned within the cavity 215 of the housing 200 adjacent to the floor 216 of the cavity 215. Specifically, the standoff 218 rests atop of the floor 216 of the cavity 215 in the exemplified embodiment. Furthermore, a battery tray 219 is positioned within the cavity 215 and rests atop of a distal end of the standoff 218. Thus, one purpose of the standoff 218 is to elevate the battery tray 219 above the floor 216 of the cavity 215. In addition, in the exemplified embodiment there is a ballast located within the standoff 218. The ballast may be a heavy metal material, such as gravel, sand, iron, or lead, placed within a compartment defined by the standoff 218, to assist with upright floatation of the visual distress signal device 100 when it is placed in water. Thus, the ballast provides an internal floatation mechanism and the float member 400 provides an external floatation mechanism for the visual distress signal device 100. The ballast provides some stability to the visual distress signal device 100 when it is floating within a body of water to help make sure the electromagnetic radiation emitted therefrom will remain visible.

A power source 220 is positioned within the cavity 215 of the housing 200. In the exemplified embodiment, the power source 220 comprises a plurality of batteries 221 that are disposed within an interior of the battery tray 219. The batteries may be lithium batteries, such as CR123A lithium batteries in some embodiments although different battery types may be used in other embodiments so long as they provide a sufficient voltage to the electromagnetic radiation emitting elements to activate them when needed. In the exemplified embodiment, the power source 220 comprises eight of the batteries, although more or less than eight batteries may be used in other embodiments depending on the various voltage requirements of the electrical system of the visual distress signal device 100. The power source 220 supplies power to the electromagnetic radiation emitting module 300 when the electromagnetic radiation emitting module 300 is coupled to the housing 200 and a switch is actuated into an "on" position as described in more detail below.

In that regard, the visual distress signal device 100 comprises a switch 250 that comprises an actuator member 251 and a contact plate 252 that are coupled together. The switch 250 is designed to allow for one-handed operation and includes features that prevent accidental activation, as described further below. The actuator member 251 is located along an outer surface of the upper portion of the handle portion 204 of the housing 200 so that a user can hold the visual distress signal device 100 and actuate the actuator member 251 with a single hand. Specifically, the user can grip the handle portion 203 of the housing 200 with the palm and fingers and the user can actuate the actuator member 251 with the thumb. The contact plate 252 and contact elements 253 thereon are positioned within the cavity 215 of the housing 200. Actuating the actuator member 251 moves the contact plate 252 so that the contact elements 253 on the contact plate 252 will contact different portions of a circuit board (discussed below) to modify a mode or state of the visual distress signal device 100. The contact elements 253 are electrical contact elements, preferably prongs formed of metal that are configured to come into contact with metal traces on the circuit board for purposes of initiating different modes of the visual distress signal device 100 depending on the actuation of the actuator member 251. Specifically, the switch 250 is configured to be altered between an off position/state, an on position/state, and a wireless communication position/state, the details of which will be provided below with reference to FIGS. 12-14. In FIG. 2 the switch 250 is in the off position and the electromagnetic radiation emitting module 300 is not emitting any electromagnetic radiation.

Figure 9:
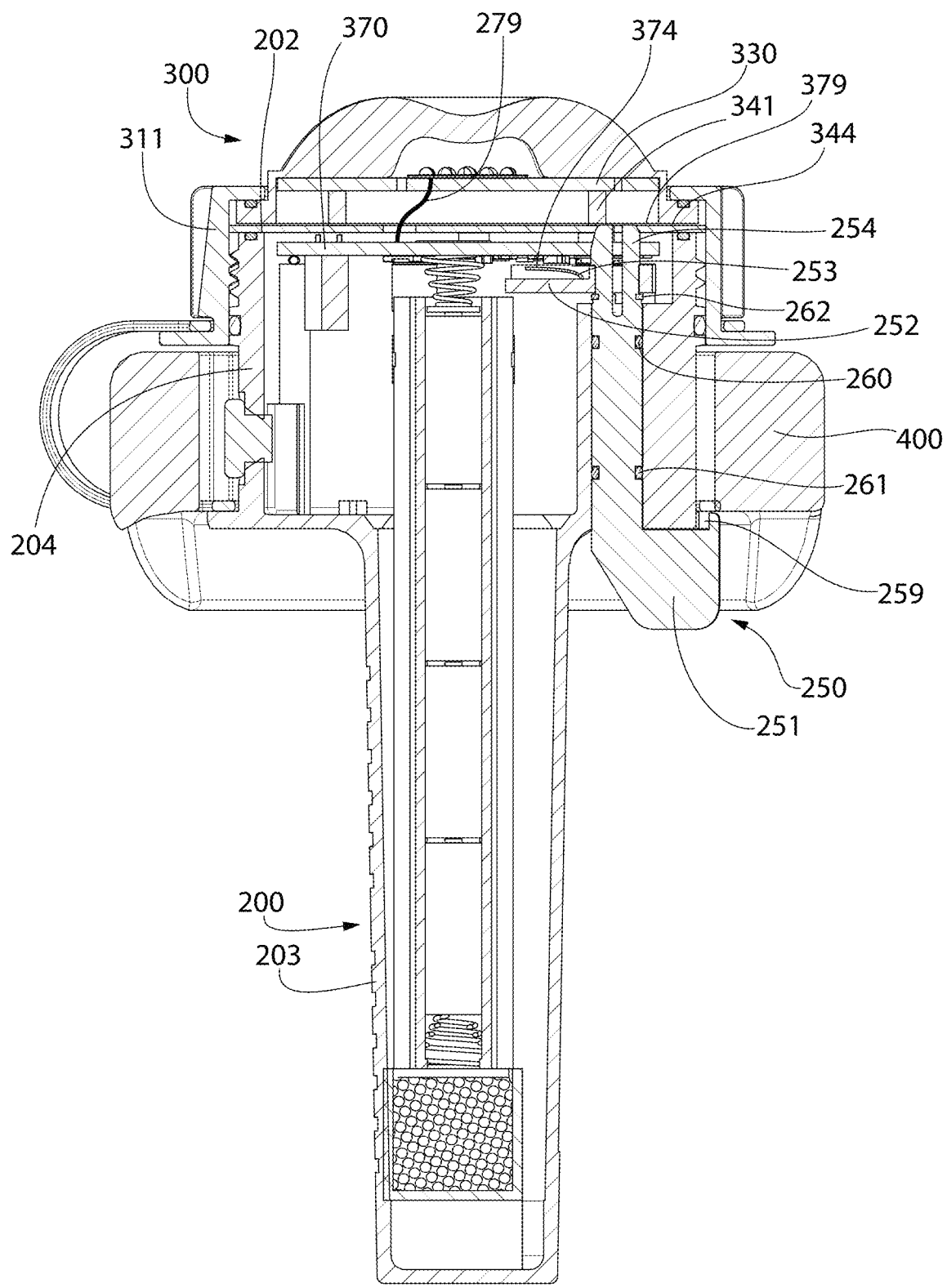
FIG. 9 is a cross-sectional view taken alone line IX-IX of FIG. 2.

There are two gaskets 260, 261 positioned around the actuator 251 for purposes of ensuring a water-tight seal where the actuator 251 meets the housing 200. Furthermore, there is a C clip 262 attached to a top portion of the actuator 251 to ensure that the actuator 251 remains in operable coupling with the housing 200 and cannot be readily removed therefrom. The gaskets 260, 261 and the C clip 262 are also shown in FIG. 9 which illustrates the position of those components in the assembled visual distress signal device 100. As shown in FIG. 9, the actuator member 251 extends into and through a cylindrical protrusion located within the interior of the housing 200 (and formed integrally with the remainder of the housing 200. The C clip 262 is affixed to the top portion of the actuator 251 and abuts against a top edge of the cylindrical protrusion so that the actuator member 251 cannot be pulled out from the cylindrical protrusion.

The distal end 202 of the housing 200 comprises an annular channel 225 which circumferentially surrounds the longitudinal axis A-A of the housing 200. Furthermore, a gasket 226 is disposed within the annular channel 225 in the distal end 202 of the housing 200. When the electromagnetic radiation emitting module 300 is coupled to the housing 200, a hermetic seal is formed between the electromagnetic radiation emitting module 300 and the housing 200 at the distal end 202 of the housing 200 due, at least in part, to the inclusion of the gasket 226. That is, a portion of the electromagnetic radiation emitting module 300 abuts against and compresses the gasket 226 within the annular channel 226 to create a liquid-tight seal between the electromagnetic radiation emitting module 300 and the housing 200 at the distal end 202 of the housing 200 (and also at the open top end 217 of the cavity 215). This will be described again further down in this document where all hermetic seals among the components will be discussed together.

As mentioned above, the neck portion 204 of the housing 200 supports the float member 400 and also serves as a connector for the electromagnetic radiation emitting module 300. When fully assembled, the float member 400 rests upon the support ledge 205 of the housing 200 and is positioned between the handle portion 203 of the housing 200 and the electromagnetic radiation emitting module 300.

The float member 400 may be formed from a foam material, such as a compressible foam material, and preferably a closed cell foam in some embodiments. However, the invention is not to be limited to forming the float member 400 from a foam material, and any buoyant material can be used. The float member 400 enables the visual distress signal device 100 to float in water while also maintaining the visual distress signal device 100 in an upright orientation. The float member 400 may be sufficiently buoyant such that it is capable of maintaining at least an upper portion of the visual distress signal device 100, and more specifically the electromagnetic radiation emitting module 300 of the visual distress signal device 100, above the surface of the liquid within which it is floating. Moreover, as noted above, in some embodiments it is the combination of the ballast (internal feature) and the float member 400 (external feature) that allows the visual distress signal device 100 to be buoyant and to float when placed into a body of water. In certain embodiments, the handle portion 203 of the housing 200 may be beneath the surface of the liquid and the electromagnetic radiation emitting module 300 may be above the surface of the liquid. The weight of the power source in the handle portion 203 (described below) will ensure that the visual distress signal device 100 remains upright when it is floating in the liquid. Furthermore, as described in greater detail below, the visual distress signal device 100 is sealed in a watertight manner so that no water may enter into the internal housing 200.

The float member 400 has a first notch 401 which is aligned with the actuator member 251 of the switch 250 so that the float member 400 does not interfere with the actuation of the switch 250. The float member 400 has a second notch 402 that is aligned with a hinge portion 421 of a retention member 420 that is operably coupled to both the housing 200 and the electromagnetic radiation emitting module 300 to maintain the housing 200 and the electromagnetic radiation emitting module 300 coupled together even when the electromagnetic radiation emitting module 300 is in a detached state. Specifically, when the electromagnetic radiation emitting module 300 is detached (i.e., de-threaded) from the neck portion 204 of the housing 200, the electromagnetic radiation emitting module 300 remains coupled to the housing 200 due to the retention member 420 being attached to both the neck portion 204 of the housing 200 and the electromagnetic radiation emitting module 300. That is, the electromagnetic radiation emitting module 300 will hang from the housing 200 by the retention member 420.

The electromagnetic radiation emitting module 300 generally comprises a heat sink assembly 310, a lens member 350, and a circuit board 370 that are physically coupled together. Due to the physical coupling of those components, when the electromagnetic radiation emitting module 300 is detached from the housing 200, all components of the electromagnetic radiation emitting module 300 remain coupled together as a singular unit.

In the exemplified embodiment, the heat sink assembly 310 comprises a collar 311, a plate member 330, and a heat transfer member 340. The plate member 330 and the heat transfer member 340 are fixedly coupled together so as to be substantially non-movable relative to one another. The plate member and the heat transfer member 340 may be capable of rotating within the collar 311 when the electromagnetic radiation emitting module 300 is detached from the housing 200. The plate member 330, the heat transfer member 340, the lens member 350, and the circuit board 370 may be fixedly coupled together so as to form a light module 399 which is inserted within and remains positioned within the collar 311, as described in more detail below. Thus, the plate member 330, the heat transfer member 340, the lens member 350, and the circuit board 370 may be coupled together as a unit.

Each of the collar 311, the plate member 330, and the heat transfer member 340 is formed from a heat conductive material so that heat generated within or by the electromagnetic radiation emitting module 300 is dissipated to the ambient environment to prevent an overheating situation. The heat conductive material may be one or more metals or metal alloys in some embodiments. One particular metal used for these components may be aluminum which has a high thermal conductivity, although the invention is not to be so limited in all embodiments and other metal materials may be used including copper, aluminum alloys, or the like.

The collar 311 is the portion of the heat sink assembly 310 of the electromagnetic radiation emitting module 300 which achieves the coupling to the housing 200. The collar 311 comprises a body portion 312 having an inner surface 313 and an outer surface 314. Furthermore, the collar 311 extends from a bottom end 315 to a top end 316 along a collar axis B-B. The inner surface 313 of the collar 311 defines an opening that extends from the top end 316 to the bottom end 315. Thus, the collar 311 is a ring-shaped member which defines an interior region within which the other components of the electromagnetic radiation emitting module 300 are at least partially positioned. The collar 311 comprises threads 317 on the inner surface 313 which are configured to mate with or otherwise engage the threads 207 on the outer surface 206 of the neck portion 204 of the housing 200 to couple the collar 311 and hence also the electromagnetic radiation emitting module 300 to the housing 200. Specifically, the collar 311 can be placed onto the neck portion 204 of the housing 200 and then rotated relative to the housing 204 so that the threads 317 of the collar 311 mate with the threads 207 of the neck portion 204 of the housing 200. As the threads 217, 207 engage and with continued rotation of the collar 311 relative to the housing 200, the electromagnetic radiation emitting module 300 moves axially downwardly relative to the housing 200 until the inner surface 313 of the collar 311 compresses the gasket 209 which is positioned within the annular channel 208 in the neck portion 204 of the housing 200. The compression of the gasket 209 by the collar 311 creates a liquid tight hermetic seal between the collar 311 of the electromagnetic radiation emitting module 300 and the housing 200.

In the exemplified embodiment, the collar 311 comprises a plurality of sets of the threads 207 such that each set of threads 207 is circumferentially spaced apart from each other set of threads 207. This spacing between the threads 207 allows for the insertion of the heat transfer member 340 into an appropriate position within the collar 311, which will be described in greater detail below.

The collar 311 comprises a first annular flange 318 located at the bottom end 315 of the collar 311. The first annular flange 318 extends from the outer surface 314 of the body portion 312 of the collar 311 in a direction away from the collar axis B-B (i.e., the first annular flange 318 extends outwardly from the body portion 312). The collar 311 also comprises a second annular flange 319 located at the top end 316 of the collar 311. The second annular flange 319 extends from the outer surface 314 of the body portion 312 of the collar 311 in a direction towards the collar axis B-B (i.e., the second annular flange 319 extends inwardly from the body portion 312). The top surface of the second annular flange 319 forms at least a portion of the top surface 316 of the collar 311. Furthermore, the second annular flange 319 comprises a bottom surface 320 that faces away from the top surface 316 of the collar 311 and into the interior of the collar 311. As will be discussed in greater detail below along with a discussion of the lens member 350, the bottom surface 320 of the second annular flange 319 engages a gasket held by the lens member 350 to create a liquid tight hermetic seal between the collar 311 and the lens member 350.

The collar 311 further comprises a plurality of ribs 321 protruding from the outer surface 314 of the body portion 312 in a circumferentially spaced apart manner. Each of the ribs 321 extends from a bottom end 322 which is adjacent to and spaced apart from the first annular flange 318 to a top end 323 which is flush with the top surface 316 of the collar 311. The ribs 321 serve to increase the surface area of the portion of the collar 311 which is exposed to the ambient environment in order to enhance the ability of the collar 311 to remove heat from the interior of the visual distress signal device 100 as described in more detail below. As mentioned above, the bottom end 322 of the ribs 321 are spaced apart from the first annular flange 318 in the exemplified embodiment. Furthermore, as seen in FIG. 3, a first ring portion 422 of the retention member 420 nests within the space between the ribs 321 and the first annular flange 318 to couple the retention member 420 to the collar 400. A second ring portion 423 of the retention member 420 is sandwiched between the float member 400 and the support ledge 205 to couple the retention member 420 to the housing 200. The hinge portion 421 of the retention member 420 extends between the first and second ring portions 422, 423 to keep the electromagnetic radiation emitting module 300 coupled to the housing 200 even when the collar 311 is not threadibly coupled to the housing 200.

The plate member 330 is a flat metal plate comprising a top surface 331 and a bottom surface 332. A plurality of electromagnetic radiation emitting elements 500 are coupled to and supported by the top surface 331 of the plate member 330. The electromagnetic radiation emitting elements 500 are the elements that generate and emit electromagnetic radiation in the visible and/or infrared wavelengths as mentioned above. The electromagnetic radiation emitting elements 500 will be described in greater detail below with respect to the types of electromagnetic radiation emitted, the positioning of the electromagnetic radiation emitting elements 500, and more.

However, it should be noted here that the electromagnetic radiation emitting elements 500 generate and emit heat as they are activated to generate and emit electromagnetic radiation. The electromagnetic radiation emitting elements 500 may include light emitting diodes. It is noted that the electromagnetic radiation emitting elements 500 are not limited to being light emitting diodes in all embodiments and could be other types of light emitting elements (e.g., incandescent light sources, gas-discharge lamps or "flash tubes" or similar, highly dispersed emitters) in other embodiments.

In particular with high power light emitting diodes, but also with other types of electromagnetic radiation emitting elements, it is essential to remove the heat generated by the electromagnetic radiation emitting elements 500 through efficient thermal management and good heat sinking. Without proper heat sinking, the internal or junction temperature of the electromagnetic radiation emitting elements 500 may increase which can cause the characteristics of the electromagnetic radiation emitting elements 500 to change, reduce the lifecycle of the electromagnetic radiation emitting elements 500, decrease the output of the electromagnetic radiation emitting elements 500 prematurely, or the like. In the exemplified embodiment, the heat generated by the electromagnetic radiation emitting elements 500 will initially be transferred onto the plate member 300 due to the plate member 330 being formed from a metal such as aluminum having good heat conduction properties (i.e., high thermal conductivity).

The heat that is transferred to the plate member 330 must be transferred outwardly away from the electromagnetic radiation emitting elements 500. In the exemplified embodiment, this is achieved with the heat transfer member 340. In the exemplified embodiment, the heat transfer member 340 comprises a ring member 341 having a top surface 342 and a bottom surface 343 and a disc member 344 having a top surface 345, a bottom surface 346, and a peripheral edge 347. In other embodiments, the heat transfer member 340 may be a singular component rather than two separate and distinct components. In still other embodiments, the heat transfer member 340 may comprise more than two components. Thus, the exact number of components used to transfer heat from the plate member 330 to the collar 311 as described below is not limiting of the present invention, and the term heat transfer member 340 is intended to capture any of those various different embodiments and/or permutations.

In the exemplified embodiment, the ring member 341 is a ring-shaped element having an inner surface 348 that surrounds an aperture 349. However, the invention is not to be so limited in all embodiments and the ring member 341 could be a solid structure such that the aperture 349 could be filled in with the material of the ring member 341 in other embodiments. Furthermore, although the ring member 341 has a round/circular shape in the exemplified embodiment, the invention is not to be so limited in all embodiments and the ring member 341 can take on other any other shape as may be desired so long as it is capable of performing its passive heat dissipation function as described herein.

The components of the heat sink assembly 310 are arranged as follows. The top surface 342 of the ring member 341, which also forms the top surface of the heat transfer member 340, is in contact with the bottom surface 332 of the plate member 330. Thus, heat generated by the electromagnetic radiation emitting elements 500 is transferred to the plate member 300, which is in turn transferred to the ring member 341 of the heat transfer member 340 via conduction. The bottom surface 343 of the ring member 341 is in contact with the top surface 345 of the disc member 344, which enables the heat to conduct from the ring member 341 to the disc member 344. The peripheral edge 347 of the disc member 344 is in contact with the inner surface 313 of the collar 311. Thus, the heat will then transfer from the disc member 344 to the collar 311 via conduction. The outer surface of the collar 311 is exposed to the ambient environment, which will flow the heat into the ambient environment while cooling the collar 311. Thus, the plate member 330, the heat transfer member 340, and the collar 311 collectively form a passive heat exchange which forms a heat sink to remove heat generated by the electromagnetic radiation emitting elements 500 from the visual distress signal device 100. This heat flow will be described again with reference to FIGS. 10 and 11. In addition to removing heat from the system, the heat sink assembly 310 also plays a vital role in ensuring that the visual distress signal device 100 is fluid tight to keep water from entering the cavity 215 of the housing 200 under all circumstances including when the visual distress signal device 100 is floating in a body of water.

The lens member 350 comprises a sidewall 351, a dome portion 353 and a flange portion 352. The sidewall 351 defines a cavity within which the plate member 330 and at least a portion of the heat transfer member 340 of the heat sink assembly 310 are disposed in the assembled device. The flange portion 352 extends outwardly from a bottom end of the sidewall 351 and the dome portion 353 extends from a top end of the sidewall 351. The flange portion 352 has a top surface 354 and a bottom surface 355. Furthermore, an annular channel 356 is formed into the top surface 354 of the flange portion 352 of the lens member 350. A gasket 357 is disposed within the annular channel 356 in the top surface 354 of the flange portion 352. As best shown in FIG. 3, when the electromagnetic radiation emitting module 300 is fully assembled, the bottom surface 320 of the second annular flange 319 of the collar 311 contacts and compresses the gasket 357, thereby forming a water-tight hermetic seal between the collar 311 and the lens member 350.

The dome portion 353 of the lens member 350 comprises an top surface 358 which is exposed to the ambient environment, a bottom surface 359, and a pocket 360 that is defined by the bottom surface. The top surface 358 of the dome portion 353 comprises a concave portion 361 that is aligned with the pocket 360. The bottom surface 359 comprises a convex portion 362 that forms a roof of the pocket 360. When the electromagnetic radiation emitting module 300 is assembled, the plate member 330 containing the electromagnetic radiation emitting elements 500 thereon is positioned within the cavity of the lens member 350 so that the inner surface of the sidewall 351 abuts against a peripheral edge of the plate member 330 and the bottom surface 359 of the lens member 350 abuts against a peripheral portion of the top surface 331 of the plate member 330 which is radially outward of the location of the electromagnetic radiation emitting elements 500. Furthermore, the electromagnetic radiation emitting elements 500 extend from the top surface 331 of the plate member 330 into the pocket 360 of the dome portion 353 of the lens member 350. Thus, electromagnetic radiation generated by the electromagnetic radiation emitting elements 500 is emitted through the lens member 350. Due to the shape and configuration of the lens member 350, the electromagnetic radiation generated by the electromagnetic radiation emitting elements 500 is emitted from the lens member 350 in a hemispherical pattern so that it is emitted in a 360° direction to optimize the likelihood of the electromagnetic radiation being seen by a bystander.

As mentioned above, there are three water tight seals formed into the visual distress signal device 100 to ensure that water cannot enter into the cavity 215 of the housing 200 and damage the power source 220 or any of the other electronic components. These three water tight seals are formed when the collar 311 is screwed onto the neck portion 204 of the housing 200. Specifically, the first water tight seal is formed due to the engagement between the collar 311 and the gasket 209 located in the annular channel 208 on the neck portion 204 of the housing 200. That is, as the collar 311 is screwed onto the housing 200, the collar 311 moves downwardly until the inner surface 313 of the collar 311 engages and compresses the gasket 209. The second water tight seal is formed due to the engagement between the disc member 344 of the heat transfer member 340 and the gasket 226 positioned in the annular channel 225 in the distal end 202 of the housing 200. That is, as the collar 311 is screwed onto the housing 200, the disc member 344 of the heat transfer member 340 moves downwardly towards the distal end 202 of the housing 200. The disc member 344 of the heat transfer member 340 closes the open top end 217 of the cavity 215 and engages and compresses the gasket 226 positioned in the annular channel 225 formed into the distal end 202 of the housing 200. The disc member 344 has a greater diameter than the open top end 217 of the cavity 215 to ensure that the disc member 344 completely closes the open top end 217 of the cavity 215. Finally, the third water tight seal is formed due to the engagement between the bottom surface 320 of the second annular flange 319 of the collar 311 and the flange portion 352 of the lens member 350, which causes the second annular flange 319 to engage and compress the gasket 357 positioned in the channel 356 in the top surface 354 of the flange portion 352 of the lens member 350.

Thus, the collar 311 is screwed onto the housing 200 and the first annular flange 318 of the collar 311 presses downwardly against the flange portion 352 of the lens member 350, which in turn presses downwardly on the disc member 344 of the heat transfer member 340 of the heat sink assembly 310, which in turn presses downwardly on the distal end 202 of the housing 200 to create a tightly and hermetically sealed device. The design described herein and shown in the drawings provides for a heat sink assembly 310 that allows a closed system to transfer heat to the ambient environment while maintaining complete water tight integrity to the visual distress signal device 100.

Figure 6:
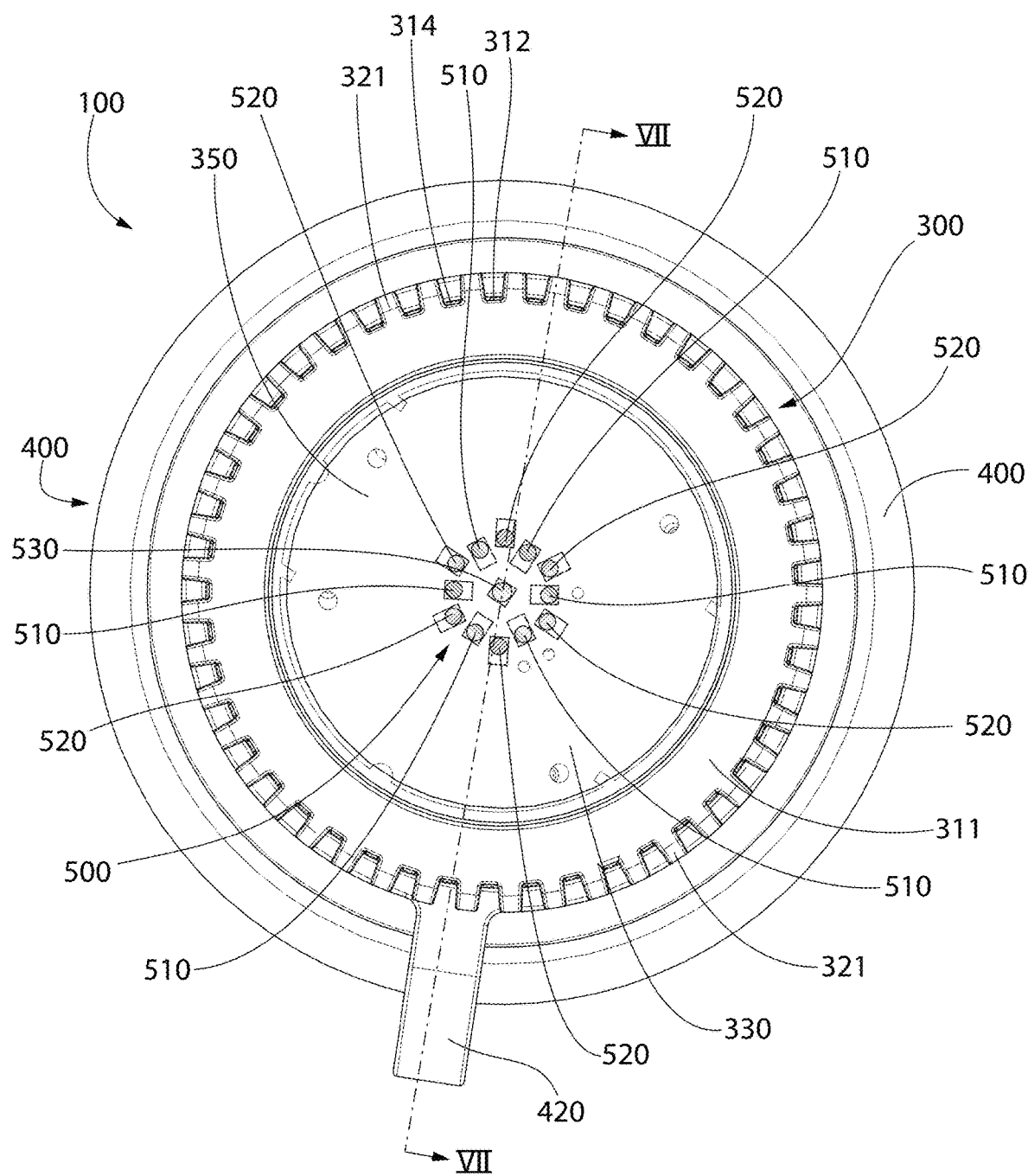
FIG. 6 is a top plan view of the visual distress signal device of FIG. 1.

Referring to FIGS. 1 and 6, the electromagnetic radiation emitting elements 500 will be further described. The electromagnetic radiation emitting elements 500 comprise a plurality of first light emitters 510, a plurality of second light emitters 520, and at least one infrared emitter 530. The plurality of first light emitters 510 may be configured to emit a first color of light having a first wavelength and at a first luminous intensity. In some embodiments, the first color of light may be red-orange. Furthermore, the first wavelength may be in a range of 580 nm and 630 nm, and more specifically 610 nm and 620 nm. Moreover, the first luminous intensity may be between 120 candela and 140 candela, and more specifically approximately 130 candela. The plurality of second light emitters 520 may be configured to emit a second color of light having a second wavelength and at a second luminous intensity. In some embodiments, the second color of light may be cyan. Furthermore, the second wavelength may be in a range of 470 nm and 540 nm, and more specifically between 490 nm and 520 nm. Moreover, the second luminous intensity may be between 60 candela and 90 candela, and more specifically approximately 75 to 80 candela. The infrared emitter may emit infrared light at approximately 21 mW/Sr and in a wavelength between 740 and 890 nm.

The plurality of first light emitters 510 and the plurality of second light emitters 520 may be arranged around a ring or circle in an alternating manner. That is, each of the first light emitters 510 may be adjacent to two of the second light emitters 520 and each of the second light emitters 520 may be adjacent to two of the first light emitters 510. In the exemplified embodiment, there are six of the first light emitters 510 and six of the second light emitters 520. In other embodiments, more or less than six of each of the first and second light emitters 510, 520 may be used while still falling within the scope of the invention claimed herein. The ring formed by the first and second light emitters 510, 520 may surround the infrared light emitters 530, as shown in FIG. 6. When the visual distress signal device 100 is activated, the plurality of electromagnetic radiation emitting elements 500 generate and emit electromagnetic radiation in accordance with a predetermined illumination pattern, the details of which will be described below.

Referring to FIGS. 7A and 7B, the visual distress signal device 100 is depicted with the electromagnetic radiation emitting module 300 detached from the housing 200. This is achieved by unscrewing the collar 311 from the neck portion 204 of the housing 200 until the threads 317 of the collar 311 are no longer in mating engagement with the threads 207 of the housing 200. When this is done, the entire electromagnetic radiation emitting module 300 can be separated/detached from the housing 200. This is because the electromagnetic radiation emitting module 300 is a singular module made up of the various components described herein above. That is, the various components of the electromagnetic radiation emitting module 300 are coupled together so that the electromagnetic radiation emitting module 300 essentially forms a cap that encloses the open top end 217 of the cavity 215 while also providing power to the electromagnetic radiation emitting elements 500 (when the switch is in the on position as described above). The components of the electromagnetic radiation emitting module 300 do not become readily detached from one another so the electromagnetic radiation emitting module 300 is attached to and detached from the housing 200 as a unit. As shown in FIG. 7A in particular, even when the electromagnetic radiation emitting module 300 is detached from the housing 200 (the collar 311 is not engaging the neck portion 204 of the housing 200), the electromagnetic radiation emitting module 300 remains connected to the housing 200 via the retention member 420.

The circuit board 370 and its components are exposed within the collar 311 when the electromagnetic radiation emitting module 300 is detached from the housing 200, as shown in FIG. 7A. The circuit board 370 comprises a peripheral edge 371 having a plurality of notches 372 therein. Furthermore, the housing 200 comprises a plurality of protrusions 230 extending from the inner surface 214 of the housing 200 into the cavity 215. When the electromagnetic radiation emitting module 300 is coupled to the housing 200, each of the protrusions 230 nests within one of the notches 372 in the peripheral edge 371 of the circuit board 370. This ensures that the circuit board 370 is properly oriented within the housing 200 when the electromagnetic radiation emitting module 300 is coupled to the housing 200 while also preventing unwanted movement or rotation of the circuit board 370 relative to the housing 200. One or more wires 279 or other electrical conductors extend from the circuit board 370 to the plate member 330 or to the electromagnetic radiation emitting elements 500 to place them into operable coupling.

The main reason for detaching the electromagnetic radiation emitting module 300 from the housing 200 is to replace the batteries 221 of the power source 220 as needed. Thus, when the electromagnetic radiation emitting module 300 is detached from the housing 200, the batteries 221 of the power source 220 are accessible and can be removed from the battery tray 219 and replaced with new batteries.

Furthermore, as seen in FIG. 7A, when the electromagnetic radiation emitting module 300 is detached from the housing 200, a distal portion 254 of the actuator member 251 as well as the contact plate 252 and the contact elements 253 thereon are visible and exposed. The circuit board 370 comprises an aperture 373 through which the distal portion 254 of the actuator member 251 extends when the electromagnetic radiation emitting module 300 is attached to the housing 200. Furthermore, the circuit board 370 comprises contact traces 374 that partially surround the aperture 373. When the electromagnetic radiation emitting module 300 is coupled to the housing 300, the distal portion 254 of the actuator member 251 extends through the aperture 373 in the circuit board 370 and the contact elements 253 of the actuator member 251 contact one or more of the contact traces 374 of the circuit board 370 depending on the position of the actuator member 251 as has been described herein. Thus, the contact elements 253 will contact different ones of the contact traces 374 depending on whether the switch 250 is in the off position, the on position, or the wireless communication position. Due to the manner in which the contact elements 253 contact the contact traces 374, the switch 250 may be described as a self-cleaning lever design.

Figure 8A:
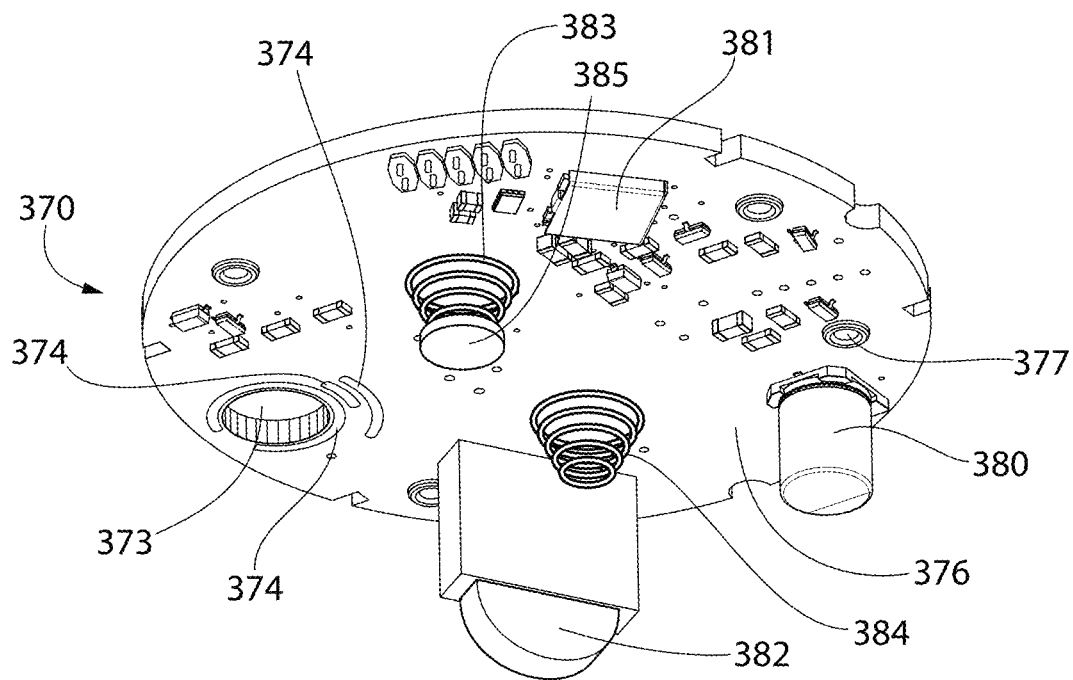
FIGS. 8A and 8B are bottom and top perspective views, respectively, of a circuit board of the visual distress signal device of FIG. 1.
Figure 8B:
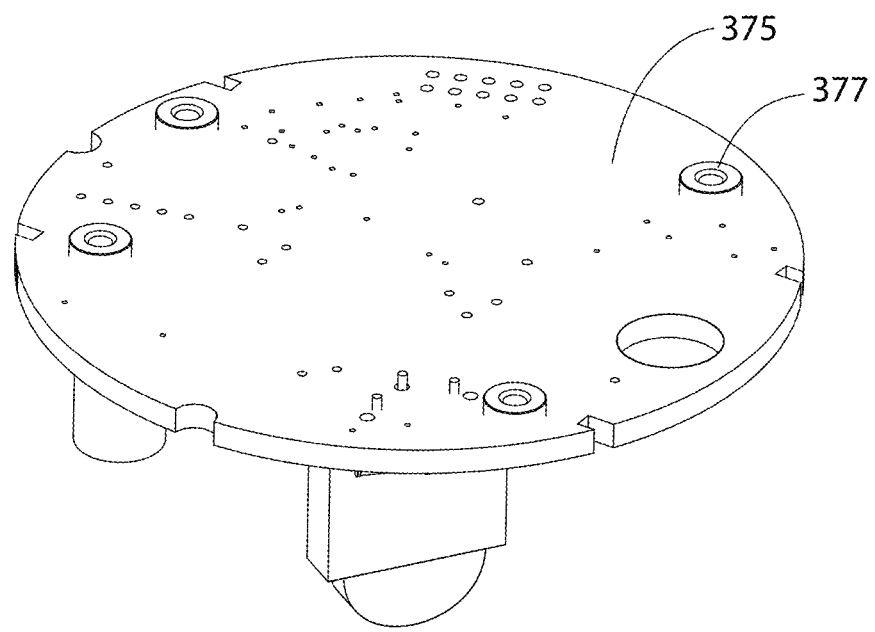

Turning to FIGS. 7B, 8A and 8B, the circuit board 370 will be described in greater detail. The circuit board 370 comprises a top surface 375 and a bottom surface 376 opposite the top surface 375. The circuit board 370 is coupled to the heat transfer member 340 of the heat sink assembly 310 so that the top surface 375 of the circuit board 370 faces the bottom surface 346 of the disc member 344 of the heat transfer member 340. However, as best seen in FIG. 7B, the circuit board 370 is maintained spaced apart from the heat transfer member 340 so that the heat being removed from the system is not transmitted to the circuit board 370, which could damage the circuit board components. Thus, again as best seen in FIG. 7B, one or more spacer members 369 are positioned between the circuit board 370 and the disc member 344 to ensure that the spacing is maintained.

The circuit board 370 may be fixedly coupled to the plate member 330 using one or more fasteners such as screws or the like. Such fasteners or screws will extend through openings 377 that extend through the circuit board 370 from the top surface 375 to the bottom surface 376. Four such openings 377 are shown in the exemplified embodiment, but the exact number of openings 377 can be modified and is not limiting of the invention described herein. Thus, the circuit board 370, the plate member 330, and the heat transfer member 340 are fixedly coupled together so as to be non-movable relative to one another in the exemplified embodiment. The lens member 350 is non-rotatably coupled to the plate member 330 as well so that the circuit board 370, the plate member 330, the heat transfer member 340, and the lens member 350 may form a unit with the components being generally non-detachable from one another.

The electronic and other components of the circuit board 370 are located on the bottom surface 376 of the circuit board 370. The electronic components include a microprocessor 380 and a wireless communication module 381. Furthermore, there are two spring contacts 383, 384 extending from the bottom surface 373 of the circuit board 370 and a coin cell battery 382 coupled to the bottom surface 373 of the circuit board 370. A battery contact member 385 formed from an electrically conducting material may cover the distal end of the spring contact 383 to prevent contact when the batteries are positioned in the battery tray 319 in an improper or inverted orientation. The coin cell battery 382 serves as a backup battery that operates alone or in conjunction with the main power source 220 when the charge of the batteries 221 of the main power source 220 is below a threshold value, as discussed in more detail below with reference to FIG. 18.

In some embodiments, the main power source 220 may power a first electrical function of the visual distress signal device 100 and the second power source (the coin cell battery 382) may power a second electrical function of the visual distress signal device. The main power source 220 may power the electromagnetic radiation emitting elements 500 and the coin cell battery 382 may power the wireless communication module 381 to allow for wireless communication between the visual distress signal device 100 and a mobile device, as described further herein. In some embodiments the main power source 220 may power both the electromagnetic radiation emitting elements 500 and the wireless communication module 381 until a power level of the main power source 220 decrease below a predefined threshold. In other embodiments, the main power source 220 may only power the electromagnetic radiation emitting elements 500 and the coin cell battery 382 may power the wireless communication module 381 as needed.

Figure 16:
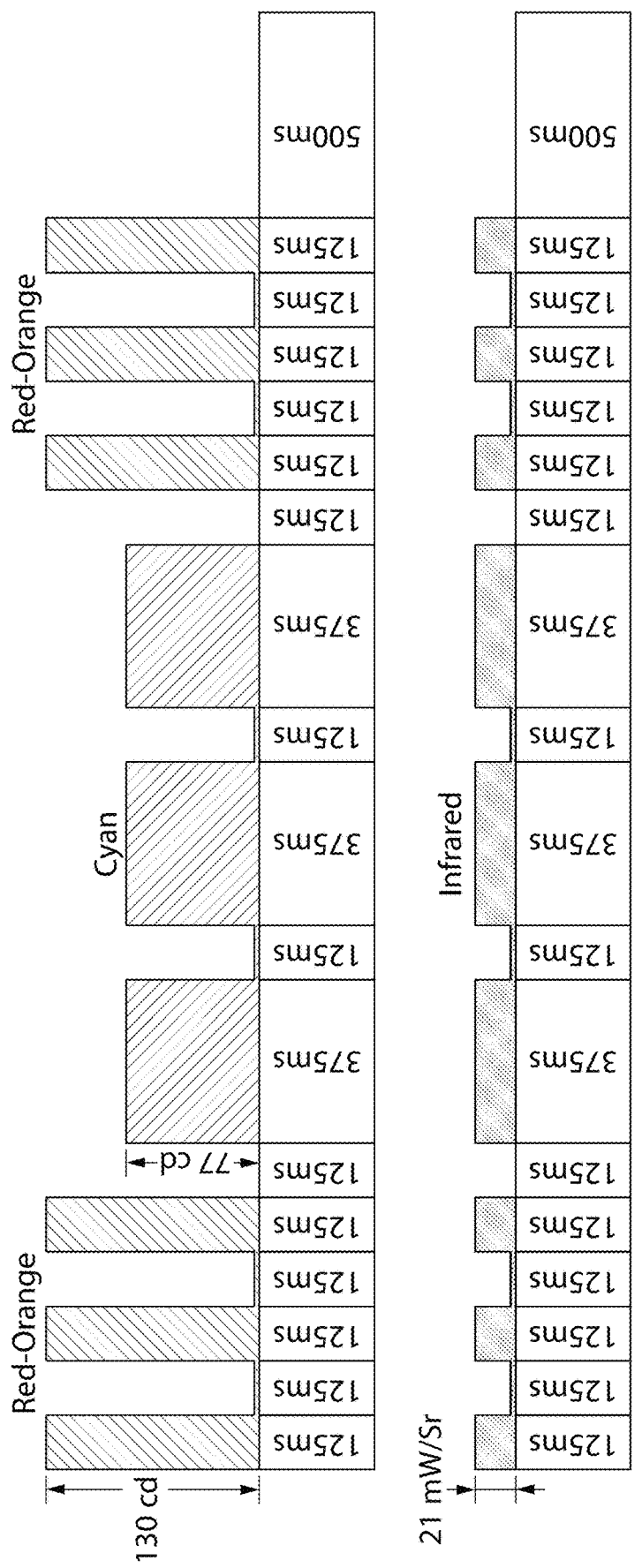
FIG. 16 is a graph illustrating an illumination pattern of the electromagnetic radiation emitting elements when activated.

The microprocessor 380 controls an illumination pattern of the plurality of electromagnetic radiation emitting elements 500 when the visual distress signal device 100 is powered on as described herein (either by being in the "On" state or in the "Wireless Communication State" and controlled by a mobile device). Referring to FIG. 16, the illumination pattern of the electromagnetic radiation emitting elements 500 will be described in accordance with an embodiment of the present invention.

The term illumination pattern, as used herein, refers to a timing or flashing pattern of the various electromagnetic radiation emitting elements 500. Thus, the illumination pattern is the time period that each of the electromagnetic radiation emitting elements 500 is on and off when the visual distress signal device 100 is activated.

In one embodiment, the illumination pattern is a Morse Code S-O-S pattern that can allow bystanders to quickly identify that there is someone in distress. Thus, the illumination pattern may be an SOS pattern that comprises three flashes of the plurality of first light emitters 510 followed by three flashes of the plurality of second light emitters 520 followed by three flashes of the plurality of first light emitters 510, wherein during each flash of the plurality of first light emitters 510 the plurality of first light emitters are activated for a first time period and deactivated for the first time period, and wherein during each flash of the plurality of second light emitters 520 the plurality of second light emitters are activated for a second time period and deactivated for the first time period, the second time period being greater than the first time period. This is shown in the top graph of FIG. 16. The flashes of light described herein can be formed by a single flash of light or a combination of very rapidly repeating flashes that is seen as a single, uniform flash to a viewer. Both will be considered a flash of light as that term is used herein. Thus, within a single flash, the light may turn on and off multiple times, while still being seen as a singular flash to a human eye due to the rapidness of the flashes. Thus, as used herein the term flash refers to a discernable flash, which is a flash that is discernable to the human eye as a singular on/off flash of light, even if the light is flashing on and off multiple times during the on cycle in a way that is not discernable by the human eye.

Specifically, in the exemplified embodiment the plurality of first light emitters 510 (the red-orange light emitters) flash three times such that they are on for 125 ms and then off for 125 ms for each flash. Then, the plurality of second light emitters 520 (the cyan light emitters) flash three times such that they are on for 375 ms and off for 125 ms for each flash. Finally, the plurality of first light emitters 510 (the red-orange light emitters) flash three times such that they are on for 125 ms and off for 125 ms for each flash. This pattern will continue as long as the visual distress signal device is powered on or otherwise activated. Furthermore, between each SOS illumination, all of the light emitters will be off for a third time period which is greater than the first and second time periods, indicated as 500 ms in the exemplified embodiment shown in FIG. 16. For each time period noted, the time period may be a range that is the noted numerical value plus or minus 2 ms in some embodiments. Thus, as used herein, stating for example that the first time period is approximately 125 ms and the second time period is approximately 375 ms and the third time period is approximately 500 ms includes a tolerance of plus or minus 2 ms.

Simultaneously, the infrared light emitter 530 flashes along with each of the red-orange light emitters and each of the cyan light emitters. Thus, the infrared light emitter 530 performs the entire SOS flashing pattern noted above on its own along with the first and second light emitters 510, 520. This is shown in the bottom graph of FIG. 16. The microprocessor 380 contains instructions that enable it to ensure that the various electromagnetic radiation emitting elements 500 activate/deactivate (i.e., flash) in accordance with the aforementioned SOS illumination pattern. Of course, other illumination patterns may be possible in alternative embodiments. In some embodiments, a user may be able to modify the illumination pattern either directly on the visual distress signal device 100 or through a software application on a mobile device. However, the SOS flashing pattern is a universally understood distress signal so there are advantages to using the SOS flashing pattern described herein for purposes of alerting others to a person in distress.

To reiterate, in the exemplified embodiment there are 6 Orange-Red LEDs in series (the first light emitters 510), 6 Cyan LEDs in series (the second light emitters 520), and an infrared LED (the infrared light emitter 530). The LEDs are flashed in a Morse Code "SOS" pattern. For the "S" component, the string of Orange-Red LEDs are flashed on and off for three times (125 mS on and 125 mS off for each flash). For the "O" component, the string of Cyan LEDs are flashed on and off for three times (375 mS on and 125 mS off for each flash). The Infrared LED is on at any time another LED is on; it flashes the full "SOS" pattern.

Although in the exemplified embodiment the illumination pattern is an SOS pattern, the invention is not to be so limited in all embodiments and other illumination patterns may be used in other embodiments. One benefit of the SOS illumination pattern is that it is a well known universal distress signal. However, it is possible that other flashing or illumination patterns may work to signal distress just as well, and thus in its broadest sense the invention is not intended to be limited to any particular illumination pattern for the electromagnetic radiation emitting elements 500.

With each flash of the electromagnetic radiation emitting elements 500, a hemispherical pattern of light is emitted from the visual distress signal device 300. Light emitting diodes have a particular angular distribution of light, and this in combination with the slope of the lens member 350 and the placement and relationship of the light emitting diodes to the lens member 350 ensure that this hemispherical distribution of light is achieved. That is, the first light emitters 510 collectively emit a hemispherical distribution of light, the second light emitters 520 collectively emit a hemispherical distribution of light, and the third light emitter 530 emits a hemispherical distribution of light.

In some embodiments, the LEDs being used as the electromagnetic radiation emitting elements have a particular angular distribution of light, that, when used in the number disclosed herein and in conjunction with the lens member or optic 350, results in the hemispherical distribution of light. In some embodiments, the first light emitters 510 may have an angular distribution or viewing angle of between 160° and 165°, and more specifically 162°. In some embodiments, the second light emitters 520 may have an angular distribution of viewing angle of between 167 and 173°, or more specifically 170°. In some embodiments, the third light emitters 530 may have an angular distribution or viewing angle of between 147° and 153°, and more specifically approximately 150°. In some embodiments, it is a combination of the number of each of the first, second, and third light emitters 510, 520, 530, the arrangement of the first, second, and third light emitters 510, 520, 530, the position of the first, second, and third light emitters 510, 520 530 with respect to the lens member 350, and the angular distribution of light associated with each of the first, second, and third light emitters 510, 520, 530 which allows the device to emit light in the hemispherical pattern In some exemplified embodiment, the infrared light emitter 530 emits light in a 120 degree distribution and is sufficiently bright on its own that only a single infrared light emitting diode positioned centrally (i.e., in alignment with a central axis of the lens member 350) may be used in some embodiments. In order for each color of light emitters to make a hemispherical distribution of light, each of the LEDs needs to emit the light in a certain distribution angle, be placed in a ring of a certain diameter, and have an optic (lens member 350) that spreads out the light appropriately.

As noted, the first and second light emitters 510, 520 are arranged in a circle and are alternating along the circle (i.e., each first light emitter 510 is adjacent to two of the second light emitters 520 and each second light emitter 520 is adjacent to two of the first light emitters 510. In the exemplified embodiment, there are three of the first light emitters 510 which emit light in a first color (e.g., orange-red) and three of the second light emitters 520 which emit light in a second color (e.g., cyan). In order for the first light emitters 510 to emit a hemispherical distribution of the first color and for the second light emitters 520 to emit a hemispherical distribution of the second color, each of the light emitters 510, 520 (which, in the exemplified embodiment are light emitting diodes) should emit the light in a certain distribution angle, be placed in a ring of a certain diameter, and have an optic (which, in the exemplified embodiment, is the lens member 350) that spreads the light out appropriately.

In one particular embodiment, the electromagnetic radiation emitting elements 500 may be positioned within the pocket 360 of the lens member 350 beneath the convex portion 362 which forms the roof of the pocket 360. The electromagnetic radiation emitting elements 500 may be positioned in a circle having a diameter, measured from a centerpoint of the electromagnetic radiation emitting elements 500, of between 0.5 and 0.7 inches, and more specifically between 0.55 and 0.65 inches, and more specifically between 0.6 and 0.65 inches, and still more specifically approximately 0.63 inches (with the term approximately including a tolerance of plus or minus 5%). Stated another way, the lens member 350 may comprise an axis, a radius measured from the axis of the lens member 350 to a centerpoint of each (or any) of the plurality of electromagnetic radiation emitting elements 500 may be between 0.3 and 0.33 inches, or more specifically approximately 0.315 inches.

FIG. 9 is a cross-sectional view of the visual distress signal device 100 which illustrates the interaction between the contact elements 253 of the contact plate 252 of the switch 250 and the contact traces 374 of the circuit board 370. As mentioned previously, the distal portion 254 of the actuator member 251 extends through the aperture 373 in the circuit board 370. Furthermore, the contact elements 253 on the contact plate 252 contact the contact traces 374 of the circuit board 370. The position of the actuator member 251 dictates which of the contact traces 374 of the circuit board 370 are contact by the contact elements 253 of the contact plate 252, which determines the mode in which the visual distress signal device is in (i.e., on, off, wireless). This is because the contact plate 252 is coupled to the actuator member 251 so movement of the actuator member 251 also causes the contact plate 252 and hence the contact elements 253 thereon to move. This movement of the actuator member 251 brings the contact elements 253 into and out of contact with the different contact traces 374 of the circuit board 370 to alter the mode in which it is operating. Furthermore, the contact between the contact elements 253 and the contact traces 374 provides a self-cleaning operation prevent contaminates from gathering on the contact traces 374 which could prevent an acceptable contact between the contact elements 253 and the contact traces 374.

As shown in FIG. 9, the distal portion 254 of the actuator member 251 extends through the aperture 373 in the circuit board 370 and also through an aperture 379 in the disc member 344 of the heat transfer member 340 of the heat sink 311. Thus, the aperture 379 in the disc member 344 is aligned with the aperture 373 in the circuit board 370 to achieve this. So, it is necessary to ensure that the circuit board 370 is non-rotatable relative to the disc member 344 in some embodiments so that the apertures 373, 379 remain aligned. This is achieved due to the coupling between the circuit board 370 and the heat sink assembly 310 as has been described above. As also seen in FIG. 9, the distal portion 254 of the actuator member 251 extends beyond the distal end 202 of the housing 200.

Figure 10:
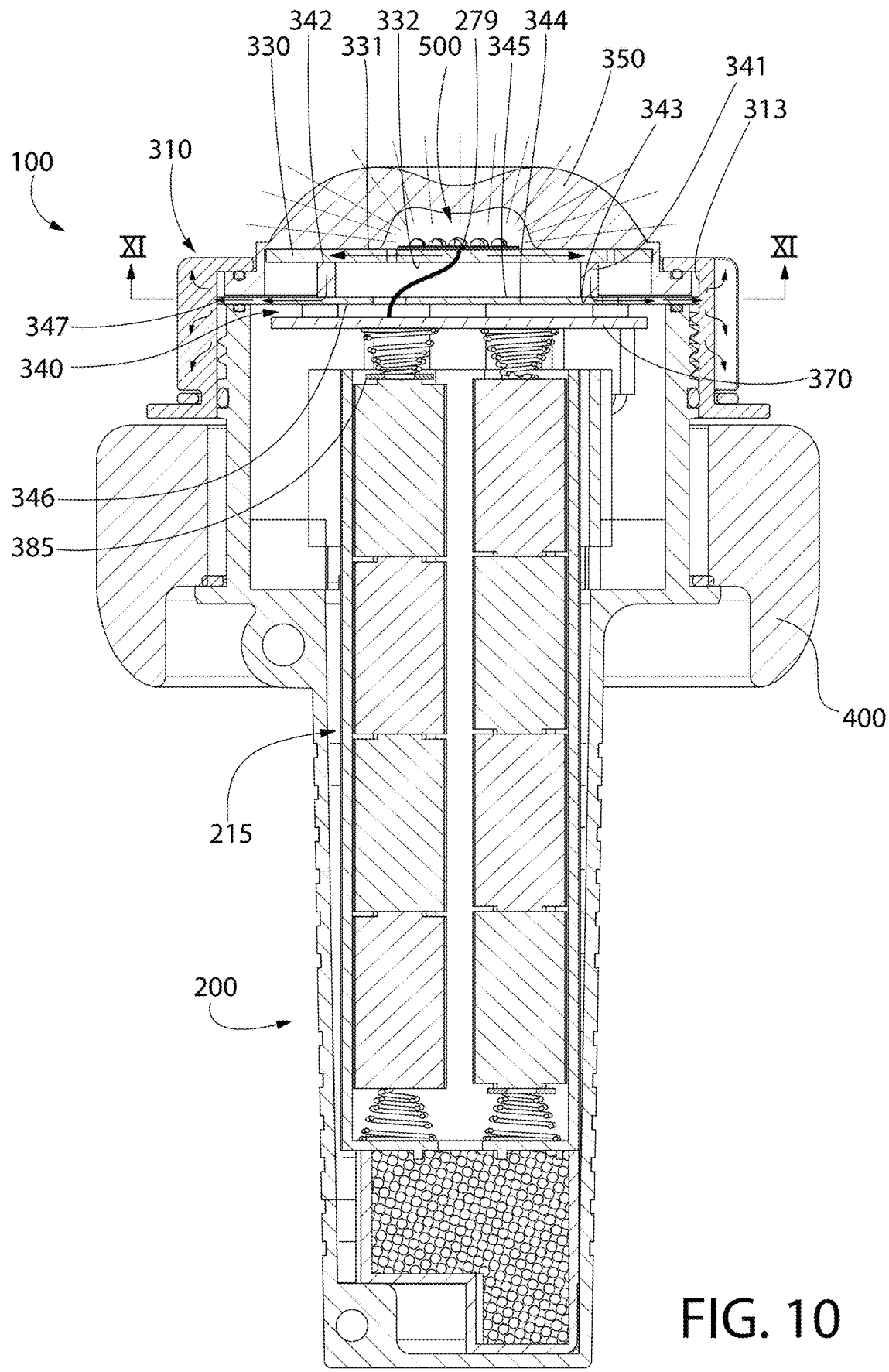
FIG. 10 is the cross-sectional view taken along line VII-VII of FIG. 6 with the electromagnetic radiation emitting module attached to the housing and illustrating heat being passively removed from an interior of the visual distress signal device.
Figure 11:
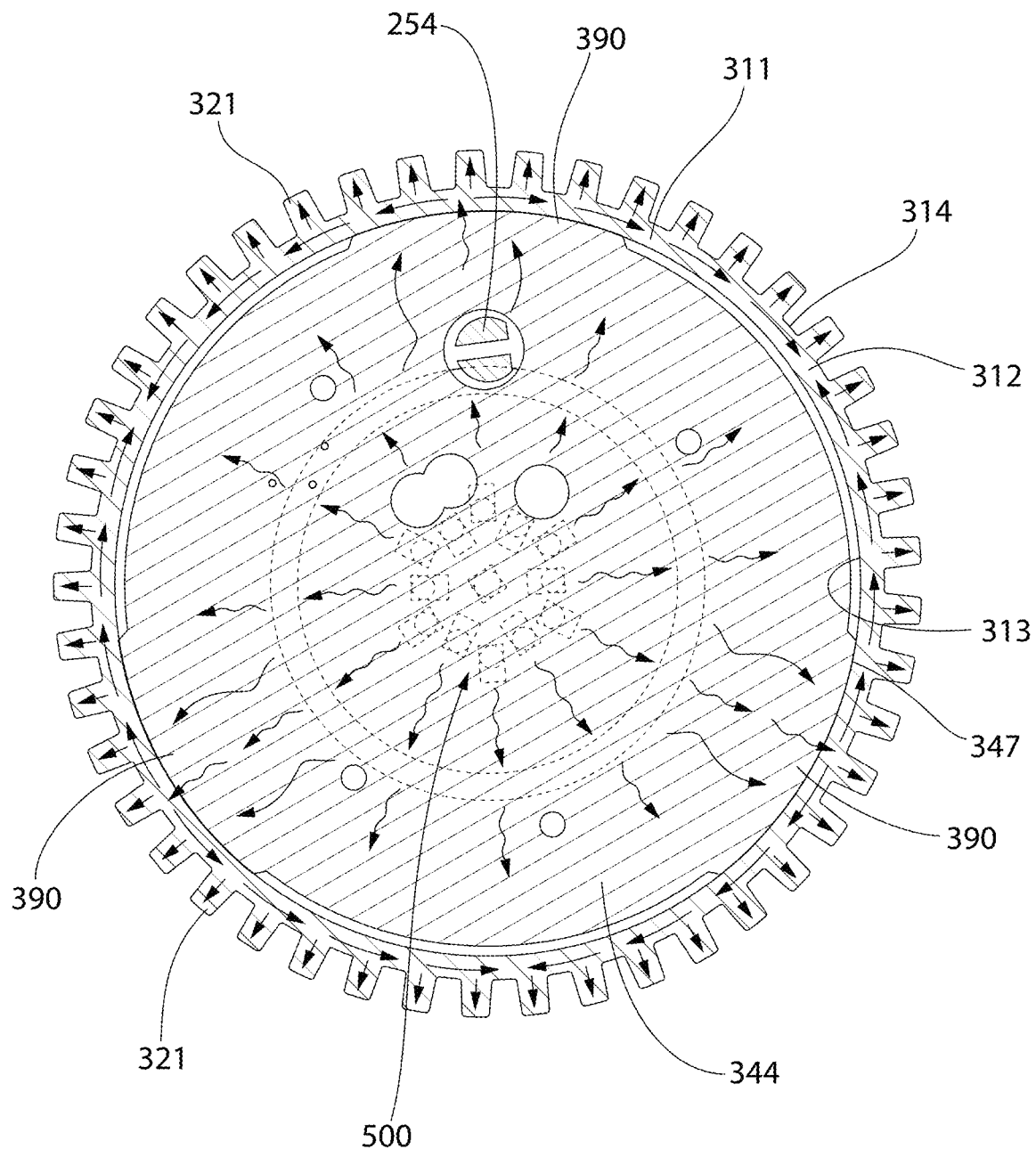
FIG. 11 is a cross-sectional view taken along line XI-XI of FIG. 10.

Referring to FIGS. 10 and 11, the operation of the heat sink assembly 311 will be described. The arrows provided in FIGS. 10 and 11 illustrate the passive removal of the heat generated by the electromagnetic radiation emitting elements 500 using the heat sink assembly 311. Before discussing the passive removal of the heat, FIG. 11 illustrates a view of the disc member 344 of the heat transfer member 340. As noted the disc member 344 includes a peripheral edge 347 which is an outermost edge of the disc member 344 extending between the top and bottom surfaces 345, 346 of the disc member 344. The disc member 344 comprises a plurality of radial protrusions 390 which are arranged in a circumferentially spaced apart manner, the ends of which form portions of the peripheral edge 347 of the disc member 344.

The radial protrusions 390 may facilitate the coupling of the light module 399 (labeled in FIG. 4) to the collar 311. As noted previously, the collar 311 comprises threads 317 on its inner surface 313. The threads 317 are arranged in a circumferentially spaced apart manner so that there are gaps in the threads 317. Stated another way, the threads 317 comprises a plurality of sets of threads that are arranged in a circumferentially spaced apart manner. To couple the light module 399 to the collar 311, the light module 399 is positioned within the interior of the collar 311 with the radial protrusions (or tabs) 390 aligned with the gaps between the threads 317. If the radial protrusions 390 are aligned with the threads 317, the light module 399 cannot be inserted past the threads 317 because the internal diameter of the collar 311 at the threads 317 is smaller than the outside diameter of the disc member 344 taken at the radial protrusions 390. However, by aligning the radial protrusions 390 with the gaps between the threads 317, the disc member 344 can fit into the interior of the collar 311. Once the light module 399 is fully disposed within the collar 311, the light module 399 can be rotated a small degree so that the radial protrusions 390 become aligned with the threads 317, which will prevent the light module 399 from being detached from the collar 311.

Thus, at this point, the light module 399 and the collar 311 are coupled together to form the electromagnetic radiation emitting module 300, in which all components are maintained coupled together to facilitate heat transfer as described herein while also enabling opening and closing of the housing 200 as needed to check on and/or change batteries and for other maintenance. Moreover, for purposes of facilitating heat transfer, as shown in FIG. 11, the distal ends of the radial protrusions 390 are in contact with the inner surface 313 of the collar 311 to transfer heat passively from the disc member 344 to the collar 311.

As noted previously and repeated here, the electromagnetic radiation emitting elements 500 are supported by the top surface 331 of the plate member 330. The top surface 342 of the ring member 341 (which forms the top surface of the heat transfer member 340) is in contact with the bottom surface 332 of the plate member 330. The top surface 345 of the disc member 344 is in contact with the bottom surface 343 of the ring member 341. The peripheral surface 347 of the disc member 344 is in contact with the inner surface 313 of the collar 311. The outer surface 314 of the collar 311 is exposed to the ambient environment, such as the natural air which serves as a cooling medium.

Thus, as the electromagnetic radiation emitting elements 500 are activated to generate electromagnetic radiation, they also generate heat. The heat generated by the electromagnetic radiation emitting elements 500 flows to the plate member 330, then to the ring member 341, then to the disc member 344, and from the disc member 344 to the collar 311 due to the direct contact between the disc member 344 and the collar 311. Specifically, the radiation protrusions 390 direction contact the inner surface 313 of the collar 311 so that heat can be transmitted from the disc member 344 to the collar 311. Because the collar 311 is in direct contact with the ambient environment (which is undoubtedly cooler than the collar 311 which has heated up due to the heat generated by the electromagnetic radiation emitting elements 500 to a temperature that could be around 140° F.), the ambient environment cools the collar 311 and removes the heat therefrom, thereby also removing the heat from the visual distress signal device 100. In this manner, the electromagnetic radiation emitting module 300 both seals the cavity 215 of the housing 200 in a hermetic manner and forms a passive heat sink to remove heat generated by the electromagnetic radiation emitting elements 500.

In the exemplified embodiment, the heat transfer member 340 is used to transfer the heat conductively from the plate member 330 to the collar 311. However, in other embodiments it may be possible to omit the heat transfer member 340. Specifically, the plate member 330 may be connected or coupled directly to the collar 311. For example, the lens member 350 may have an opening in its sidewall through which the plate member 330 may extend so that the plate member 330 can be in direct physical contact with the inner surface 313 of the collar 311. Thus, this may serve as an alternative to the exemplified embodiment whereby the plate member 330 is in direct physical contact with the heat transfer member 340 which is in turn in direct physical contact with the collar 311 as has been described herein.

In the description above, the peripheral edge 347 of the disc member 344 of the heat transfer member 340 is in contact with the inner surface 313 of the collar 311 to achieve the heat conduction from the heat transfer member 340 to the collar 311. However, the invention is not to be so limited in all embodiments. In some embodiments, the peripheral edge 347 of the disc member 344 may be spaced slightly inwardly of the inner surface 313 of the collar 311 so that the peripheral edge 347 of the disc member 344 does not contact the inner surface 313 of the collar 311. In such embodiments, the bottom surface 346 of the disc member 344 (which is the bottom surface of the heat transfer member 340) may rest atop and therefor contact the threads 317 of the collar 311 to achieve the intimate physical contact between the heat transfer member 344 and the collar 311. In still other embodiments, the bottom surface 346 of the disc member 344 may contact the threads 317 of the collar 311 and the peripheral edge 347 may also contact the inner surface 313 of the collar 311 to achieve the necessary contact between the heat transfer member 340 and the collar 311 so that heat conduction can occur. In either case, the disc member 344 of the heat transfer member 340 is in intimate physical contact with the collar 311 for purposes of achieving the transfer of the heat away from the device.

Figure 12:
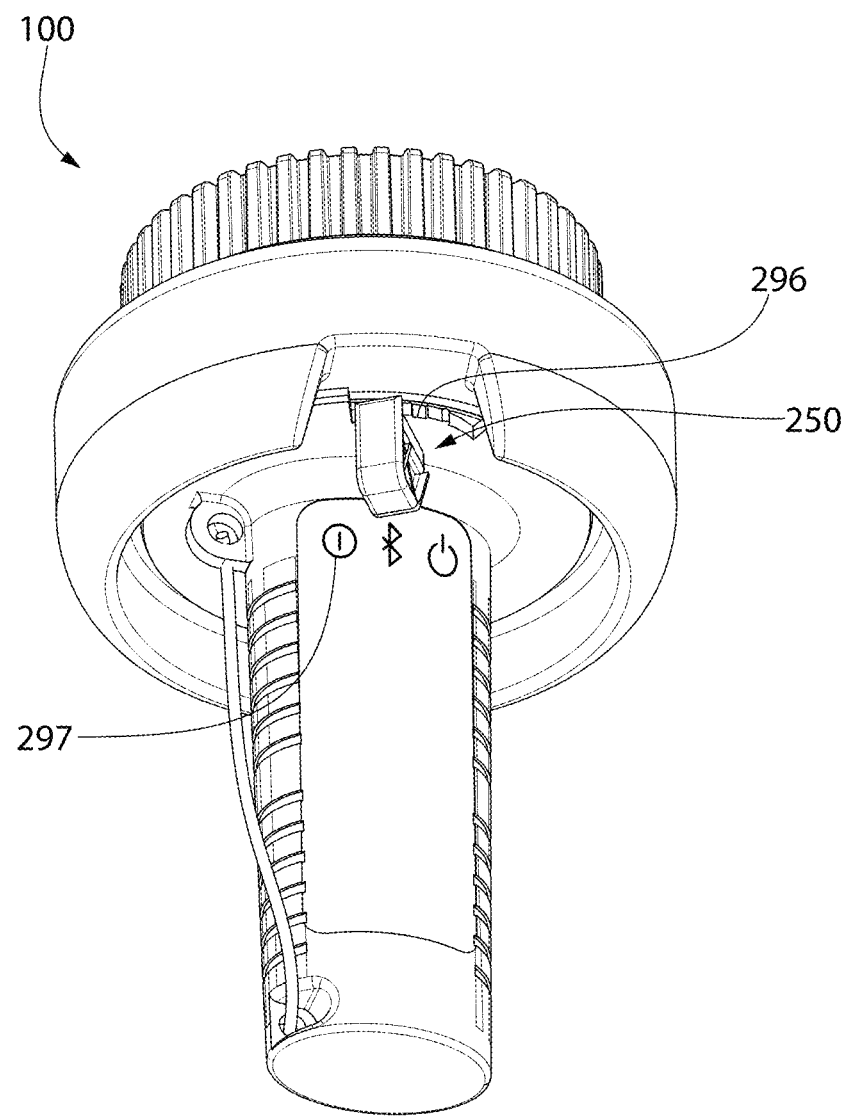
FIG. 12 is a perspective view of the visual distress signal device with a switch thereof in an off position and electromagnetic radiation emitting elements thereof deactivated.
Figure 13:
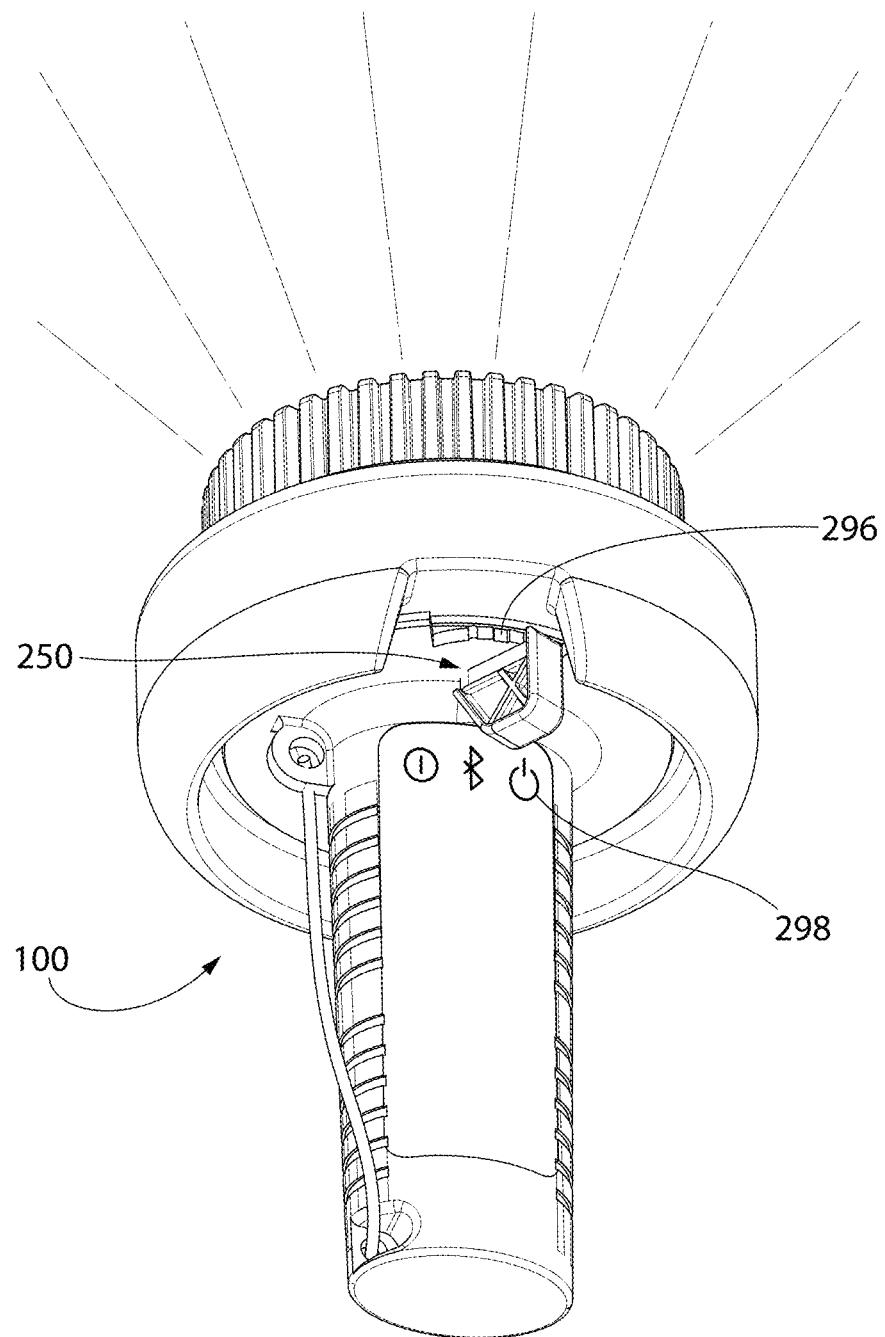
FIG. 13 is a perspective view of the visual distress signal device with the switch thereof in an on position and the electromagnetic radiation emitting elements thereof activated.
Figure 14:
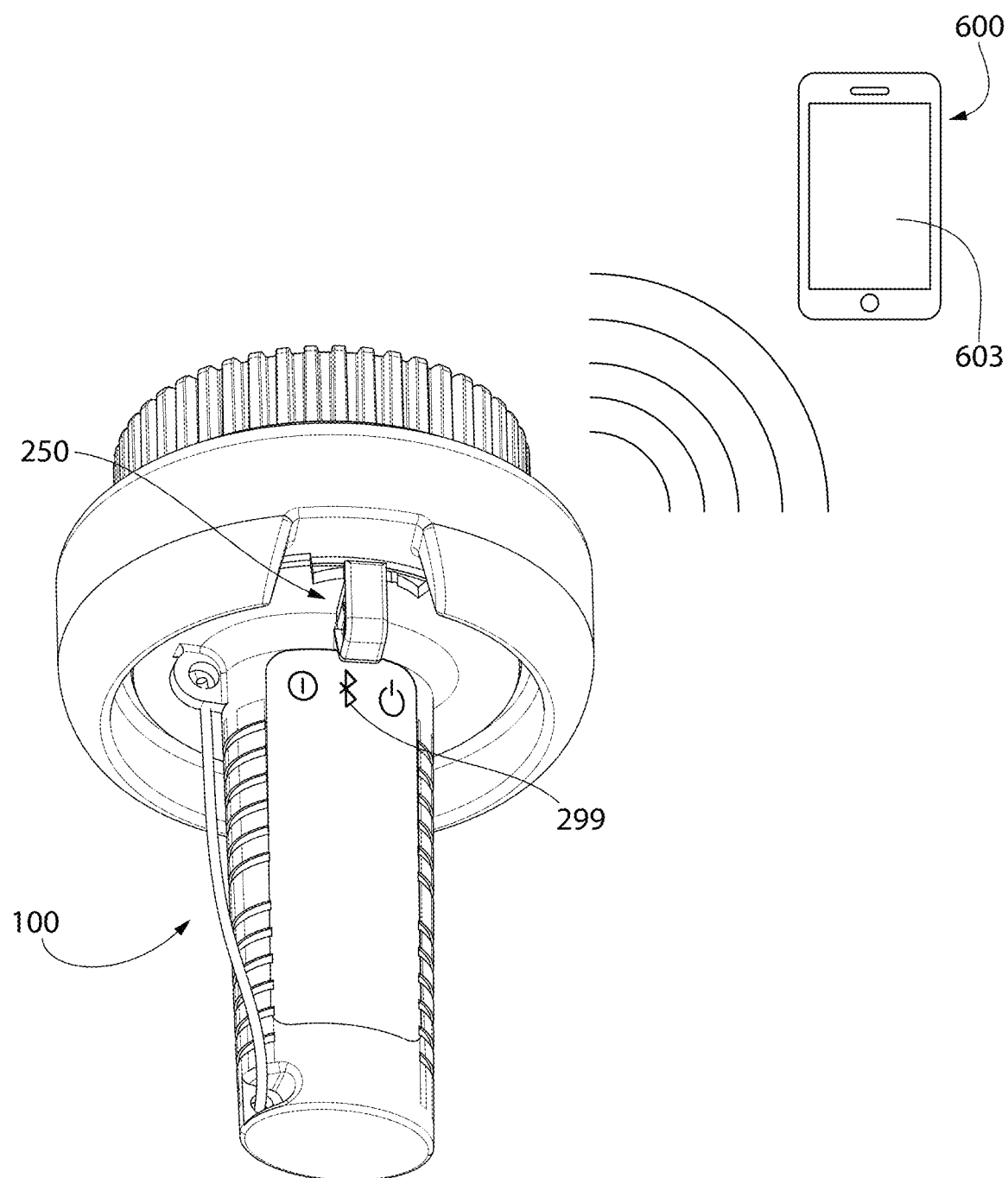
FIG. 14 is a perspective view of the visual distress signal device with the switch thereof in a wireless communication position and the visual distress signal device in wireless communication with a mobile device.

Referring to FIGS. 12-14, the various modes of the visual distress signal device will be described. As noted above, the switch 250 is alterable between: (1) an off position 297 (FIG. 12) whereby power is not transmitted from the power source 220 to the electromagnetic radiation emitting elements 500 so that the electromagnetic radiation emitting elements 500 do not generate electromagnetic radiation; (2) an on position 298 (FIG. 13) whereby power is transmitted from the power source 220 to the electromagnetic radiation emitting elements 500 so that the electromagnetic radiation emitting elements generate electromagnetic radiation in accordance with an illumination pattern; and (3) a wireless communication position 299 (FIG. 14) whereby the visual distress signal device 100 is configured to be coupled to a mobile device 600 so that the mobile device 600 controls activation and deactivation of the electromagnetic radiation emitting elements 500.

The off and on states 297 and 298 are reasonably self-explanatory. When the switch 250 is in the off position 297 power from the power source 220 does not transmit to the electromagnetic radiation emitting elements 500. As a result, the electromagnetic radiation emitting elements 500 do not generate any electromagnetic radiation and the device remains off. When the switch 250 is in the on position 297, power from the power source 220 is transmitted to the electromagnetic radiation emitting elements 500. As a result, the electromagnetic radiation emitting elements 500 generate electromagnetic radiation in accordance with a pre-defined illumination pattern. One such illumination pattern is that which is shown graphically in FIG. 16 which has been described above (the SOS flashing pattern).

In the exemplified embodiment, the wireless communication position 299 is between the on and off positions 297, 298. Furthermore, the housing 200 includes a detent 296 located along the wireless communication position 299 which engages a locking protrusion 259 (see FIG. 9) of the actuator member 251 when the actuator member 251 is in the wireless communication position 299. To reiterate, the detent 296 is formed into the housing 200 itself, and the locking protrusion 259 is formed into the actuator member 251. Thus, an additional force is required to alter the device from the off state or the wireless communication state into the on state. This serves as an additional safety feature to ensure that the device is not turned on unless there is a true emergency situation. Stated another way, the interaction between the detent 296 and the locking protrusion 259 prevents accidental activation of the visual distress signal device 100.

Referring to FIG. 14, when the switch 250 is in the wireless communication position 299, the visual distress signal device 100 can be placed into operable communication with the mobile device 600. The mobile device 600 can then be used to alter the visual distress signal device 100 between an "on" state (i.e., not emitting electromagnetic radiation) and an "off" state (i.e., emitting electromagnetic radiation).

Figure 15:
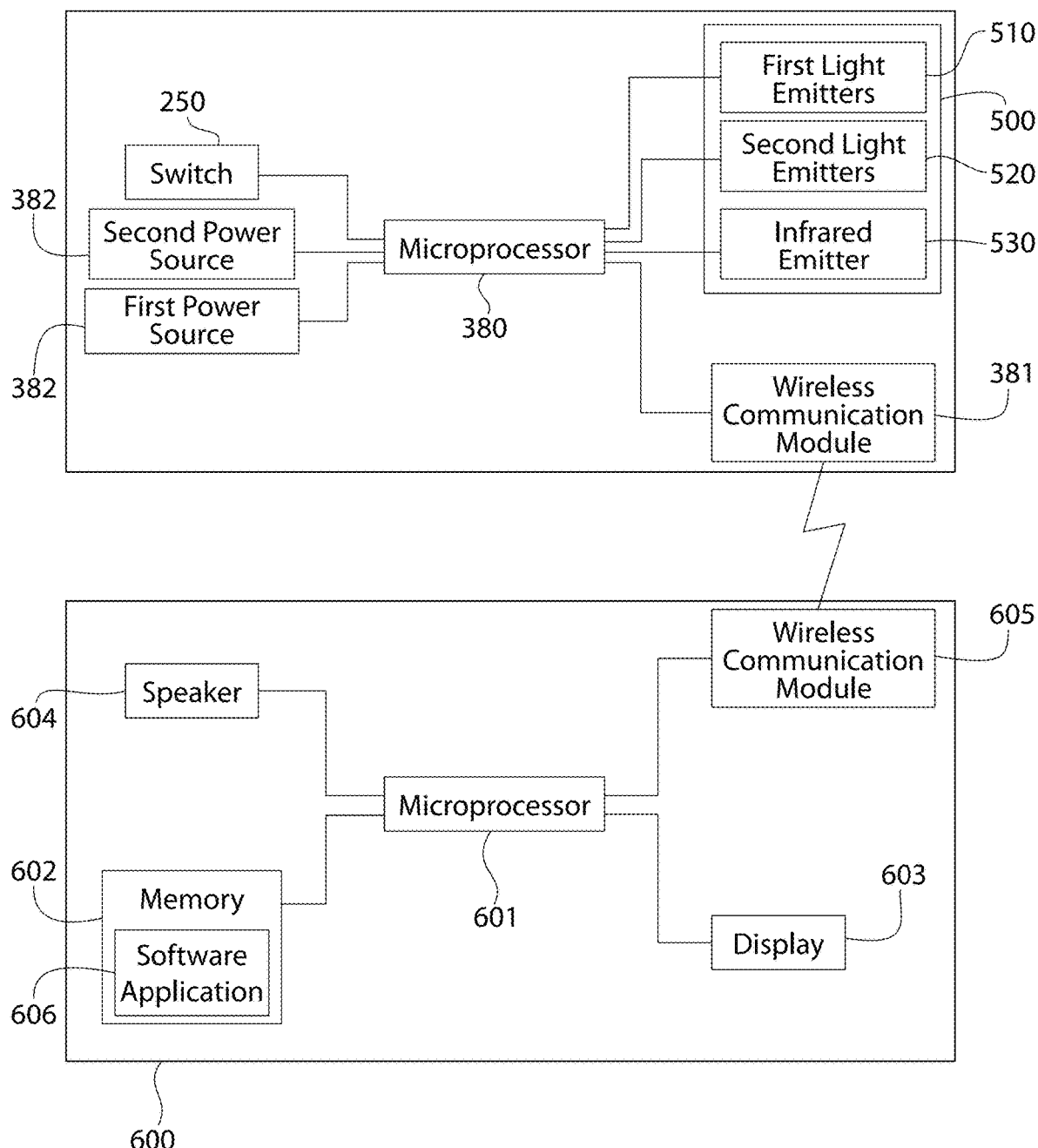
FIG. 15 is a schematic diagram of the electronic components of the visual distress signal device and the mobile device of FIG. 14.

Referring to FIGS. 14 and 15 concurrently, the communication between the visual distress signal device 100 and the mobile device 600 will be described in greater detail. As has been described in detail above, the visual distress signal device 100 comprises an electric circuit that includes the switch 250, the first power source 220, the second power source (the coin cell battery 382), the microprocessor 380, the electromagnetic radiation emitting elements 500 which includes the first light emitters 510, the second light emitters 520, and the infrared light emitter 530, and the wireless communication module 381. Each of these components of the electrical circuit are operably coupled together, which in the exemplified embodiment is shown by each component being coupled to the microprocessor 380.

The mobile device 600 includes a microprocessor 601, a memory 602, a display (such as a user interface) 603, a speaker 604, and a wireless communication module 605 which are operably coupled together, shown in the exemplified embodiment by each component being coupled to the microprocessor 601. In the exemplified embodiment, the memory contains a software application 606. The software application 606 can be downloaded onto the mobile device 600 using conventional techniques, such as by initiating an app store within the mobile device 600 and conducting a search for the desired software application 606. The software application 606 is associated with the visual distress signal device 100 such that it is intended and configured to be used to control the visual distress signal device 100 when the visual distress signal device 100 is in the wireless communication mode described herein. The software application 606 may, in some embodiments be a smartphone application. In other embodiments, the software application 606 can be any program for carrying out the functions described herein, including programs running on a laptop or desktop computer.

The mobile device 600 may include smartphones, tablets, laptops, smart watches, e-readers, handheld gaming consoles, personal digital assistants, or the like in various different embodiments. The mobile device 600 may be any electronic device separate and apart from the visual distress signal device 100 that can be used to control activation of the visual distress signal device 100 when wireless coupled thereto.

In the exemplified embodiment, the wires communication modules 381, 605 are Bluetooth modules that enable the mobile device 600 to be in operable communication with the visual distress signal device 100 via Bluetooth connection. Of course, the invention is not to be limited by the wireless communication being via Bluetooth, and other types of wireless communication can be used in alternative embodiments, such as ZigBee, WiFi, BLE, Z-Wave, NFC, satellite, and the like, including wireless communication technologies now known and later developed. As shown in FIGS. 14 and 15, when the visual distress signal device 100 is in the wireless communication mode 299, the mobile device 600 can be wirelessly connected to the visual distress signal device 100 due to communication between the wireless communication module 381, 605. In some instances, this requires the mobile device 600 to be within a predetermined distance from the visual distress signal device 100, such as within 5 feet, 10 feet, 15, feet, 20 feet, 30 feet, or the like. In some embodiments, when the mobile device 600 is within a predetermined distance from the visual distress signal device 100 and the visual distress signal device 100 is in the wireless communication mode 299, a connection between the mobile device 600 and the visual distress signal device 100 may be automatically created.

In some instances, the mobile device 600 will not wirelessly connect to the visual distress signal device 100 until the software application 606 is initiated. This can be achieved by a user selecting, pressing, or clicking on an icon on the display screen or user interface 603 of the mobile device 600. Specifically, as is well understood, upon downloading a software application onto a mobile device, an icon representative of that software application is provided on the user interface of the mobile device 600. Thus, the user can select the software application 606 (typically by making contact with the location of the icon representative of the software application 606 on the user interface/display 603 of the mobile device 600) to launch the software application 606 on the mobile device 100. When the mobile device 600 is wirelessly connected to the visual distress signal device 100 as described herein and the software application 606 is launched, a user can select features on the software application 606 to power the electromagnetic radiation emitting elements 500 of the visual distress signal device 100 on and off. Additional details of this functionality and a discussion of additional functionalities and operation of the software application 606 and the manner in which it allows for remote/wireless engagement between the mobile device 600 and the visual distress signal device 100 will be described below with reference to FIGS. 19-27.

Figure 17:
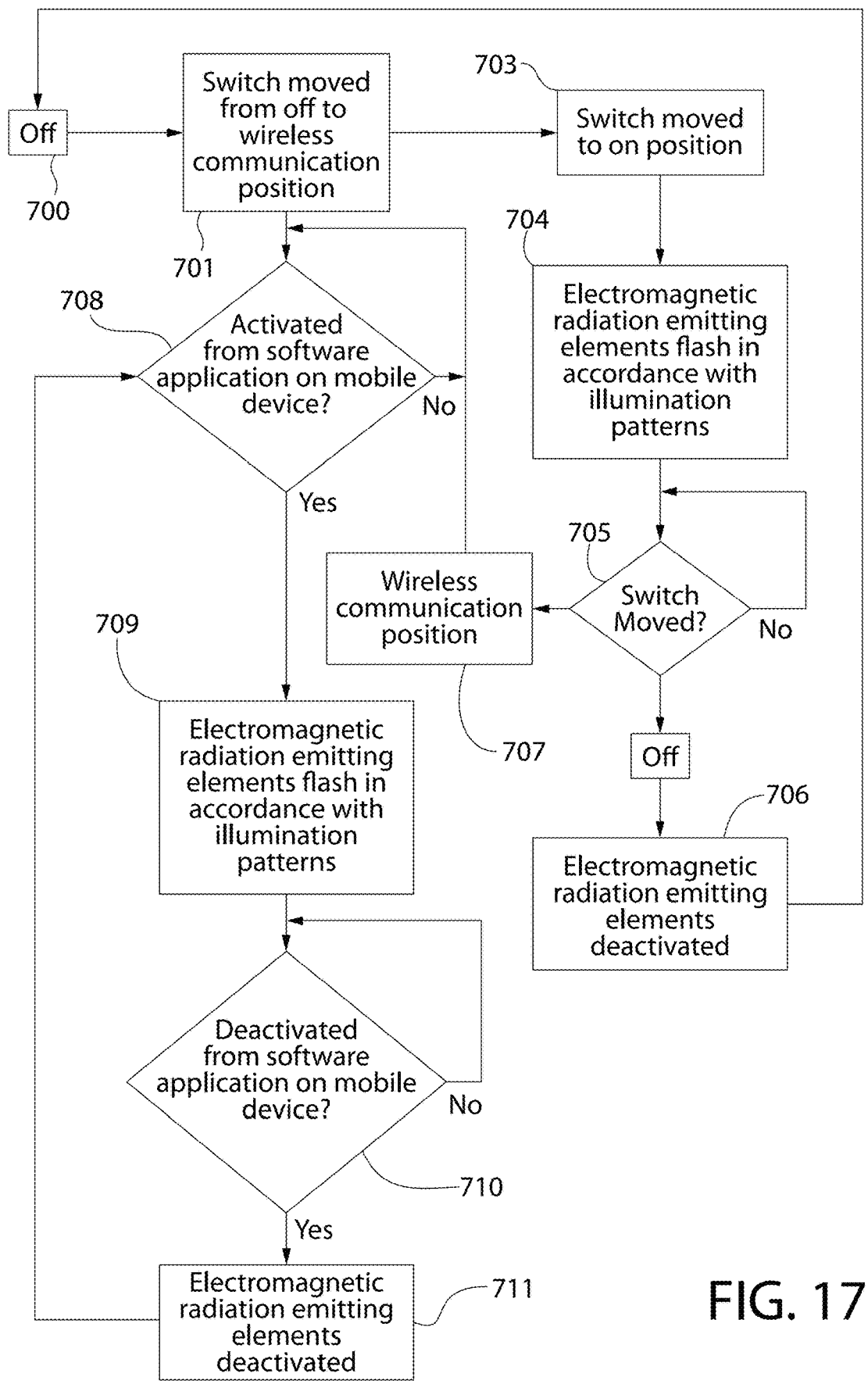
FIG. 17 is a flow chart illustrating the operation of the visual distress signal device of FIG. 1.

Before discussing the software application 606 and its function/operation in more detail, a discussion of the operation of the visual distress signal device 100 will be had with reference to the flow chart provided in FIG. 17. The discussion of the operation of the visual distress signal device 100 includes operation in all of the modes discussed herein including the wireless communication mode.

First, at step 700, the visual distress signal device 100 is off. As noted above, the wireless communication position 299 of the switch 250 is located between the off position 297 and the on position 298. Thus, upon a user beginning to actuate the switch 250 away from the off position 297, the switch 250 will first enter into the wireless communication position 299. Thus, at step 701, the switch 250 has been moved from the off position 297 to the wireless communication position 299. Next, at step 702, the switch 250 has been actuated from the wireless communication position 299 to the on position 298 (which may also be referred to as a manual operating position). Of course, depending on the structural arrangement of the different operating positions, it may be possible in other embodiments to alter the switch 250 directly form the off position 297 to the on position 298 without first passing over the wireless communication position 299.

Upon the switch 250 being altered into the on position 298 at step 703, the operation moves to step 704 during which the electromagnetic radiation emitting elements 500 flash in accordance with the illumination pattern previously described and shown in FIG. 16. Thus, immediately upon transitioning the switch 250 into the on position 298, the microprocessor 380 causes the electromagnetic radiation emitting elements 500 to flash as described above (preferably in an SOS pattern as described above, although other flashing patterns or sequences may be used).

Next, at step 705, the microprocessor 380 determines whether the switch 250 has been actuated from the on position 298 to either the off position 297 or the wireless communication position 299. If the switch 250 has not been actuated at step 705, the microprocessor 380 continues to instruct the electromagnetic radiation emitting elements 500 to flash in accordance with the illumination pattern while continuing to check whether the switch 250 has been actuated.

If at step 705 the microprocessor 380 determines that the switch 250 has been actuated to the off position 297, the electromagnetic radiation emitting elements 500 are deactivated and they no longer emit any electromagnetic radiation, as indicated at step 706.

If at step 705 the microprocessor 380 determines that the switch 250 has been actuated to the wireless communication position 299, the operation moves to step 708. The operation also moves to step 708 if the switch 250 is actuated directly from the off position 297 to the wireless communication position 299 at step 701 without being actuated again immediately to the on position 298. In either situation, when the switch 250 is in the wireless communication position 299, the operation moves to step 708 whereby the microprocessor 280 determines whether the visual distress signal device 100 and/or the electromagnetic radiation emitting elements 500 thereof have been activated by the software application 606 on the mobile device 600. Again, this process will be described in some more detail below with reference to FIGS. 19 and 20, but generally it involves a user launching the software application 606 on the mobile device 600 and then pressing, selecting, or clicking on the user interface/display 603 of the mobile device 600 to activate and deactivate the electromagnetic radiation emitting elements 500.

If it is determined at step 708 that the software application 606 on the mobile device 600 has not activated the electromagnetic radiation emitting elements 500 and the switch 250 remains in the wireless communication position 299, the electromagnetic radiation emitting elements 500 will remain deactivated. If it is determined at step 708 that the software application 606 on the mobile device 600 has activated the electromagnetic radiation emitting elements 500, the operation moves to step 709. At step 709, the mobile device 600 has launched the software application 606, the mobile device 600 is in wireless communication with the visual distress signal device 100 (via Bluetooth or the like as described previously), and the mobile device 600 (via the software application 606) has been used to activate the electromagnetic radiation emitting elements 500.

Next, at step 710, with the switch 250 still in the wireless communication position 299, the visual distress signal device 100 in operable communication with the mobile device 600, and the electromagnetic radiation emitting elements 500 activated in accordance with the illumination pattern, the microprocessor 380 determines whether the electromagnetic radiation emitting elements 500 have been deactivated with the software application 606 on the mobile device 600. This will be described in more detail with regard to FIG. 20, but this is achieved by a user selecting, pressing, clicking, or the like an icon or button on the display 603 of the mobile device 600 associated with the deactivation of the electromagnetic radiation emitting elements 500. If the answer is "no," the electromagnetic radiation emitting elements 500 remain in the activated state such that they emit electromagnetic radiation in accordance with the illumination pattern, as shown. If the answer is 'yes," the electromagnetic radiation emitting elements 500 become deactivated and stop flashing as indicated at step 711.

At this point, the mobile device 600 remains in operable communication with the visual distress signal device 100, but the electromagnetic radiation emitting elements 500 have been altered from the activated/on state to the deactivated/off state. At this point, the operation returns to step 708 to again determine whether the electromagnetic radiation emitting elements 500 are activated from the software application 606 on the mobile device 600. Furthermore, if after step 711 the switch 250 is altered into the "off" position 297, the operation moves to step 706 and/or step 700 and continues from there as described above. If after step 711 the switch 250 is altered into the "on" position 298, the operation moves to step 703 and continues from there as described herein above.

Figure 18:
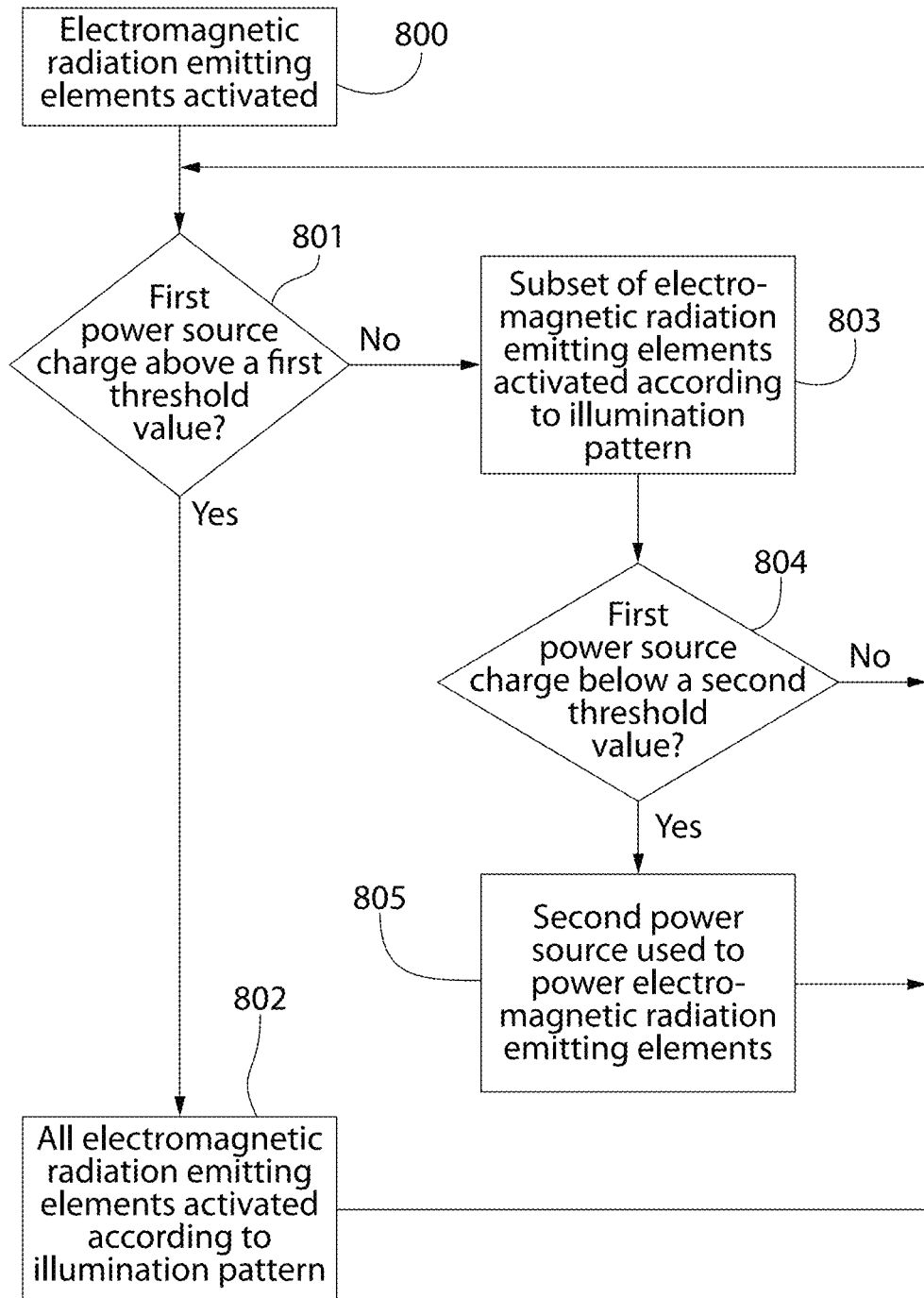
FIG. 18 is a flow chart illustrating a modification of the activation of the electromagnetic radiation emitting elements based upon a charge level of the power source.

Referring to FIG. 18, operation of the visual distress signal device 100 will be described with reference to the charge of the power source 220 and how that affects activation of the electromagnetic radiation emitting elements 500. Thus, in the flow chart of FIG. 18, the electromagnetic radiation emitting elements 500 are actuated and powered on as indicated at step 800 so that they are emitting electromagnetic radiation and drawing from the power source 220 (which may be referred to herein as a first power source) and/or from the coin cell battery 382 (which may be referred to herein as a second power source).

When the electromagnetic radiation emitting elements 500 are activated in any of the ways noted above (wirelessly from the mobile device 600 and software application 606 or directly by altering the switch 250 into the on position 298), the microprocessor 380 will determine whether the power source 220 has a charge that is above a first threshold value. In some embodiments, the first threshold value may be approximately 12.6V. If the power source 220 has a charge that is above the first threshold value, the microprocessor 380 will activate all of the electromagnetic radiation emitting elements 500 (i.e., all of the first light emitters 510, all of the second light emitters 520, and the infrared light emitter 530), as indicated at step 802. This is the process that has been described throughout this document. From step 802, the microprocessor 380 continues to monitor the charge of the power source 220 to determine whether it remains above the first threshold value or whether it has dropped below the first threshold value.

Upon the microprocessor 380 determining that the charge of the power source 220 is below the first threshold value (which, as noted above, may be approximately 12.6V), the operation moves to step 803. At step 803, in order to preserve the charge of the power source 220 so that the batteries 221 thereof last longer, the microprocessor powers/activates only a subset of the electromagnetic radiation emitting elements 500 in accordance with the illumination pattern. This conserves power and allows the electromagnetic radiation emitting elements 500 to flash for a longer period of time, even if less of them are flashing. In some embodiments, using the techniques described herein, all of the electromagnetic radiation emitting elements 500 may illuminate in accordance with the illumination pattern for approximately two hours, and then after two hours the a subset of (which may be half in some embodiments) the plurality of electromagnetic radiation emitting elements 500 may illuminate in accordance with the illumination pattern for an additional 4 hours, or an additional 5 hours, or an additional 6 hours, or an additional 7 hours, thereby increasing the total operational run time.

In the exemplified embodiment, the "subset" of the electromagnetic radiation emitting elements 500 comprises half of the first light emitting elements 510, half of the second light emitting elements 520, and the infrared light emitting element 530. As noted above, in the exemplified embodiment there are six of the first light emitting elements 510 and six of the second light emitting elements 520. Thus, at step 803, when the power source 220 is below the first threshold value, three of the first light emitting elements 510, three of the second light emitting elements 520, and the infrared lighting element 530 will illuminate in accordance with the illumination pattern described above and shown in FIG. 16. The remaining first and second light emitting elements 510, 520 will not be activated, thereby using less power source resources. Of course, while the exemplified embodiment describes three of the first and second lighting emitting elements 510, 520 being activated and the other three deactivated, the invention is not to be so limited in all embodiments and the subset could include variations. For example, in one variation, upon the power source 220 having a charge that is below the first threshold value, the microprocessor 380 may illuminate just one of the first light emitting elements 510 and just one of the second light emitting elements 520 along with the at least one infrared light emitting element 530.

Moreover, although in the exemplified embodiment step 803 is reached upon the charge of the power source 220 being below the first threshold value, the invention is not to be so limited in all embodiments. In some embodiments, at step 801, the microprocessor 380 will determine whether the electromagnetic radiation emitting elements 500 have been activated for a time period that is greater than or less than a threshold time period. If below the threshold time period, all of the electromagnetic radiation emitting elements 500 will remain activated. If above the threshold time period, the subset of the electromagnetic radiation emitting elements 500 will be activated with the remainder of the electromagnetic radiation emitting elements 500 being deactivated.

Next, upon reaching step 803 and only activating a subsect of the plurality of electromagnetic radiation emitting elements 500, the operation will move to step 804 where the microprocessor 380 will determine whether the charge of the power source 220 is above or below a second threshold value. The second threshold value may be approximately 7V in some embodiments, although the invention is not limited to this particular voltage in all embodiments. If at step 804 the charge of the power source 220 is above the second threshold value but below the first threshold value, the microprocessor 380 will continue to activate/illuminate the subset of the electromagnetic radiation emitting elements 500 as has been described herein. However, if the charge of the power source 220 is below the second threshold value, the operation moves to step 805.

At step 805, the second power source (which is the coin cell battery 382 in the exemplified embodiment) is used to power the electromagnetic radiation emitting elements 500 either alone or in combination with the power source 220 (or what remains of the charge of the power source 220). The second power source has much less power than the first power source 220, so it may only be able to keep the electromagnetic radiation emitting elements 500 activated for a short period of time. However, in times of distress any additional time can be beneficial. Thus, power from the second power source (the coin cell battery 382) will kick in to power the electromagnetic radiation emitting elements 500 when the power source 220 no longer has sufficient power to do so on its own. Upon the power level in the second power source being depleted, it will no longer be able to activate the electromagnetic radiation emitting elements 500 and they will remain deactivated regardless of the position of the switch 250.

Referring to FIGS. 19-27, the software application 606 previously mentioned will be described in greater detail including its ability to control operation of the visual distress signal device 100. In some embodiments, the mobile device 600 containing the software application 606 downloaded thereon in combination with the visual distress signal device 100 may be referred to herein as a visual distress alert and locate system. This is because while the visual distress signal device 100 may serve as an alert system because it emits electromagnetic radiation that can be visually seen by a bystander, the software application 606 also includes the ability to inform predefined persons who are ideally not located geographically with the user (i.e., are not on the boat) of the emergency situation and the location of the user at that time. Thus, this satisfies the "locate" part of the alert and locate system. Moreover, the emitting of the infrared light may also serve as a location feature.

Figure 19:
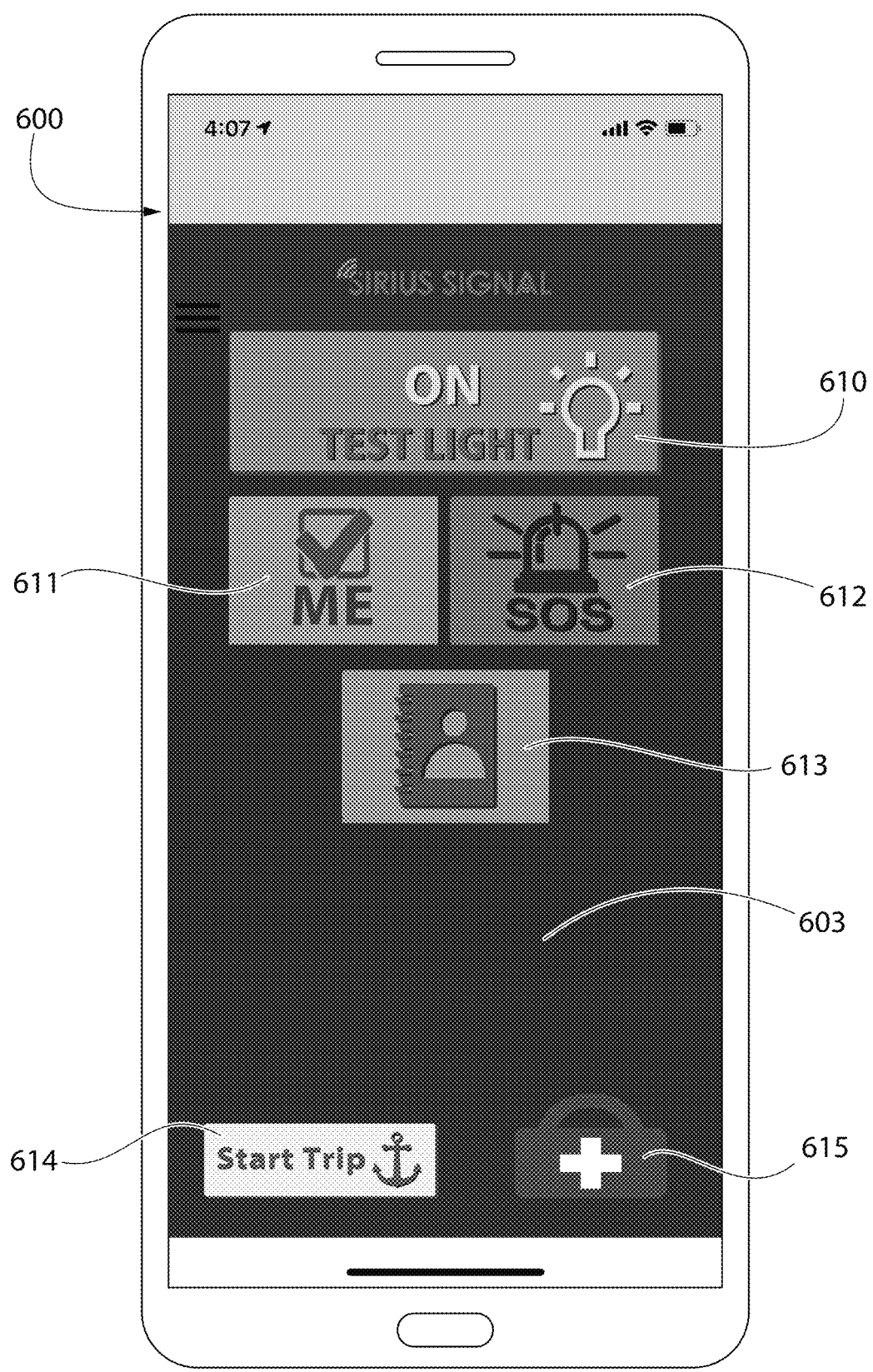
FIG. 19 is a depiction of a software application displayed on a mobile device that can be used to activate the visual distress signal device when in the wireless communication position when the mobile device has not activated the electromagnetic radiation emitting elements.

Referring to FIG. 19, the display or user interface 603 of the mobile device 600 is illustrated with the software application 606 having just been launched. The software application 606 may be launched without the mobile device 600 being operably coupled (i.e., wireless coupled) to the visual distress signal device 100. For example, a user can launch the software application 606 to enter data therein without intending to use the software application 606 to control operation of the visual distress signal device 100.

Upon launching the software application 606, several selectable icons will be displayed on the display 603 of the mobile device 600. These include a Test Light icon 610, a Check Me icon 611, an SOS icon 612, an Contact List icon 613, a Float Plan icon 614 (the one which includes the label "Start Trip" in the exemplified embodiment), and a First Aid icon 615. A user can select any of the aforementioned icons by pressing on them with a finger on the display/user interface 603. The Test Light icon 610 will only be operational when the mobile device 600 is in wireless communication with the visual distress signal device 100. If the mobile device 600 is not in wireless communication with the visual distress signal device 100, pressing the Test Light icon 610 will result in the mobile device 600 attempting to connect to the visual distress signal device 100 (if it is not already so connected), and then presenting an error message if it is unable to do so (it will be able to do so only if the switch 250 of the visual distress signal device is switched into the wireless communication position 299). If the mobile device 600 is already or is able to become wirelessly connected with the visual distress signal device 100, pressing the Test Light icon 610 will result in the electromagnetic radiation emitting elements 500 to become activated. This will also change the image displayed on the user interface/display 603 to that which is shown in FIG. 20.

Figure 20:
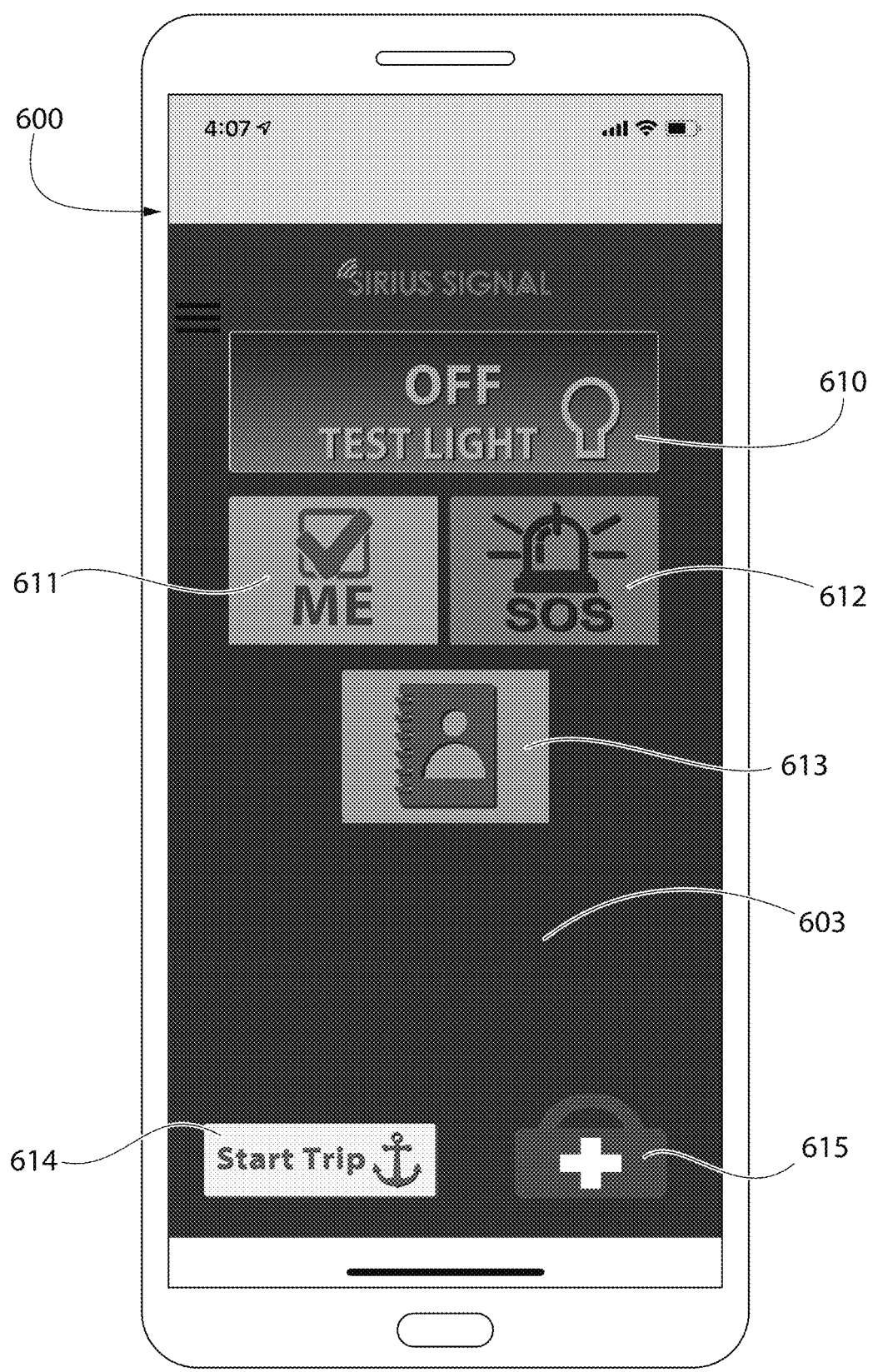
FIG. 20 is a depiction of the software application of FIG. 19 when the mobile device has activated the electromagnetic radiation emitting elements.

Specifically, referring to FIG. 20, upon activating the electromagnetic radiation emitting elements 500 of the visual distress signal device 100 with the mobile device 600, the image of the Test Light icon 610 on the user interface 603 will change such that the word "On" will change to "Off." Basically, the word "On" or "Off" is indicating what will happen when you press the Test Light icon 610. Thus, in FIG. 19, the Test Light icon 610 says "On" so selecting the Test Light icon 610 will turn the electromagnetic radiation emitting elements 500 on. In FIG. 20, the Test Light icon 610 says "Off" so selecting the Test Light icon 610 will turn the electromagnetic radiation emitting elements 500 off.

Figure 21:
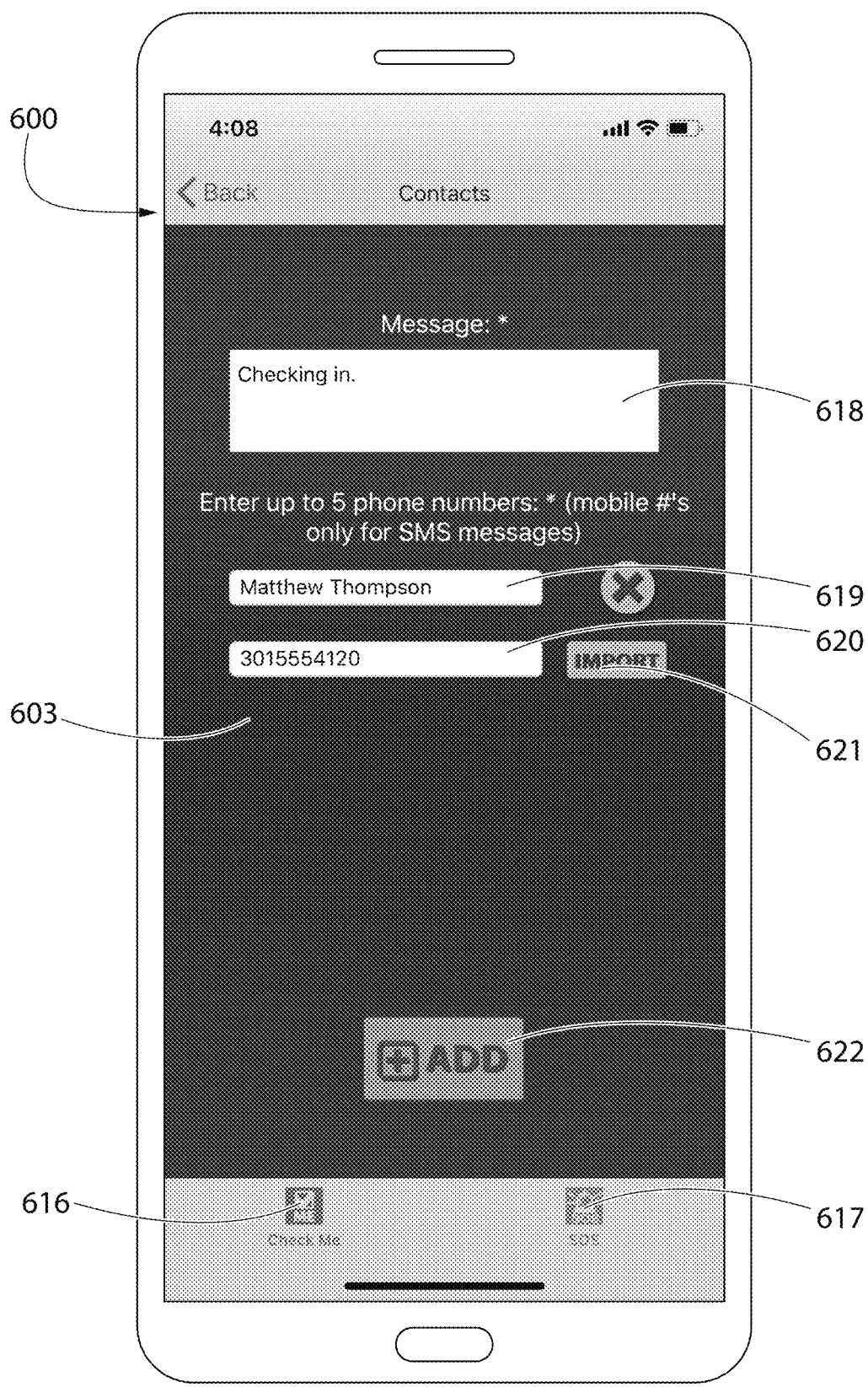
FIG. 21 is a depiction of a contact list associated with a check in module of the software application displayed on the mobile device

Next, upon a user selecting the Contact List icon 613, the user interface 603 will display what is shown in FIG. 21. At the bottom of the user interface 603 in FIG. 21, there is a small Check Me icon 616 and a small SOS icon 617. A user will select either the small Check Me icon 616 or the small SOS icon 617 depending on whether the user desires to add contacts to a check in module of the software application 606 or an emergency module of the software application 606. FIG. 21 shows what would be displayed upon selecting the Contact List icon 613, which is the page associated with entering contact information into the check in module. Thus, a user can type a message (the message "Checking in." has been typed in the exemplified embodiment, but the user can type any message desired) into the message box 618 and the user can enter a name and phone number for a contact in the name box 619 and the phone number box 620, respectively. This information is then saved in the check in module of the software application 606. The user can alternatively import a contact from the user's mobile phone address book by selecting the "Import" button 621. Finally, the user can add additional contacts by clicking the Add button 622.

Figure 22:
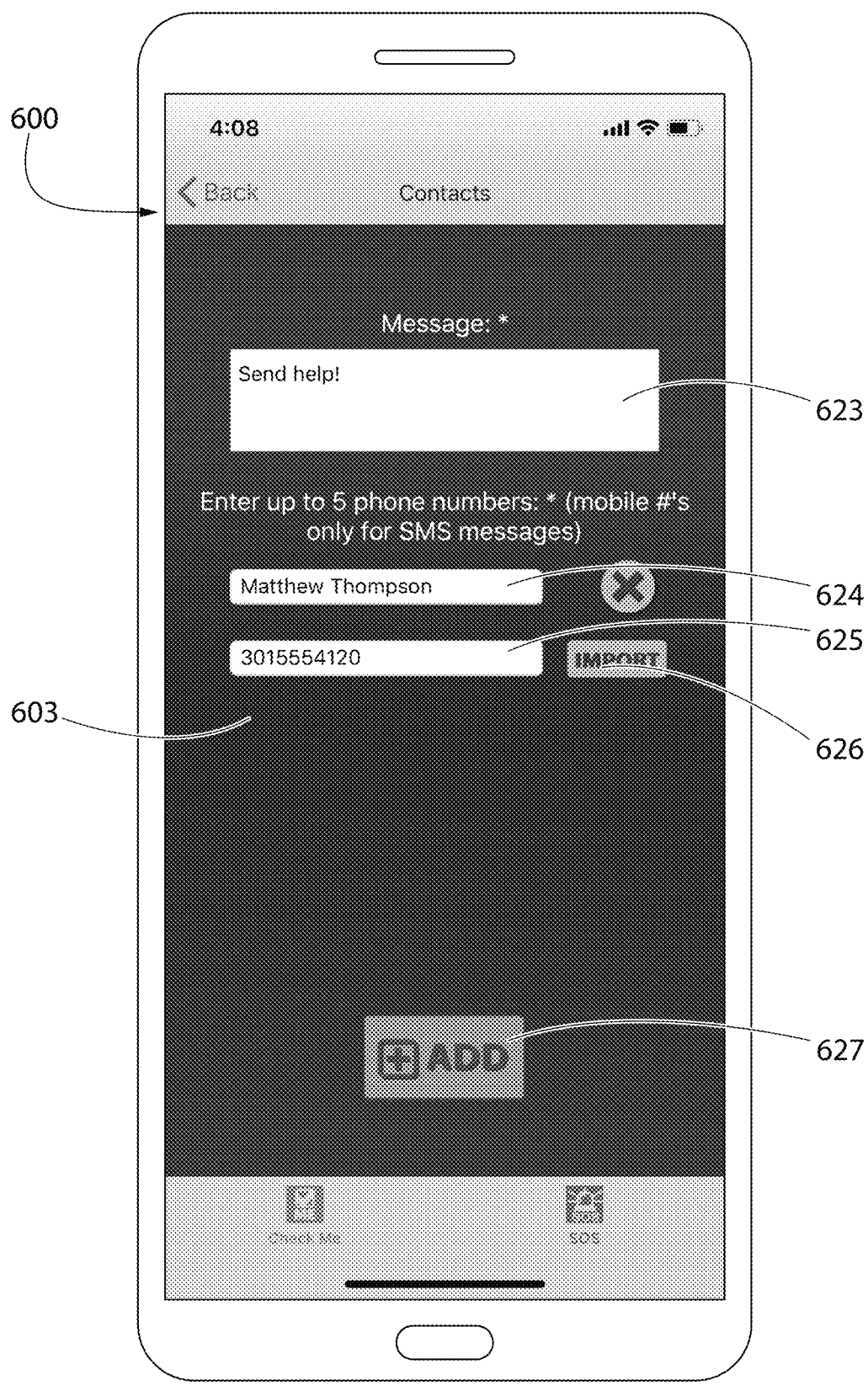
FIG. 22 is a depiction of a contact list associated with an emergency module of the software application displayed on the mobile device.
Figure 23:
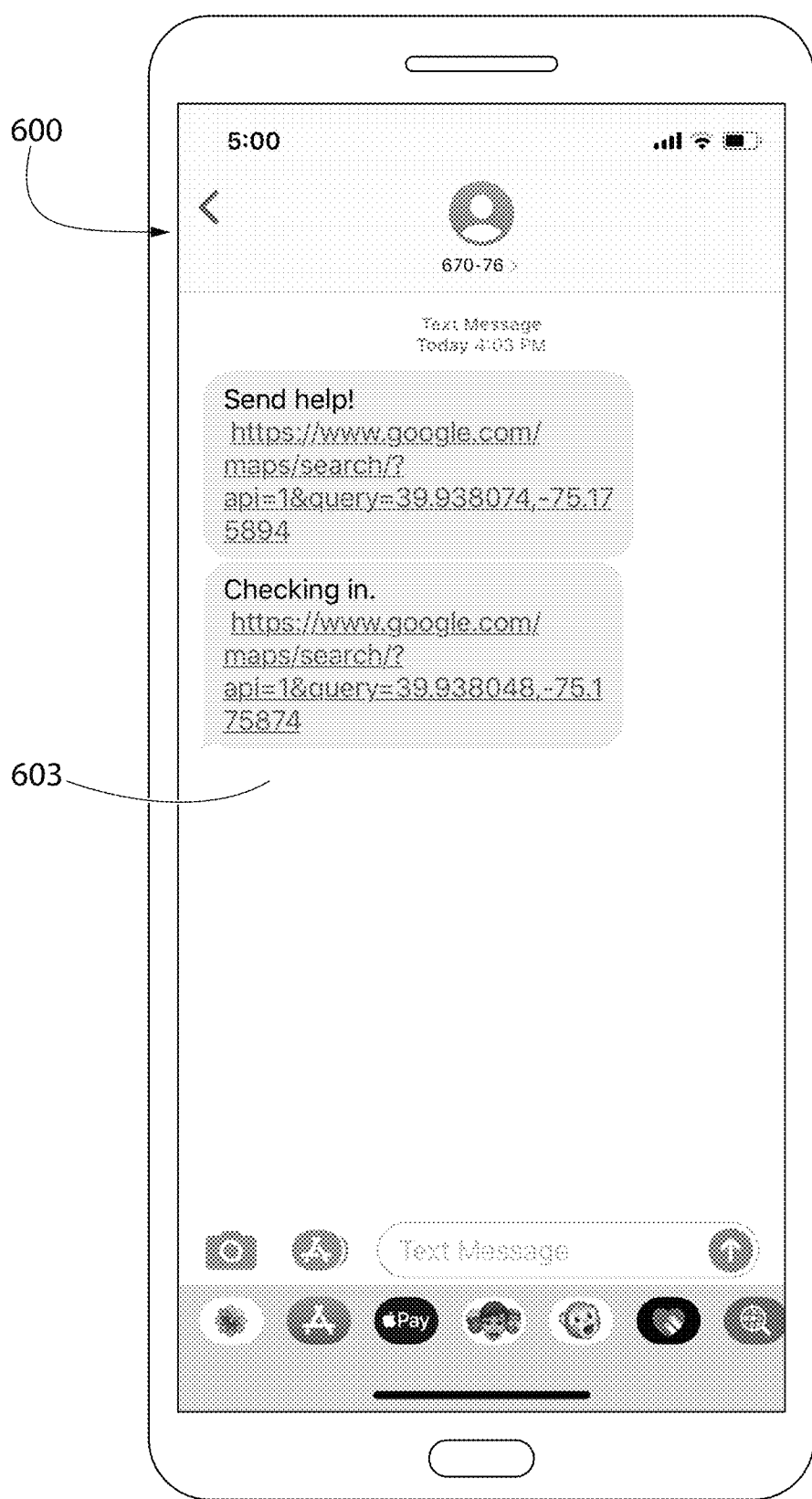
FIG. 23 is a depiction of text messages received by a person in the contact lists of the check in module and the emergency module.

If upon selecting the Contact List icon 613, the user then selects the small SOS icon 617, the user interface/display 603 will show what is shown in FIG. 22. This is an identical format to that which was shown in FIG. 23 in that it includes a message box 623 where a user can type a message, a name box 624 where a user can type a contact name, a phone number box 625 where a user can type the contact's phone number, an Import button 626, and an Add button 627. However, in this instance the information typed into the message box 623, the name box 624, and the phone number box 625 is saved into the emergency module of the software application 606.

Returning to FIGS. 19 and 23, use of the software application 606 to send text messages and/or phone calls to persons listed in the contact lists of the check in module and the emergency module of the software application 606 will be described. If a user selects (clicks, presses, or the like) the Check Me icon 611 on the user interface 603 in FIG. 19, the software application 606 will send a text (SMS) message to each contact who's information was previously stored in the check in module (i.e., FIG. 21), and the text message will contain the text typed into the message box 618 from FIG. 21. If a user selects (clicks, presses, or the like) the SOS icon 612 on the user interface 603 in FIG. 19, the software application 606 will send a text (SMS) message to each contact who's information was previously stored in the emergency module (i.e., FIG. 22), and the text message will contain the text typed into the message box 623 from FIG. 22. In either situation, the text message will also contain a link to a google maps website pinpointing the location of the user when he/she clicked the Check Me icon 611 or the SOS icon 612.

Thus, the check in module comprises a first contact list (the list of names and phone numbers in boxes 619 and 620 of FIG. 21) and a first message (the message in box 618 of FIG. 21). The emergency module comprises a second contact list (the list of names and phone numbers in boxes 624 and 625 of FIG. 22) and a second message (the message in box 623 of FIG. 22). On the home page of the software application 606 shown in FIG. 19, clicking the Check Me icon 611 sends a text message to each of the people listed in the first contact list, and the text message contains the first message. On the home page of the software application 606 shown in FIG. 19, clicking the SOS icon 612 sends a text message to each of the people listed in the second contact list, and the text message contains the second message. Moreover, in some implementations of the invention set forth herein, clicking the SOS icon will also cause the software application 606 to place a telephone call to each person listed in the second contact list to verbally relay the message from an automated voice or voice recording to the people in the contact list. If the person in the contact list does not answer the call, a voicemail with the second message will be left.

Figure 24:
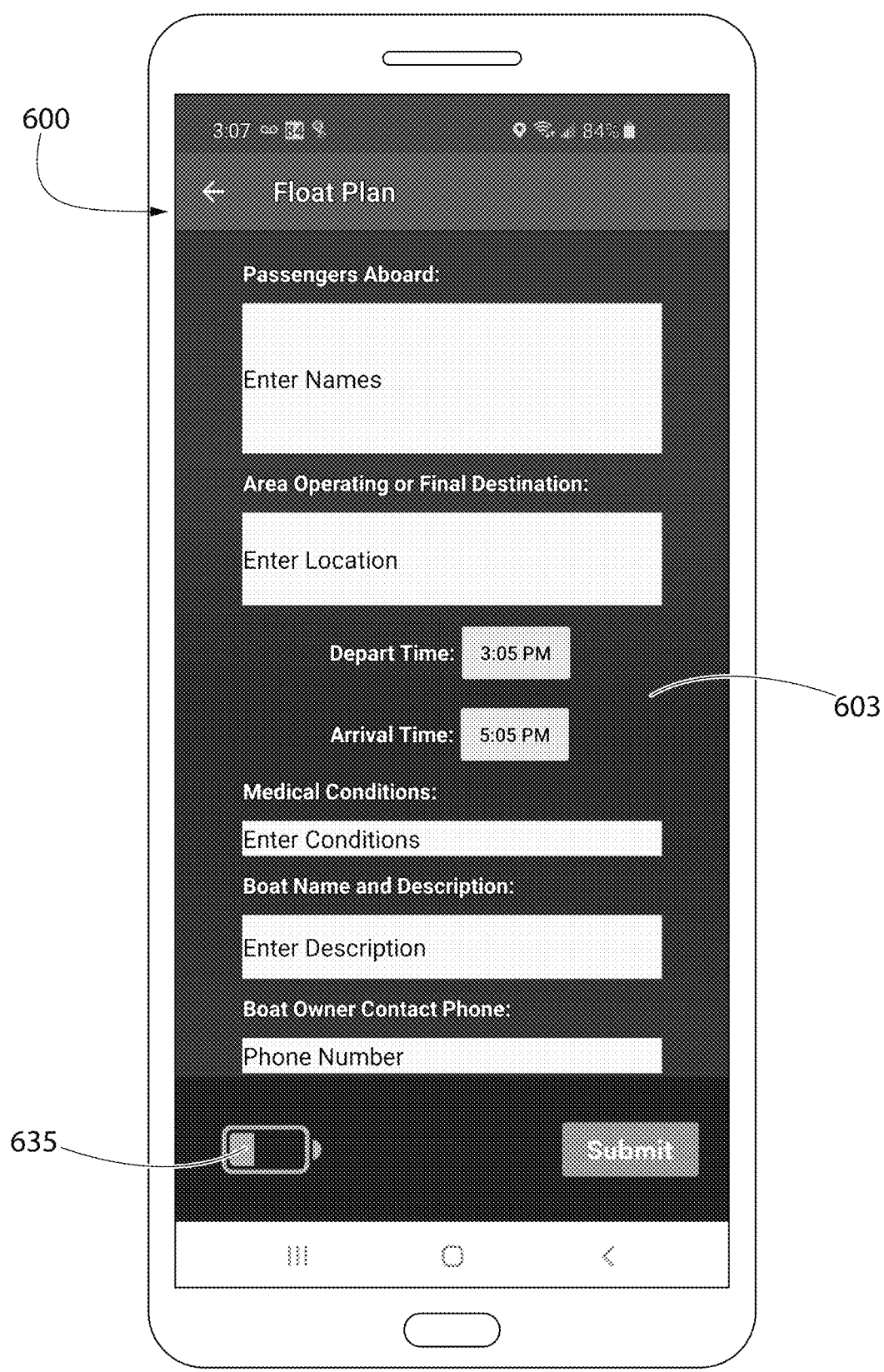
FIG. 24 is a depiction of a float plan of the software application displayed on the mobile device.

Returning to FIG. 19, when a user selects the Float Plan icon 614 from the homepage shown in FIG. 19 (the icon which reads "Start Trip" and has an image of an anchor), the user interface 603 of the mobile device 600 will display what is shown in FIG. 24. On this page, a user can enter the names of the passengers going on the trip, the area that the trip will take place or the final destination, the depart and estimated arrival time, any medical conditions that the passengers may have, a name and description of the boat, and contact information for the boat owner. This information can then be stored in the software application 616 and later retrieved if needed for location purposes or for purposes of providing aid.

On the float plan page shown in FIG. 24, there is also a power source level indicator 635 as shown on the bottom left of the user interface. Specifically, upon a user selecting "Start Trip" from the homepage as noted above, the float plan screen of FIG. 24 is opened on the user interface 603 of the mobile device 600. Furthermore, upon selecting the float plan icon 614, if the mobile device 600 is in wireless communication with the visual distress signal device 100 (specifically, via Bluetooth or other wireless communication protocols as described herein) the power level of the power source 220 (e.g., the batteries 221) is checked and displayed as the power source level indicator 635. That is, Bluetooth may need to be enabled on both the mobile device 600 and the visual distress signal device 100 for the power source level to be monitored and displayed on this page of the software application in some embodiments. This can provide a user with a baseline to determine whether the user should change out the power source 220 before beginning a trip. The power source level indicator 635 may be color coded so that it is, for example without limitation, green with the power level is high, orange when the power level is medium (for example, between 30% and 70% of the total), and red when the power level is low (for example, below 30%, or below 20%, or below 10%) in various different embodiments.

Figure 25:
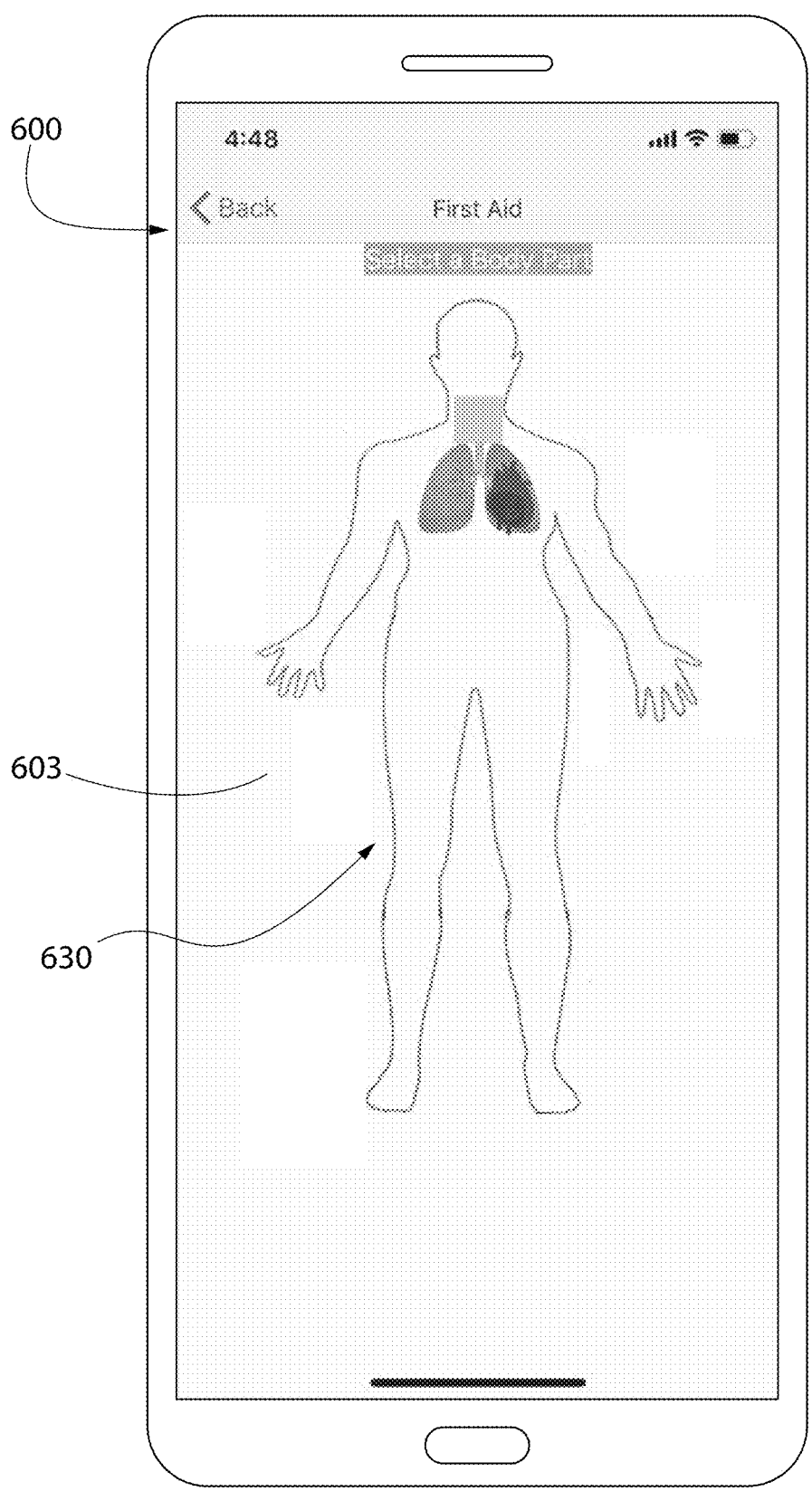
FIG. 25 is a depiction of a first aid module of the software application displayed on the mobile device.

Returning again to FIG. 19, the final icon that a user can select on the homepage of the software application 606 is the First Aid icon 615. Upon selecting the First Aid icon 615, the user interface 603 will display that which is shown in FIG. 25. Specifically, upon selecting the First Aid icon 615, the user interface 603 will display a depiction of a human body 630. The features associated with the First Aid icon 615 and that which is displayed on the user interface 603 upon its selection may be referred to herein as the first aid module. That is, the software application 606 may comprise a first aid module which stores general information about first aid which may be useful in certain situations. Thus, selecting the First Aid icon 615 initiates the first aid module, which then displays the human body as shown in FIG. 25.

From the image of the human body 630 shown in FIG. 25, a user can select (i.e., press with a finger) any area of the human body 630 that the user needs to obtain first aid information about. Thus, the user can select the head, the heart, the lungs, the hands, the legs, or the body, and with each region selected different information will be displayed on the user interface 603.

Figure 26:
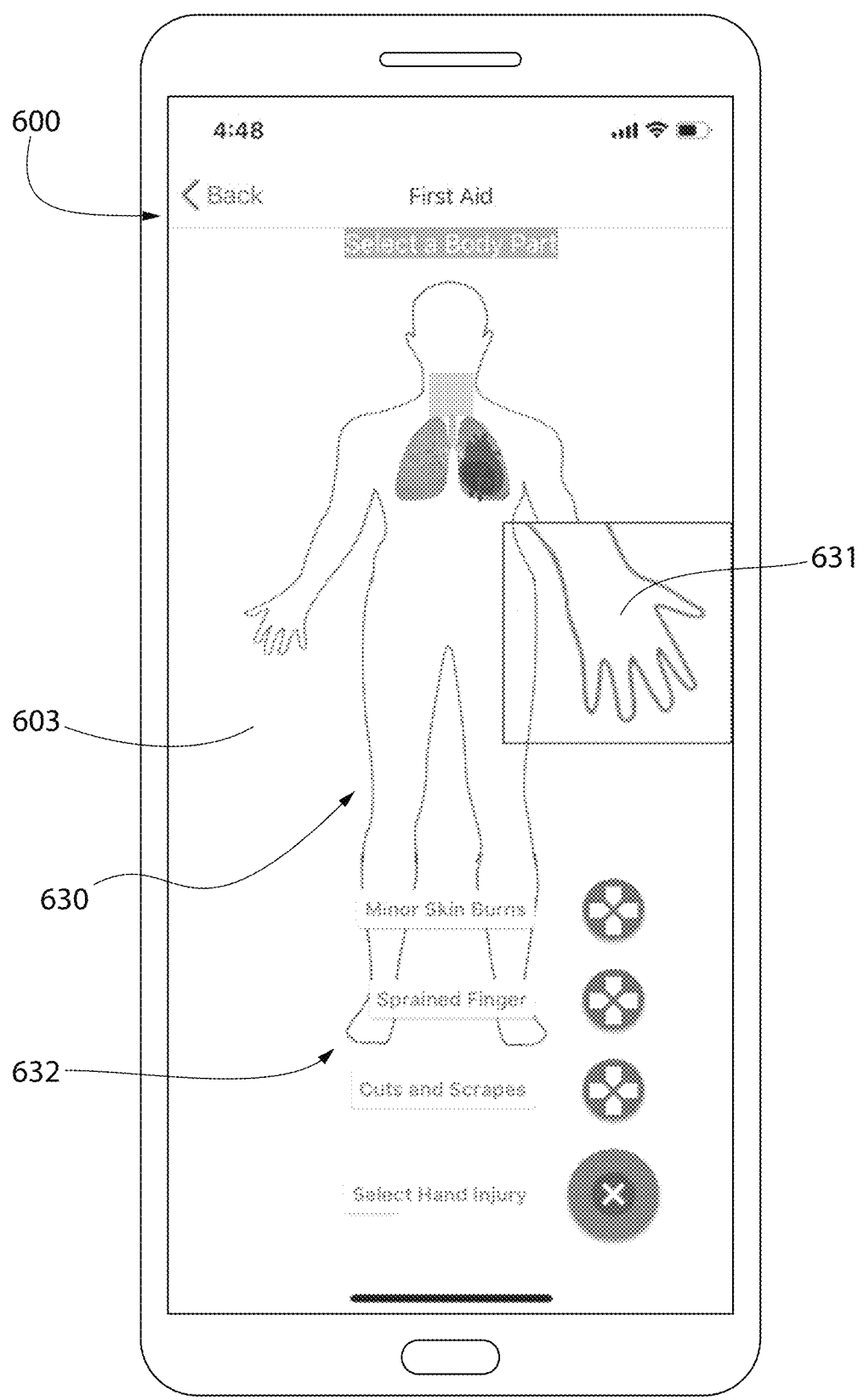
FIG. 26 is a depiction of the first aid module of FIG. 25 after a user has selected a portion of the human body.

Turning to FIG. 26, a user has selected a hand 631 of the human body 630 on the user interface 603. Again, this may be achieved by the user touching the user interface 603 on the hand 631 of the human body 630 as it is displayed on the user interface 603. Upon selecting the hand 631, a list of potential ailments 632 associated with the hand may be displayed on the user interface 603. Next, a user can select one of the ailments from the list of potential ailments 632 in the same manner as has been described above (by clicking, pressing, or the like).

Figure 27:
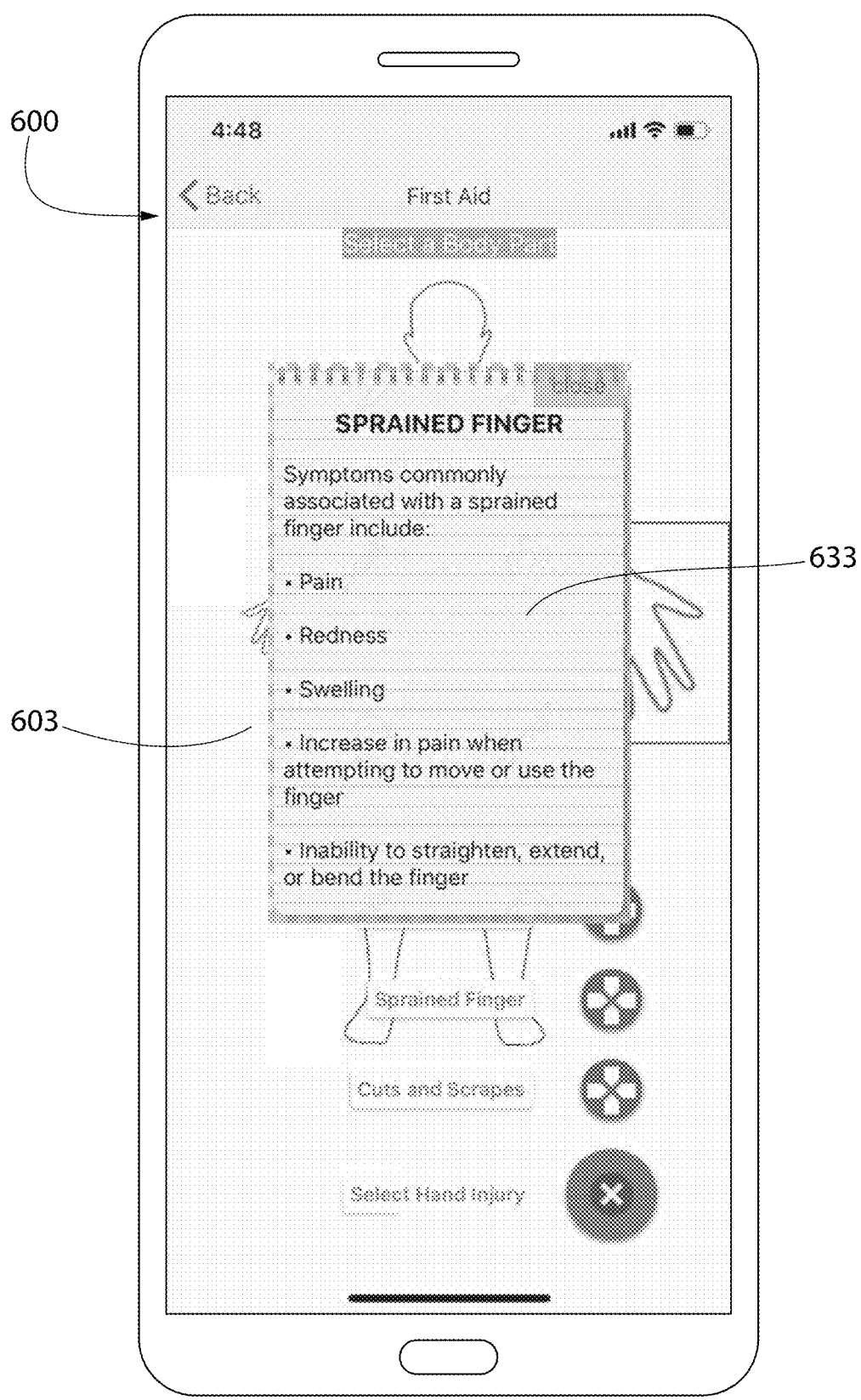
FIG. 27 is a depiction of the first aid module of FIG. 26 after a user has selected an ailment.
Figure 28A:
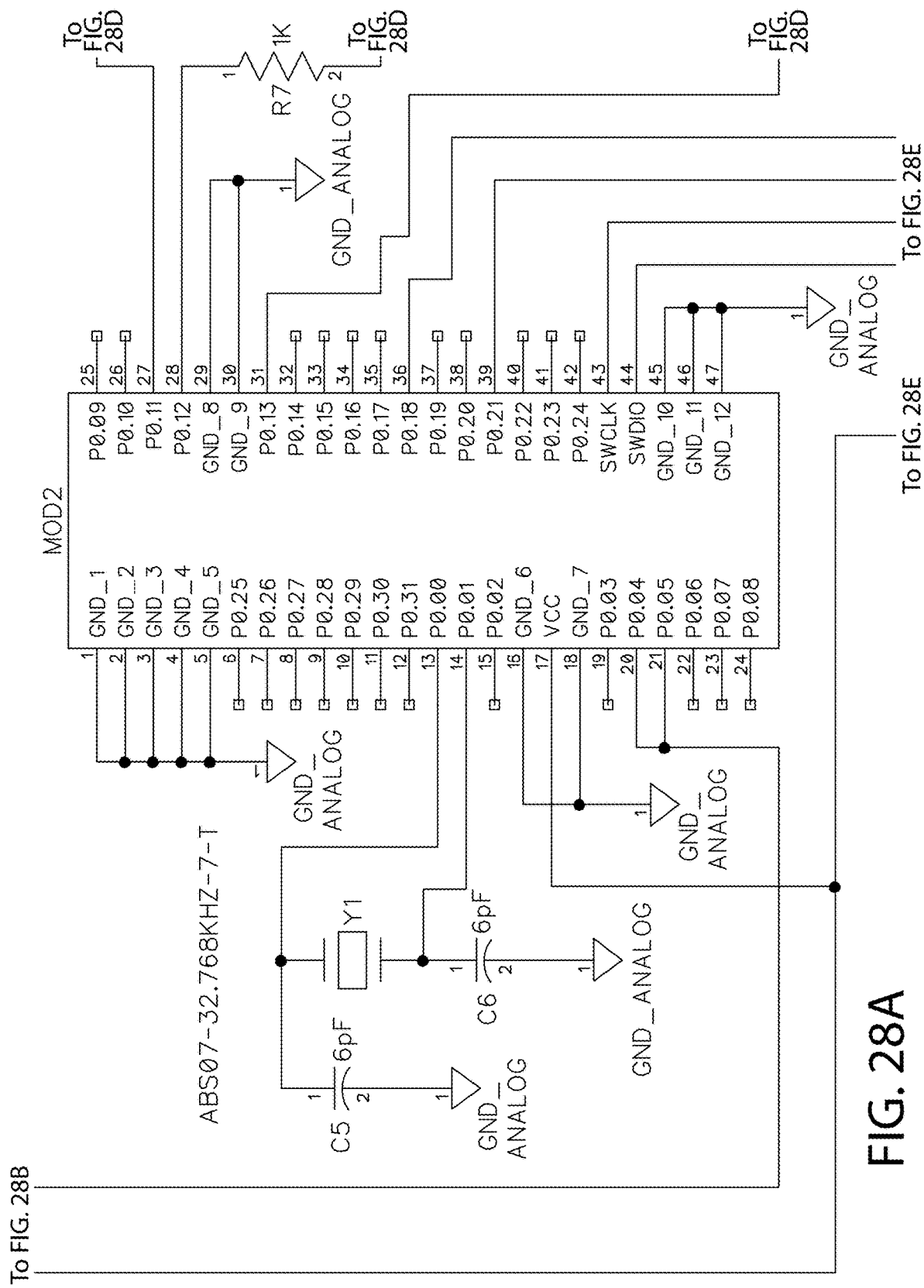
FIGS. 28A-E, 29A-G, and 30 are electrical circuit schematics of various aspects of the visual distress signal device in accordance with embodiments of the present invention.
Figure 28B:
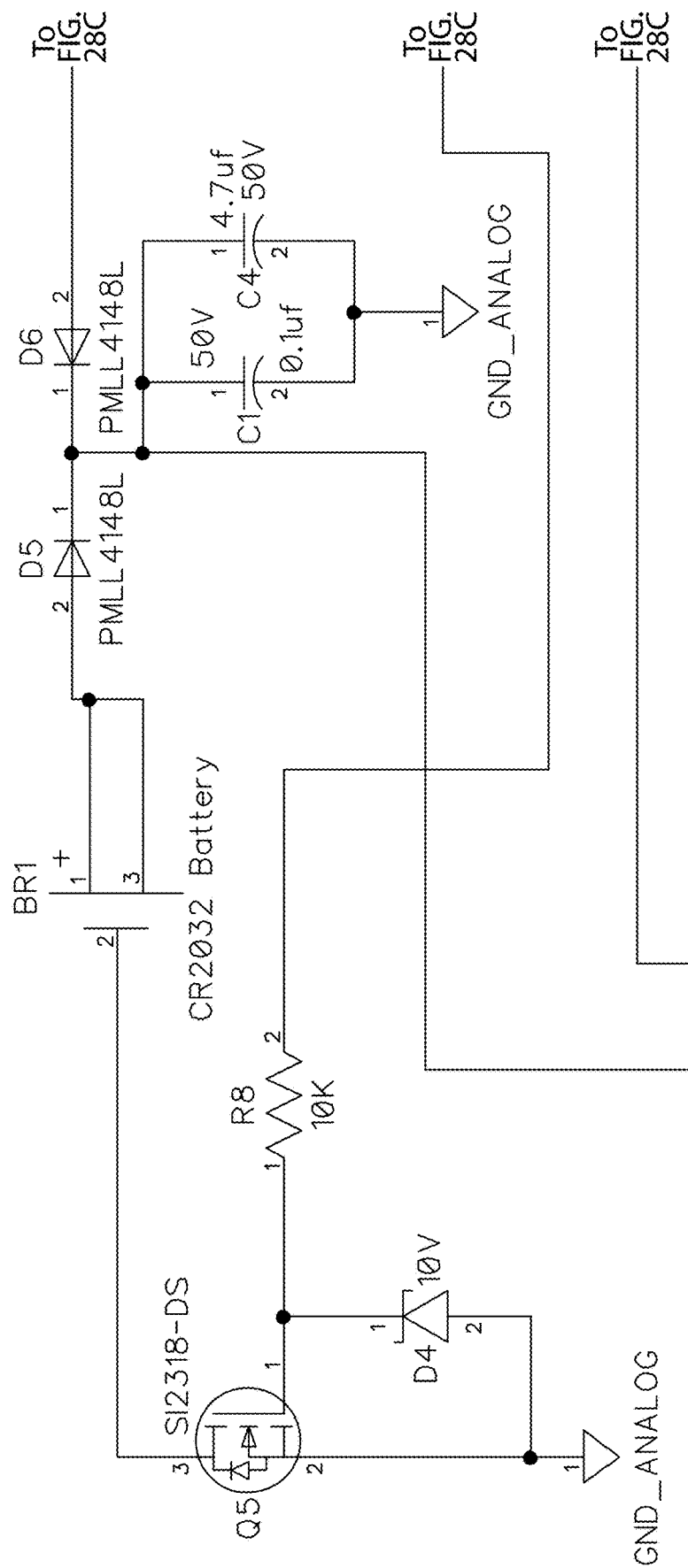
Figure 28C:
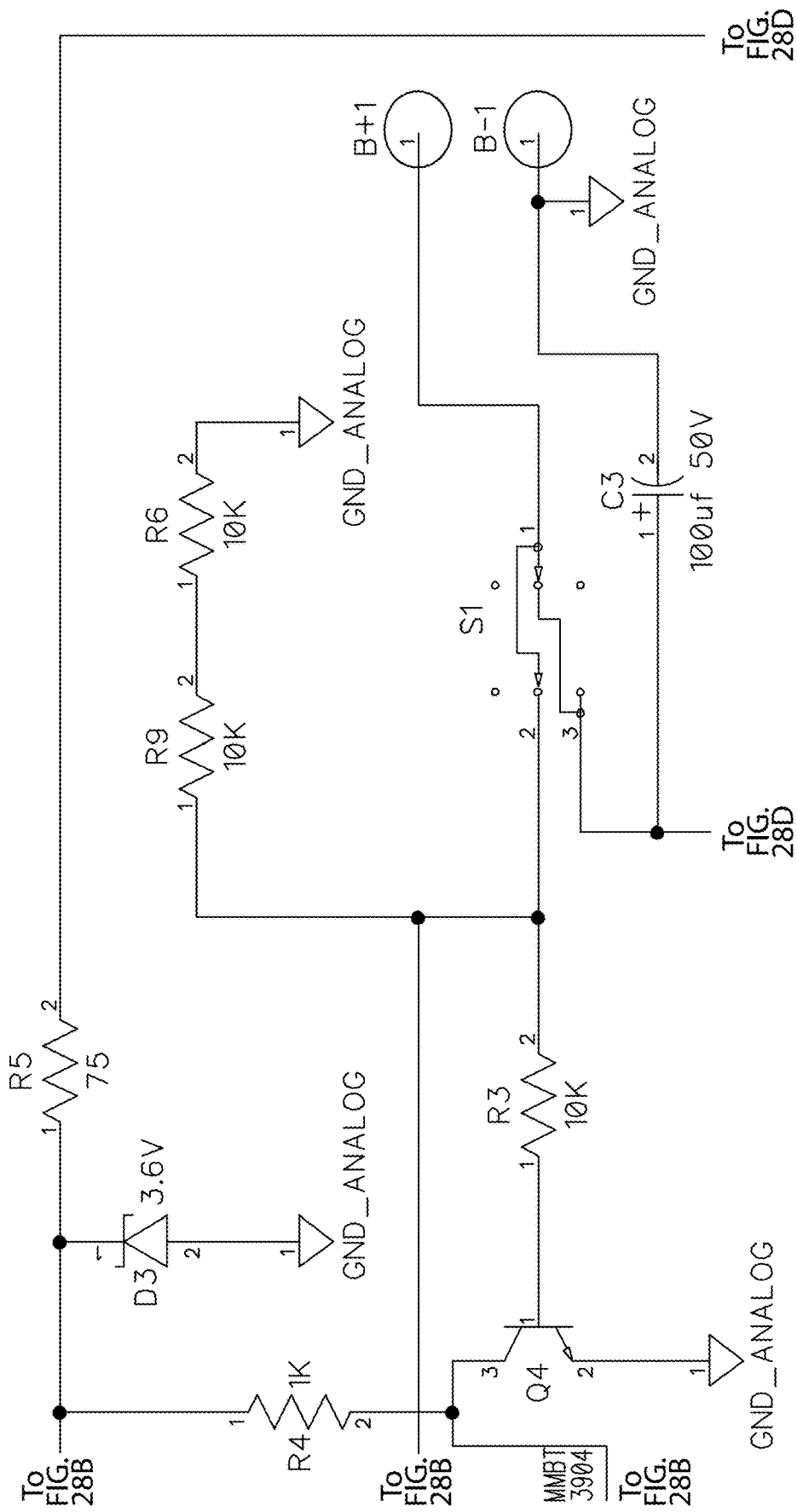
Figure 28D:
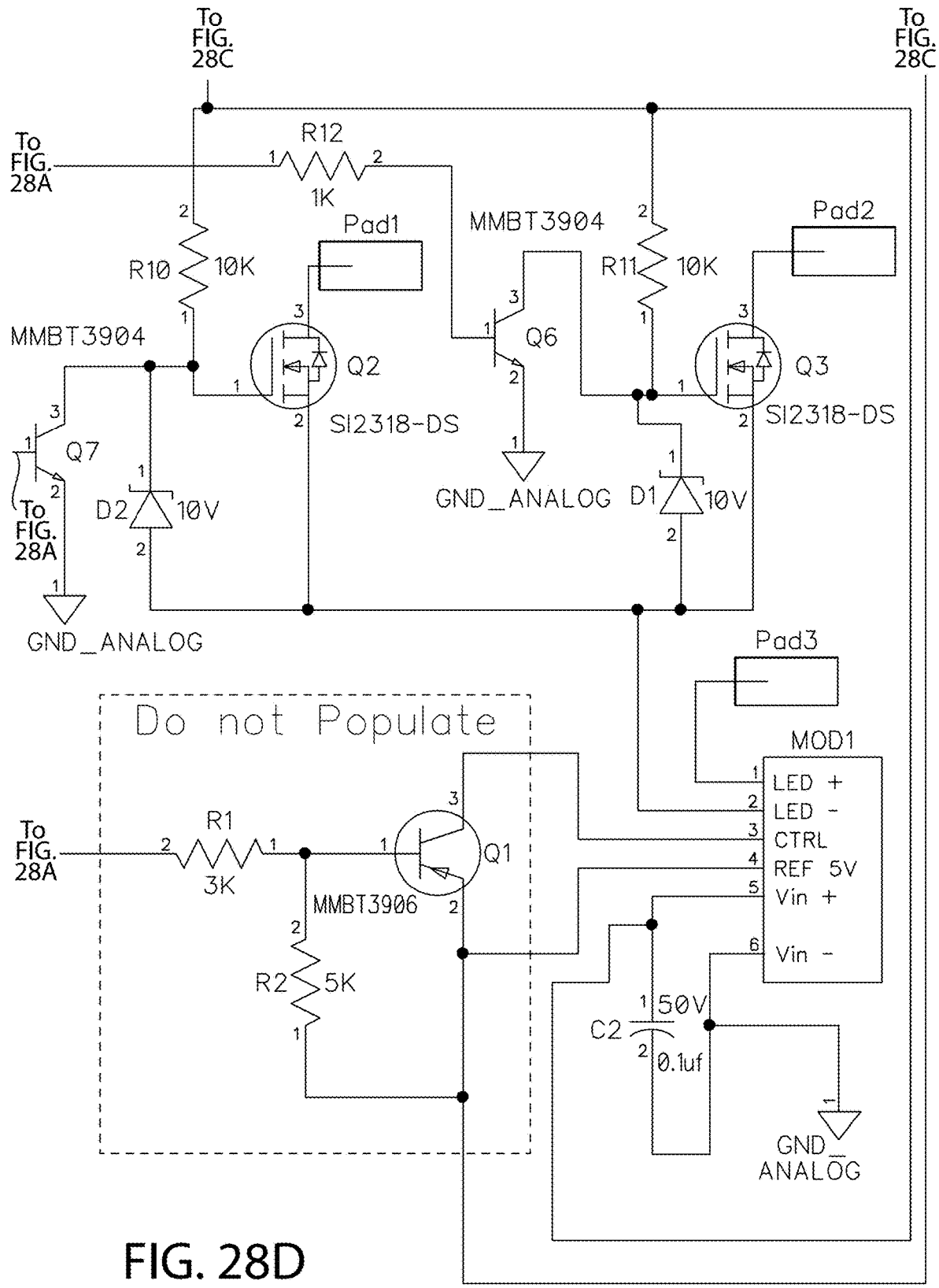
Figure 28E:
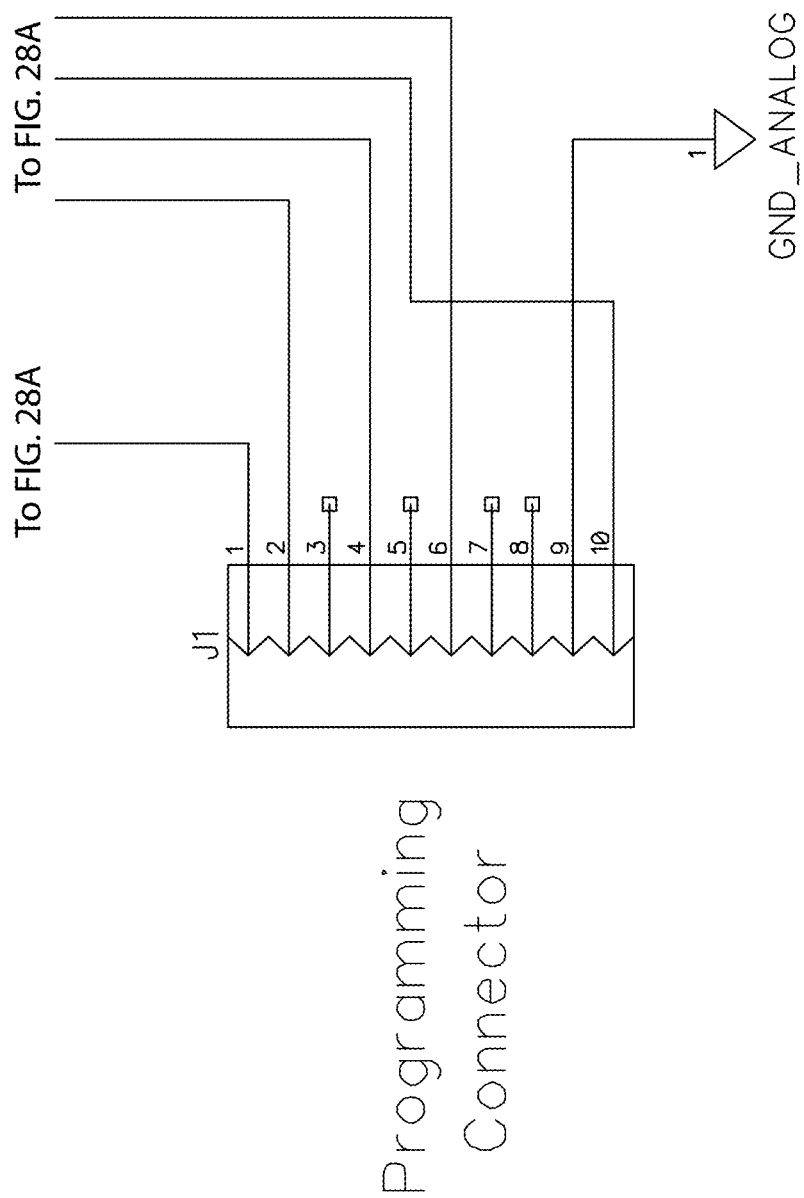
Figure 29A:
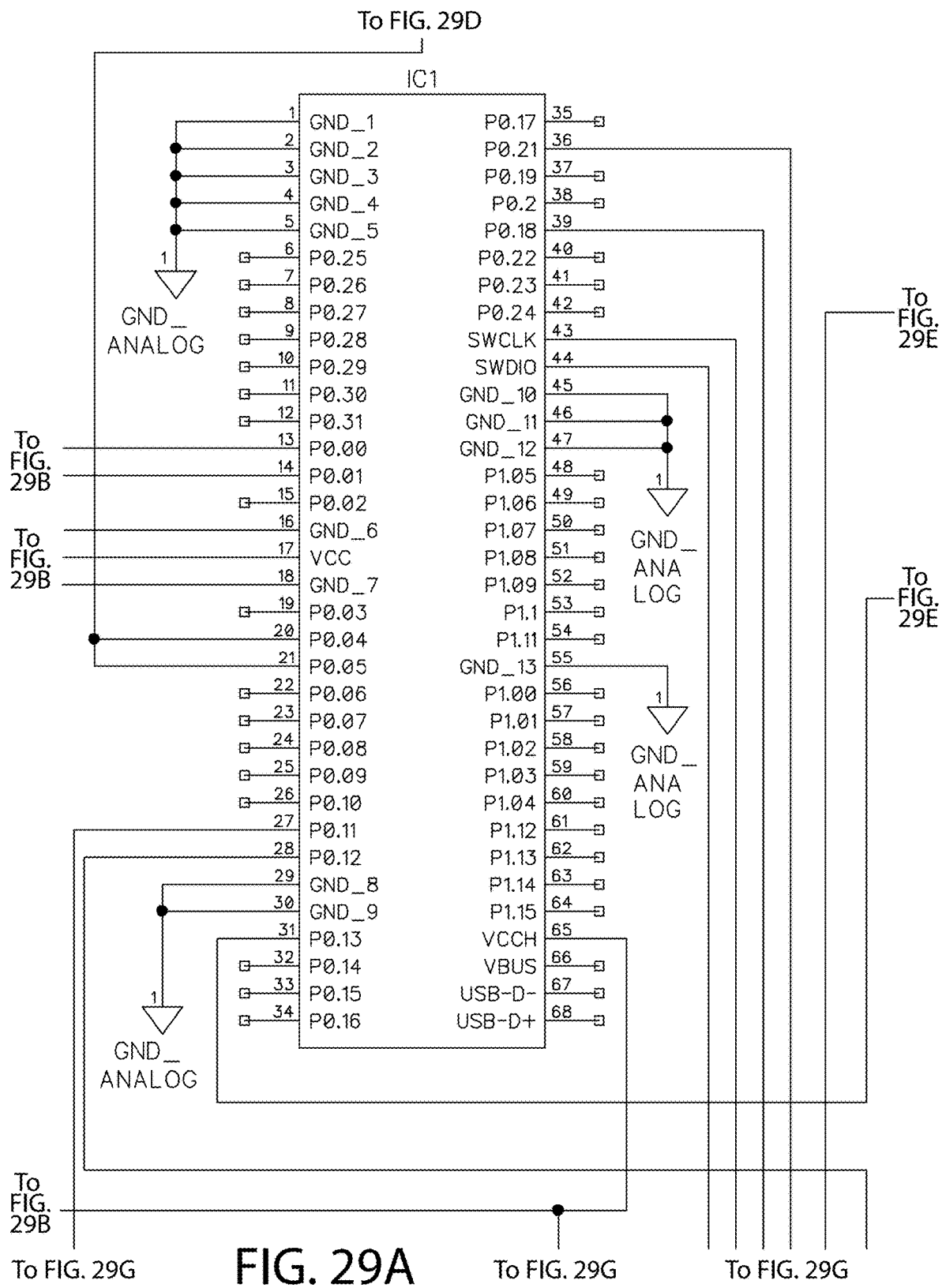
Figure 29B:
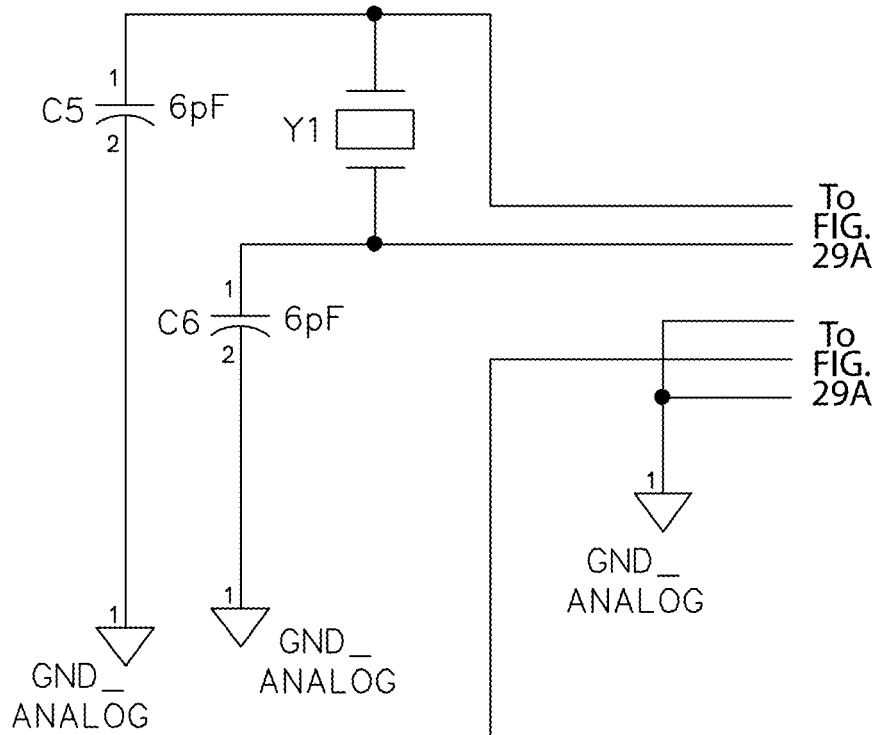
Figure 29C:
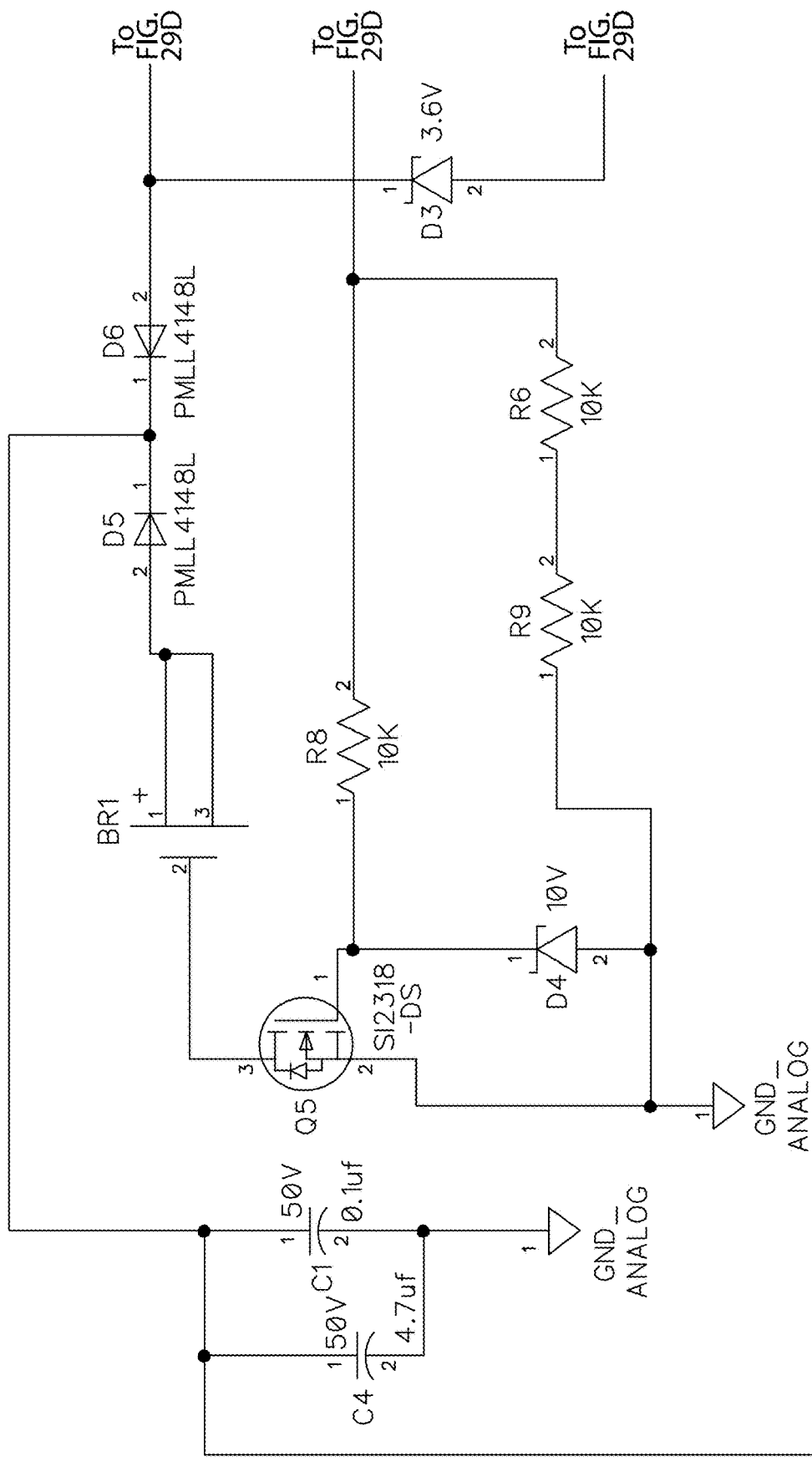
Figure 29D:
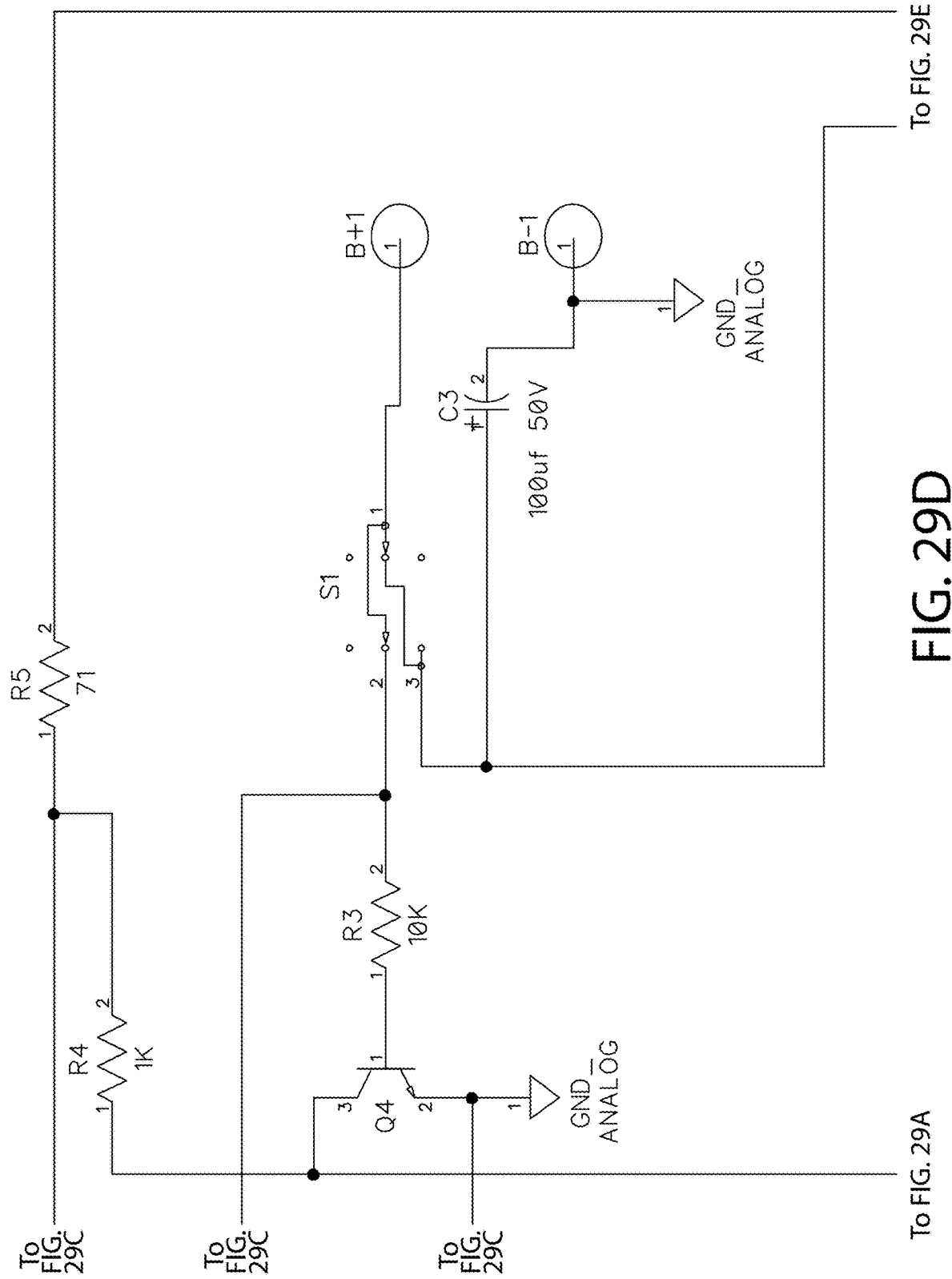
Figure 29E:
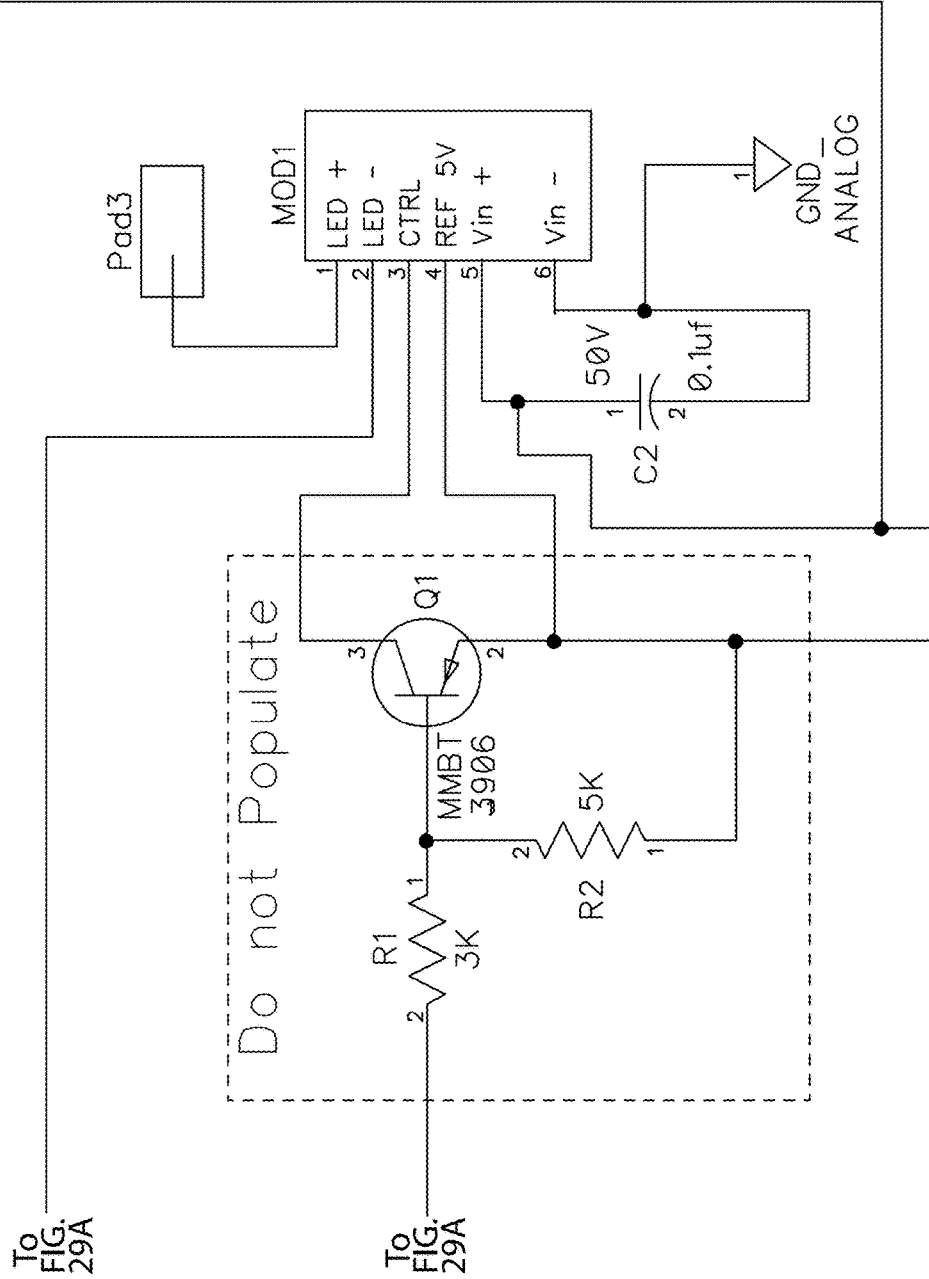
Figure 29F:
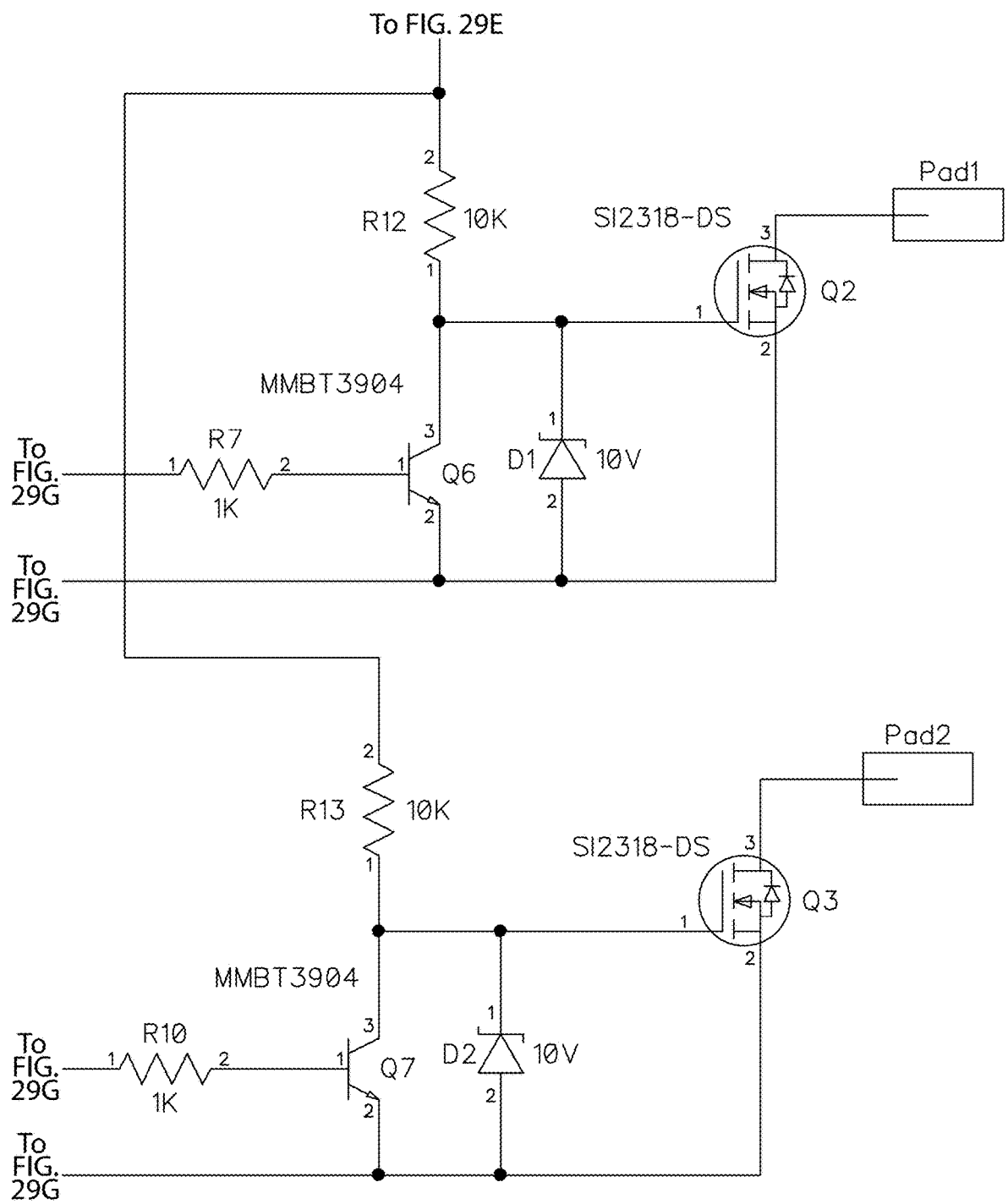
Figure 29G:
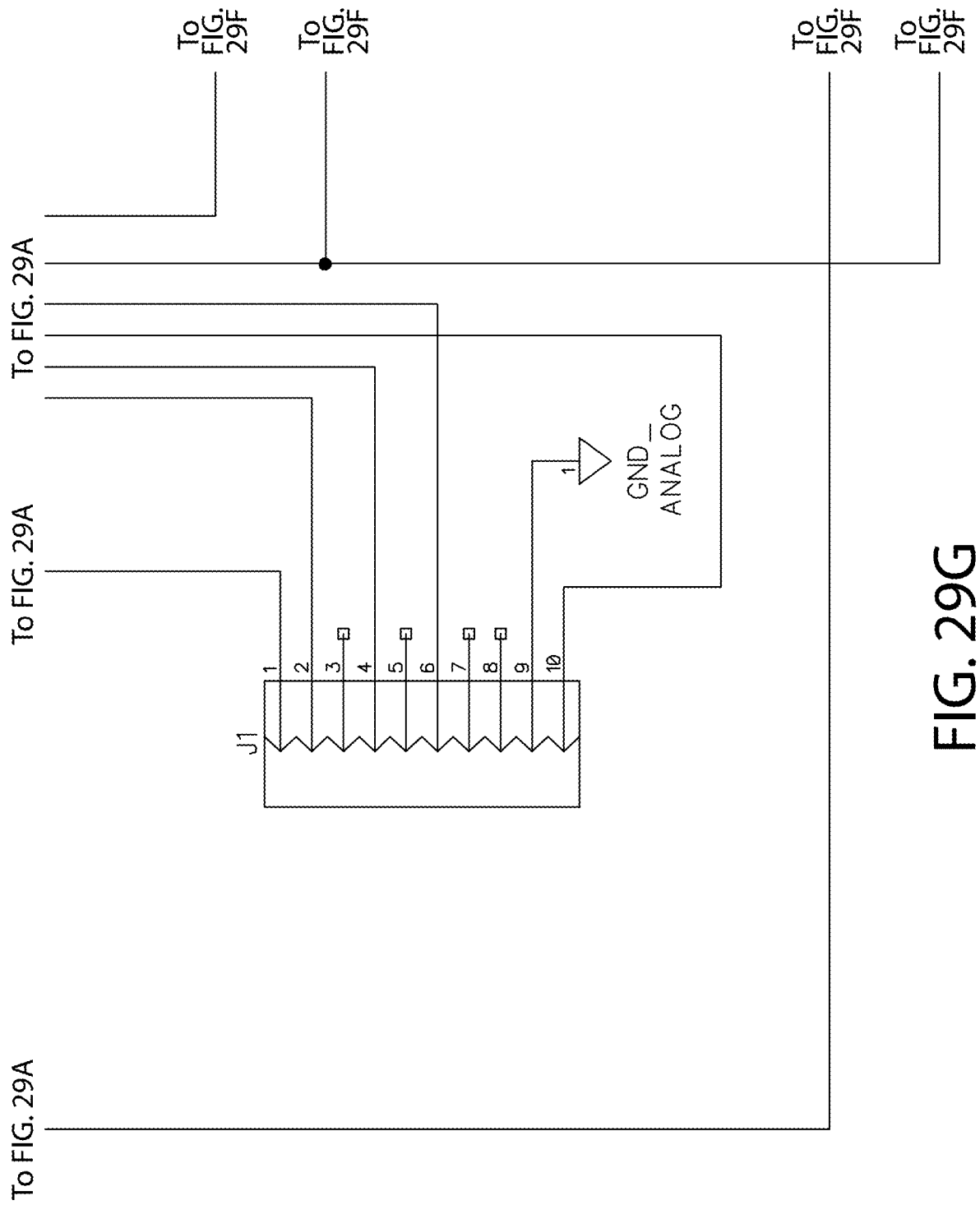

Upon selecting one of the ailments from the list of potential ailments 632, the user interface 603 displays what is shown in FIG. 27. That is, a text box 633 is displayed containing text with information for remedying the selected ailment. In this instance, the ailment "Sprained Finger" was selected and the text box 633 contains information regarding how to treat a sprained finger. Furthermore, in some embodiments in addition to the text box 633 being displayed on the user interface so that a user can read it, audio containing the information in the text box 633 may also be emitted from the speaker 604 of the mobile device 600. Thus, if a user is in a situation of distress and cannot take the time to read the information, the user can listen to the information being emitted from the speaker 604 of the mobile device 600 and treat the ailment accordingly. The audio may be emitted from the speaker 604 in a loop such that it is repeated until a user closes the text box 633 or otherwise instructs the software application to stop playing the audio. The audio may be emitted in a synthesized voice which may be a predetermined voice or the voice (i.e., accent, etc.) may be selectable by a user.

Figure 30:
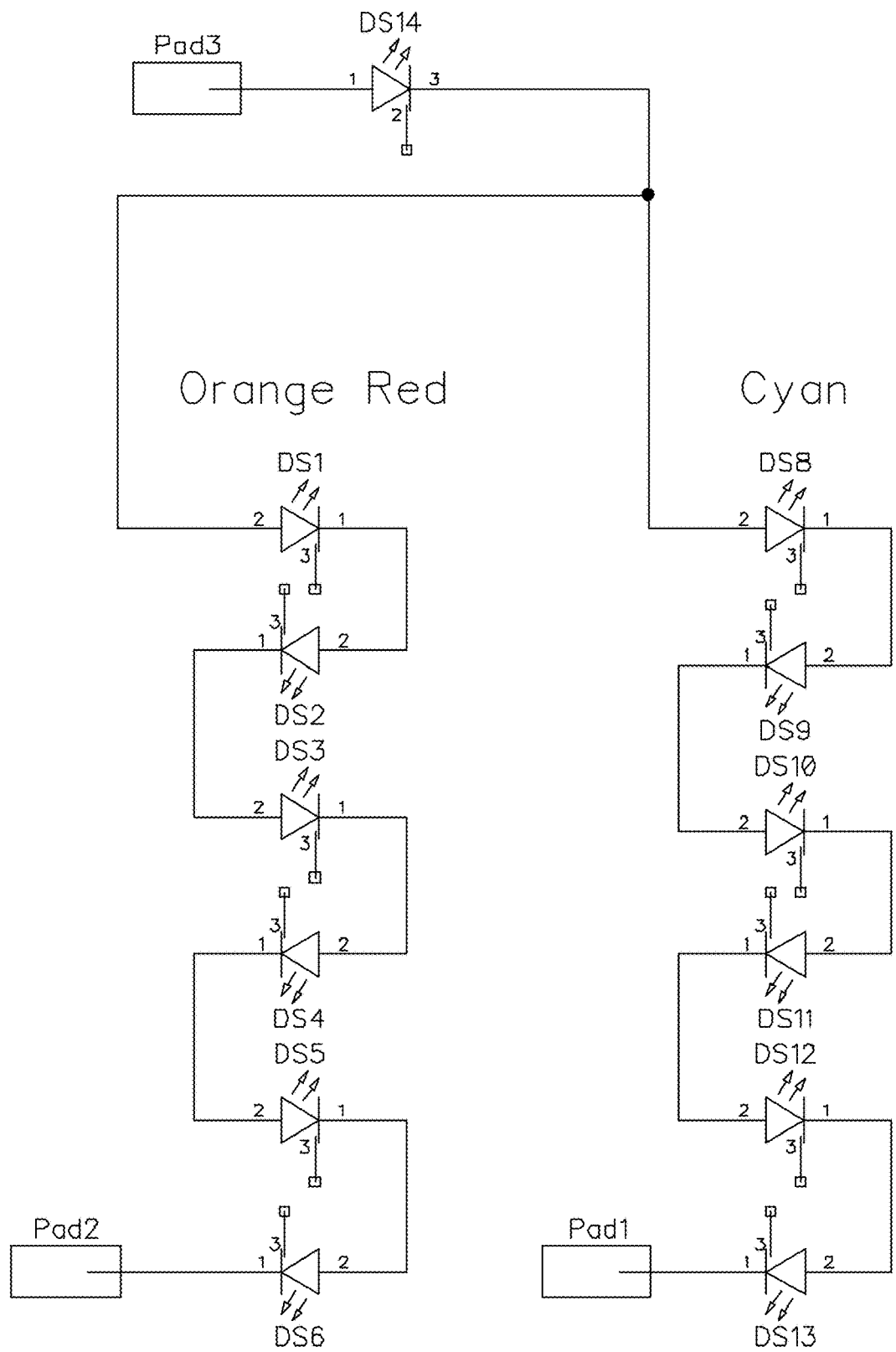

FIGS. 28-30 show example electrical circuit schematics of the visual distress signal device 500. To control the flash pattern, a System of a Chip (SoC) may be used as the wireless communication module 381. For example, a Rigado BMD-330 Module may be used and/or a Rigado BMD-340 Module may be used. The Rigado BMD-330 Module may provide a Bluetooth interface for a short range (e.g., approximately 50 meters) and/or the Rigado BMD-340 Module may provide a Bluetooth interface for a larger range (e.g., approximately 150 meters). One or more (e.g., both) modules may be used with the footprint for the BMD-340 Module which may allow for hardware conversion from one module to the other.

As described herein, the visual distress signal device 100 may have one or more (e.g., three in the exemplified embodiment) settings, which may include an On, Off, and/or wireless setting, although one or more other settings may be used. The visual distress signal device 100 may be made with any combinations of On, Off, and/or wireless communication settings.

In some embodiments, the visual distress signal device 100 may be powered by batteries (e.g., 8 CR123A batteries) in series, providing 3.6V×8 or 28.8V initially. A Buck version of an LED switching supply module may be used to drive the LEDs. The LEDs may be configured such that the most positive anode of both the Cyan and Orange-Red strings are connected to the cathode of the Infrared LED. One or more (e.g., each) of the most negative cathodes of the strings may be connected to the drain of a separate N-Channel Enhancement MOSFET (Q2, Q3). The source of each MOSFET may be connected to the LED Return. A (e.g., each) MOSFET may be controlled by a separate I/O pin on the SoC Module, which may control which LED string is on at the time. As the temperature drops, the threshold of the MOSFET may increase, which may rise above the available output of the SoC. To ensure that the MOSFET turns on at any temperature, NPN transistors (Q6, Q7) may be used to interface between the I/Os of the SoC and the MOSFETs (e.g., as the voltage required to turn the on is approximately a diode drop). When the transistor is turned on from current from the I/O pin, it pulls the gate of the MOSFET low, turning it off. When the I/O Pin goes low, the transistor may be turned off. This may allow the pullup resistors (R10, R11) to pull the gates of the MOSFETs high. This may be limited by the 10 V zeners (D1, D2) which may be used to protect the gates from overvoltage.

Because the SoC may provide Bluetooth connectivity, it may be programmed to control the light via a Bluetooth application, for example, from a device such as a cell phone or laptop. This may also provide the ability to update the firmware (e.g., update the firmware wirelessly). The state of pins 4 and 5 of the SoC may determine the state of the unit, for example, whether it is in "Manual Mode" (On or off from the switch) or "Bluetooth Mode" (On or off via Bluetooth). Because the SoC may run on 1.7V to 3.6V, a transistor is used to level shift from the 28.8V signal to the SoC voltage for the I/O.

In Bluetooth Mode, the SoC may have a backup voltage source (e.g., the coin cell battery 382 which may be a 3V Coin Cell) which may be connected. The negative side may be grounded when an N-Channel MOSFET is turned on by a contact on the switch that pulls the gate of the MOSFET high. The Coin Cell may be connected to the SoC, for example, via a low leakage diode (D5). This may allow one to "OR" another power supply and/or to prevent charging the coin cell from another supply. The current (e.g., maximum current) allowed into a CR2032 coin cell may be 1 uA, so it may be important to prevent charging from other supplies.

When in the Manual mode and/or when the coin cell battery is exhausted, the SoC may be powered from a supply derived from the LED Buck Switching Module's 5V reference. Going to the SoC, it may be regulated by a resistor and a 3.6V zener (R5 and D3) and the "ORed" with the Coin Cell Supply through another low leakage diode (D6).

J1 is a programming connector. Initial firmware may provide the programming that allows for the option of Over the Air Programming (OTA).

The components in the box labeled "Do Not Populate" may not normally be required but can be used when the LED Driver Module needs to be shut down. When the signal to the base of the transistor (Q1) goes high, it may turn open the connection from the 5V reference to the control pin. When the signal to the base of the transistor (Q1) goes low, it may connect the 5V reference to the control pin, shutting down the module.

Pad 1 may connect to the most negative cathode of the Cyan LED String. Pad 2 may connect to the most negative cathode of the Orange Red String. Pad 3 may connect to the positive LED driver pin.

Because the LEDs (such as electromagnetic radiation emitting elements 500) may generate heat (e.g., considerable heat, such as 22 W of heat) a heatsink may be required, such as heat sink 310 described herein. The LEDs may be mounted on an aluminum substrate PCB (e.g., plate member 330) that may include copper traces above a thermally conductive epoxy coating. The heat from the board may be conducted through an aluminum ring (i.e., ring member 341) below the plate member 330, transferring the heat to the aluminum plate (i.e., ring member 344) which may be in contact with an aluminum collar (i.e., disc member 344). The thermal path may transfer the heat from the LEDs to the outside (e.g., the outside of the device 100). Transferring the heat from the LEDs may be beneficial as the output from the orange-red LEDs declines (e.g., steeply declines) with temperature, for example, which is a greater decline than other LEDs.

As described herein, the connection to the batteries may be provided by contacts (e.g., spring contacts) that may be constructed so as to prevent connection when the batteries are inserted with the wrong polarity (e.g., the wrong polarity facing up). Examples may include features on the driver board (e.g., battery contact member 385 coupled to the spring) that may prevent contact to an inverted battery.

Figure 31:
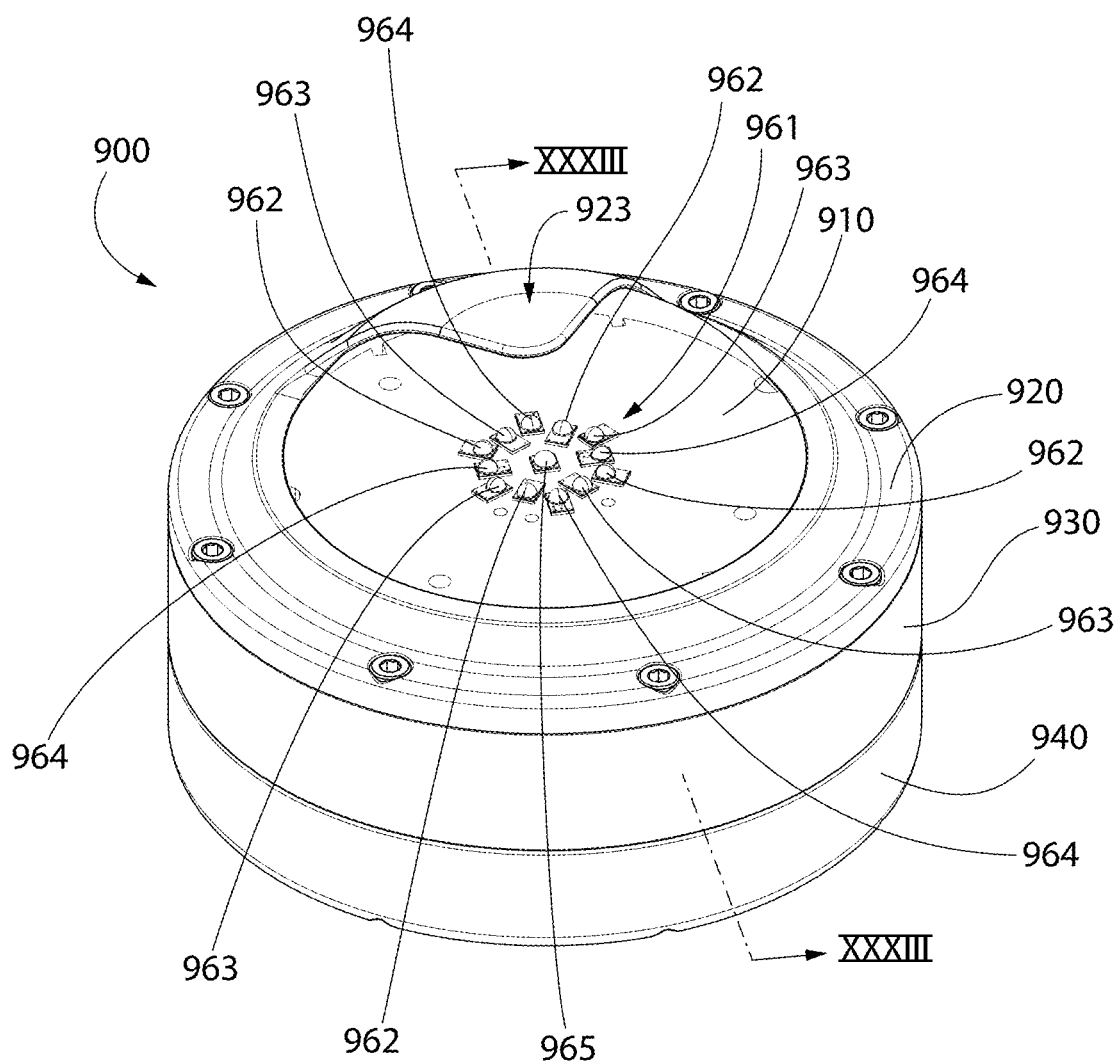
FIG. 31 is a perspective view of a light device in accordance with another embodiment of the present invention.
Figure 32:
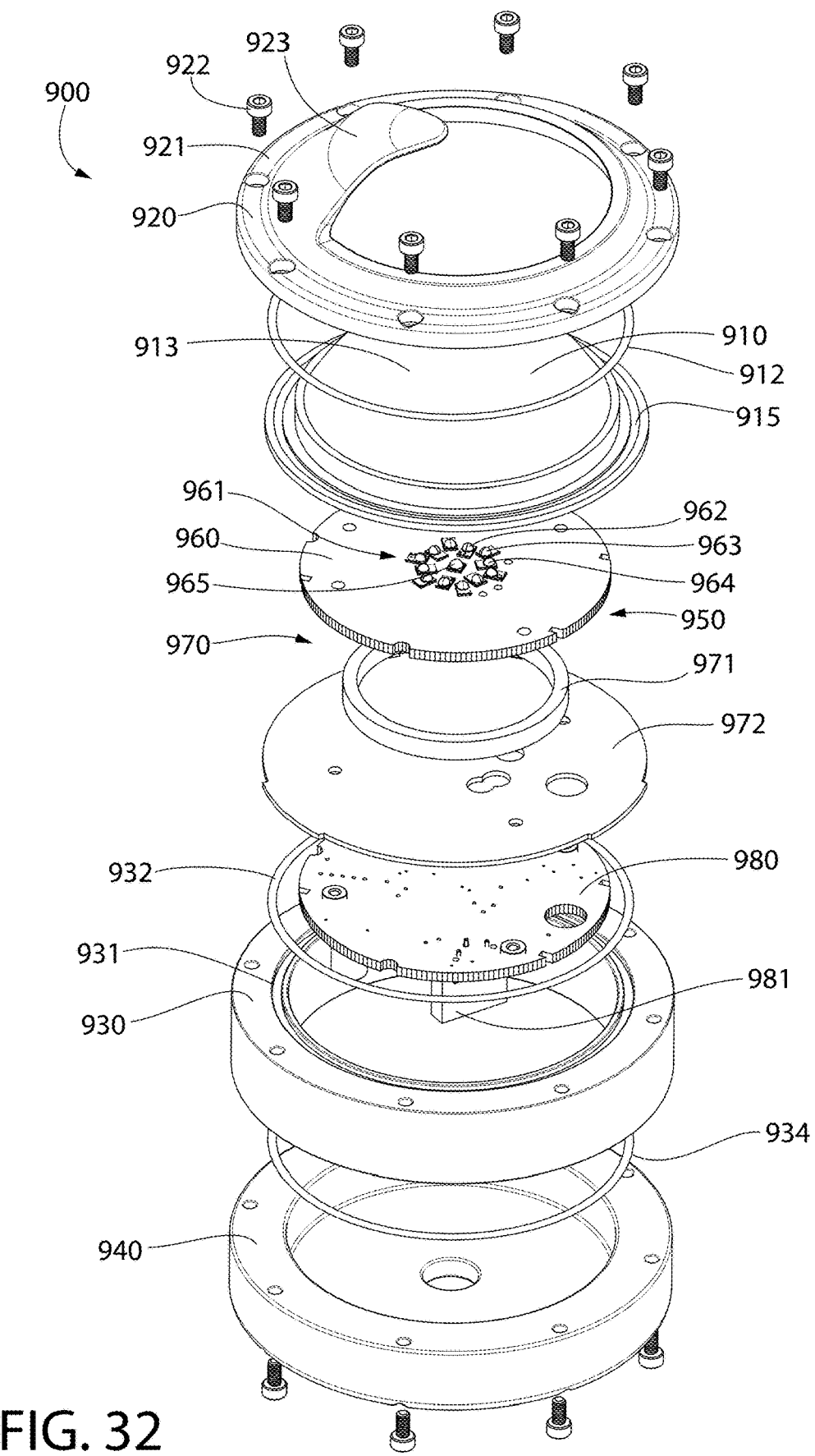
FIG. 32 is an exploded view of the light device of FIG. 31.
Figure 33:
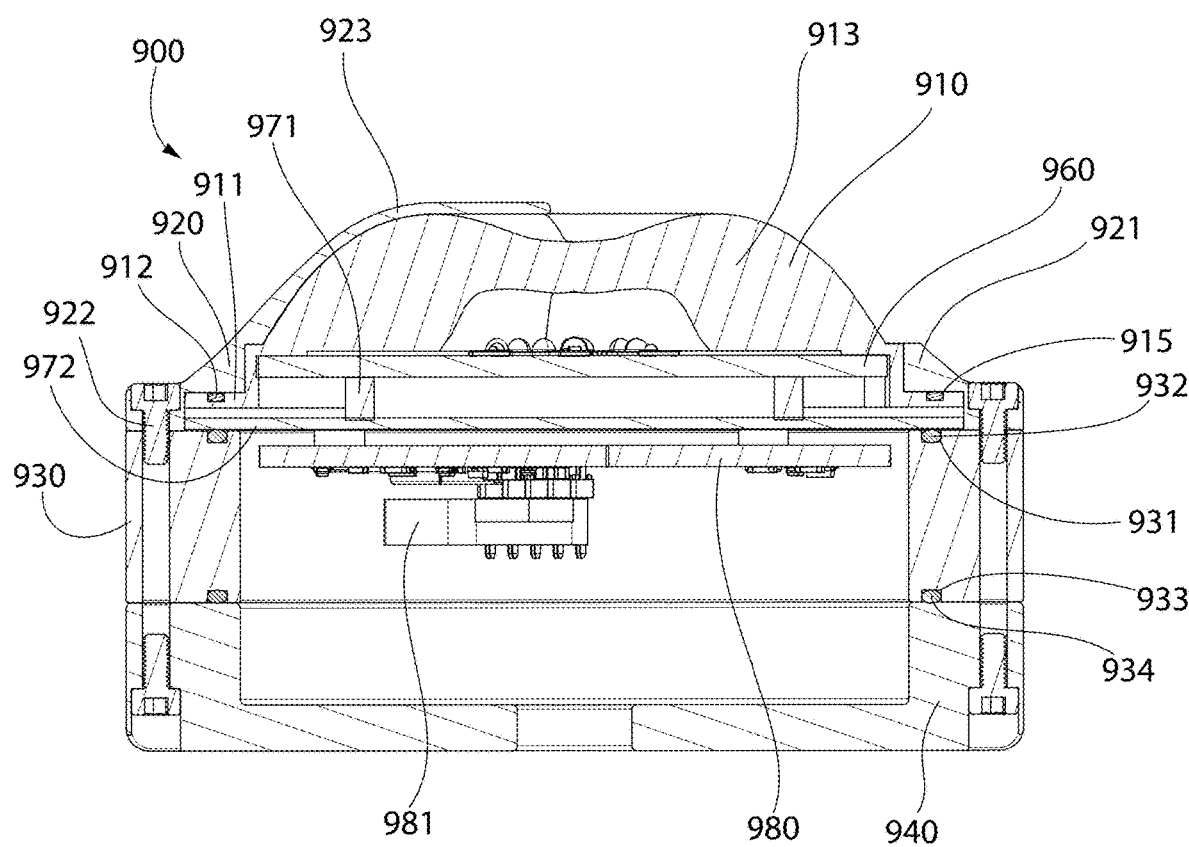
FIG. 33 is a cross-sectional view taken along line XXXIII-XXXIII of FIG. 31.

Referring to FIGS. 31-33, a light device 900 is illustrated and will be described in accordance with an embodiment of the present invention. The light device 900 may operate both in a white light mode and in a distress mode. Thus, the light device 900 is not being referred to herein as a visual distress signal device because it does not only operate as a visual distress signal device but can also operate as a more conventional white light device.

The light device 900 is not a handheld device like the visual distress signal device 100 described above. Rather, the light device 900 is intended to be fixedly mounted to a boat or other vessel and coupled directly to the lighting wiring of the vessel. Boats or vessels may be required to have green starboard sidelights and red port sidelights that are visible to approaching vessels. Boats or vessels may also be required to have a sternlight, which is a white light located at the stern of the boat and only visible from behind the vessel, and a masthead light, which is a white light that shines forward and to both sides. Finally, boats or vessels may include an all-round light which is a white light that shines constantly over the horizon at an arc of 360 degrees. The all-round light may be used in combination with the masthead light and the sternlight, and in some circumstances the all-round light may be used to replace the masthead light and the sternlight.

In some embodiments, the light device 900 may replace the conventional all-round light on a boat. As discussed herein, the light device 900 may be configured to operate in multiple modes, including a first mode wherein the light device 900 emits a white light at an arc of 360 degrees like a conventional all-round light and a second mode wherein the light device 900 emits light in two colors (e.g., red-orange and cyan) in accordance with an SOS pattern as described herein as a visual distress signal. Thus, the light device 900 can normally operate as the all-round light or a navigation/mooring light, and can be easily switched into the second mode in times of distress to indicate such distress to other boaters, members of the Coast Guard, or the like.

In some embodiments, the light device 900 may be powered on and off (described in more detail below) in the same manner that the traditional operating lights or the conventional all-round light for the vessel are powered on and off (by actuating a switch on the dashboard or other location of the boat or vessel). The light device 900 may have a dedicated switch on the dashboard of the vessel in some embodiments, or it may be operated in conjunction with the same switch that operates the running lights (i.e., the navigation light system or portions thereof, such as the all-round lights) of the vessel.

The light device 900 comprises a lens member or optic 910, a shroud 920, a first base component 930, a second base component 940, and a light module 950. The light module 950 comprises a board 960 on which a plurality of electromagnetic radiation emitting elements 961 are positioned, a heat sink assembly 970 comprising a ring member 971 and a disc member 972, and a circuit board assembly 980 which comprises a processor 981. The light module 950 and its components are very similar to the light module 399 described above, and thus the components thereof will not be described in detail here it being understood that the description of the light module 399 above is applicable. That is, the details of the board 960 are the same as the plate member 330, the details of the ring member 971 are the same as the ring member 341, the details of the disc member 972 are the same as the disc member 344, and the details of the circuit board assembly 980 are similar to the circuit board 370. The lens member 910 may be identical structurally and otherwise to the lens member 350 described above and therefore details for the lens member 910 will not be provided here in the interest of brevity.

It should be noted that the electromagnetic radiation emitting elements 961 may be different than the electromagnetic radiation emitting elements 500 described above with reference to the visual distress signal device 100. Specifically, in the exemplified embodiment the electromagnetic radiation emitting elements 961 may comprise a plurality of first light emitters 962, a plurality of second light emitters 963, a plurality of third light emitters 964, and an infrared light emitter 965. The first light emitters 962 may emit orange-red light as noted above, the second light emitters 963 may emit cyan light as noted above, and the third light emitters 964 may emit white light. The first, second, and third light emitters 962, 963, 964 are arranged in a circle, and the infrared light emitter 965 is positioned at a centerpoint of the circle. The first, second, and third light emitters 962, 963, 964 may be positioned in an alternating arrangement around the circle. In this embodiment the light emitters are arranged in the same manner as with the previous embodiment, except two of the orange-red LEDs and two of the cyan LEDs are replace with white LEDs so that there are four of the orange-red LEDs, four of the cyan LEDs, and four of the white LEDs, as well as the one infrared light emitter 965.

When assembled, a flange 911 of the lens member 910 is placed between a flange 921 of the shroud 920 and the first base component 930 and secured thereto with fasteners 922 such as screws. An upper surface of the flange 911 of the lens member 910 comprises a channel 915 within which a gasket 912 is positioned to create a hermetic, air-tight seal between the flange 911 of the lens member 910 and the flange 921 of the shroud 920. Furthermore, prior to securing the shroud 920 to the first base component 930, the light module 950 is positioned with the disc member 972 atop of the top surface of the first base component 930. Thus, as the shroud 920 is secured to the first base component 930, the light module 950 and the flange 911 of the lens member 910 become sandwiched between the flange 921 of the shroud 920 and the first base component 930. The first base component 930 comprises a channel 931 in its top surface, and a gasket 932 is disposed within the channel 932 to create an air-tight seal between the light module 950 (specifically the disc member 972) and the first base component 930. The first base component 930 also comprises a channel 933 in its bottom surface and a gasket 934 is disposed within the channel 933. This creates an air-tight hermetic seal between the first and second base components 930, 940 when assembled as best shown in FIG. 33.

In the exemplified embodiment, the shroud 920 comprises the flange 921 which is annular in shape and a cover member 923 which extends from the flange 921 of the shroud 920 inwardly towards a central axis of the shroud 920 and upwardly. The cover member 923 covers a portion of a dome portion 913 of the lens member 910 when the light device 900 is assembled as shown in FIGS. 31 and 33.

Figure 34:
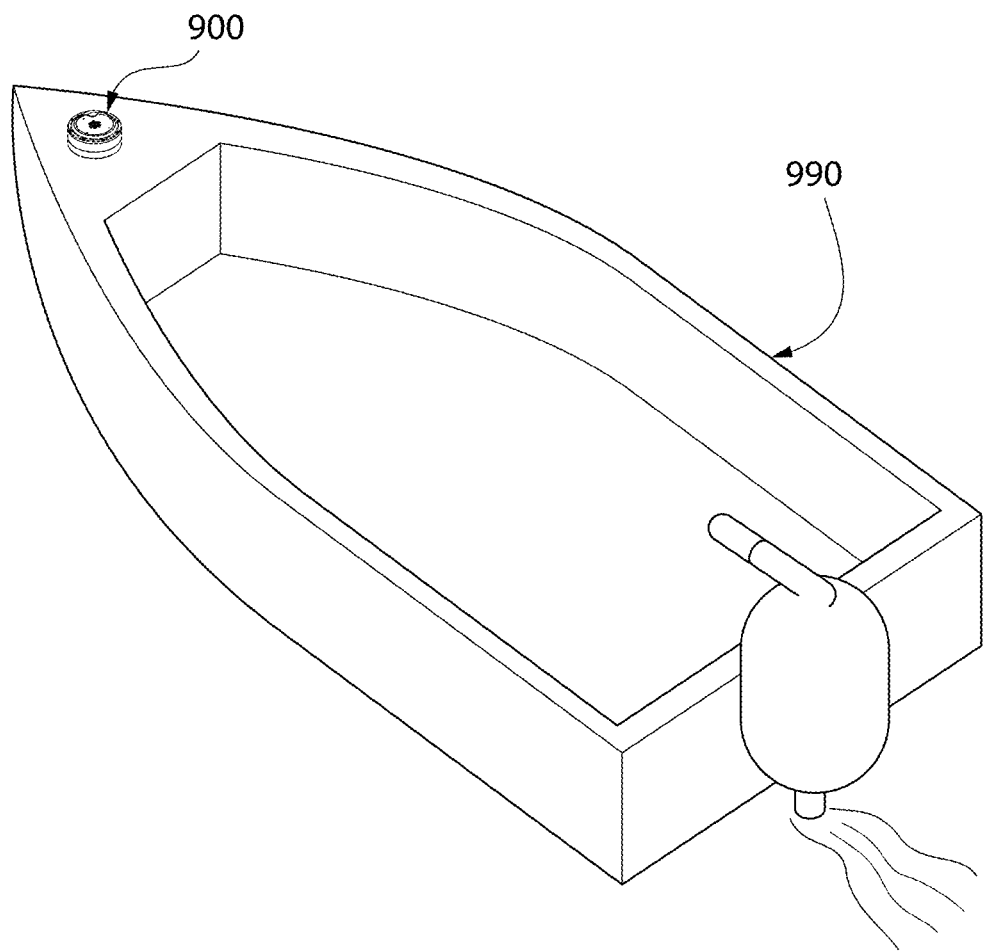
FIG. 34 is an illustration of the light device of FIG. 31 fixedly mounted to a vessel.
Figure 35:
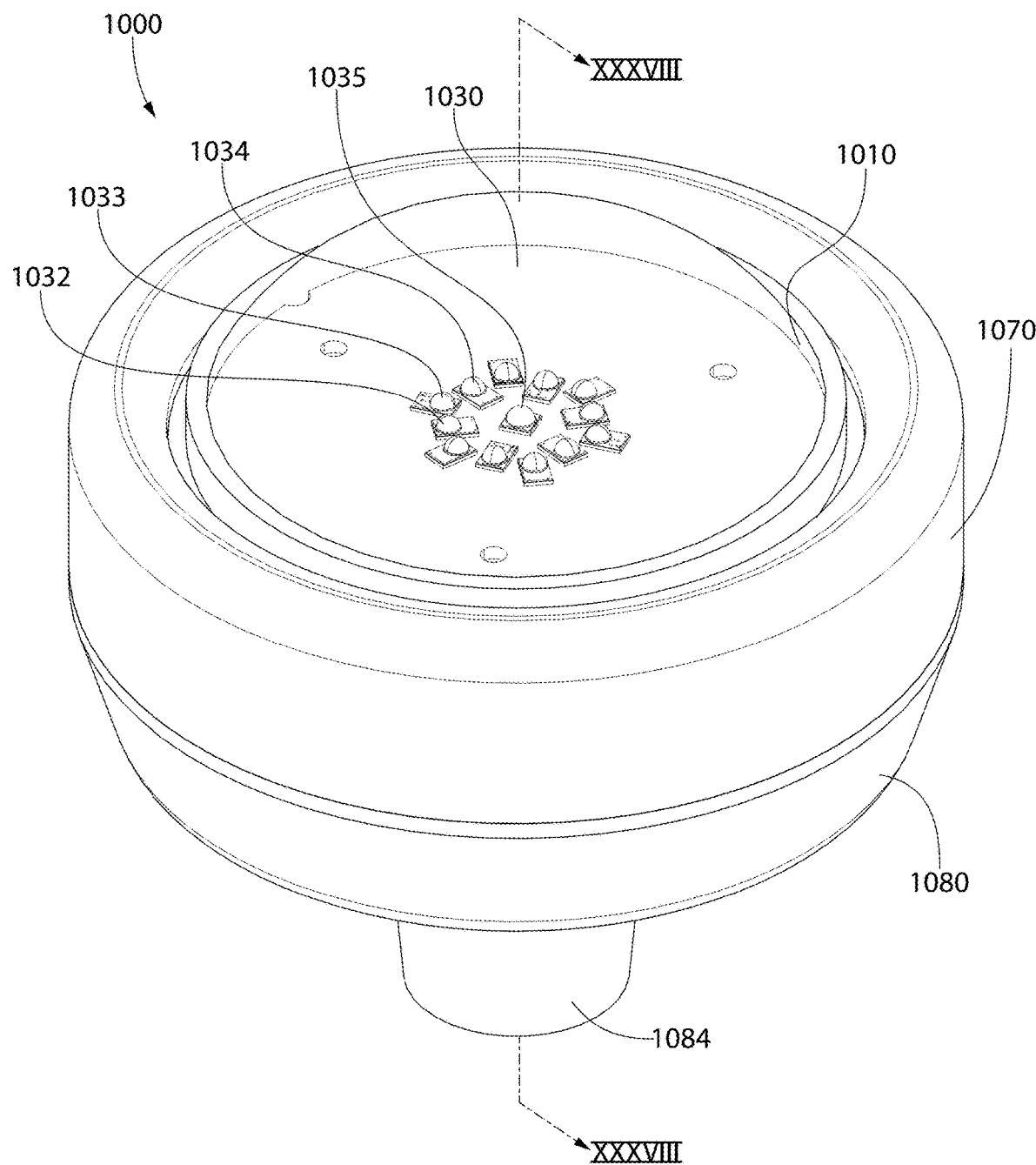
FIG. 35 is a perspective view of a light device in accordance with another embodiment of the present invention.
Figure 36:
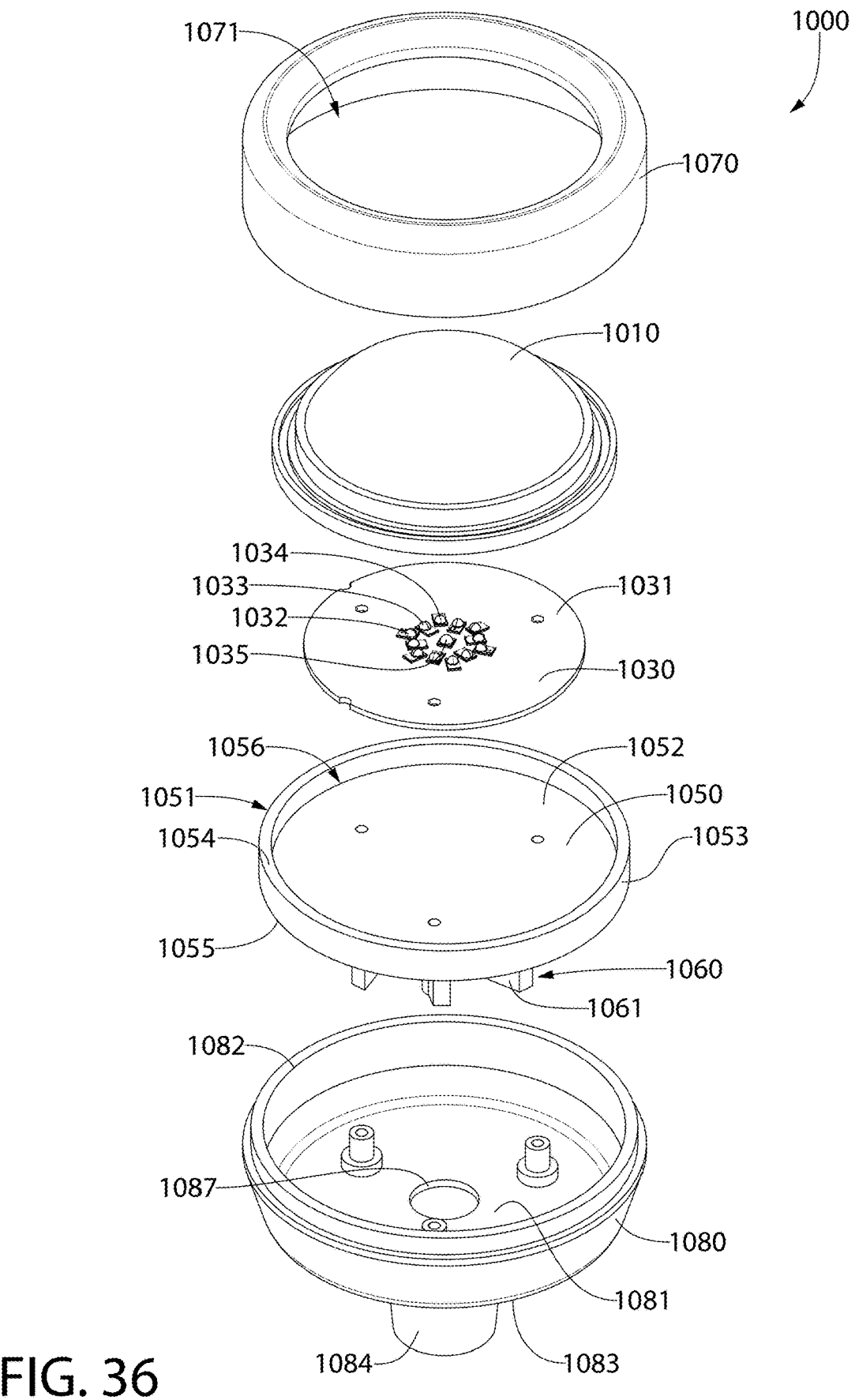
FIG. 36 is a top perspective exploded view of the light device of FIG. 35.
Figure 37:
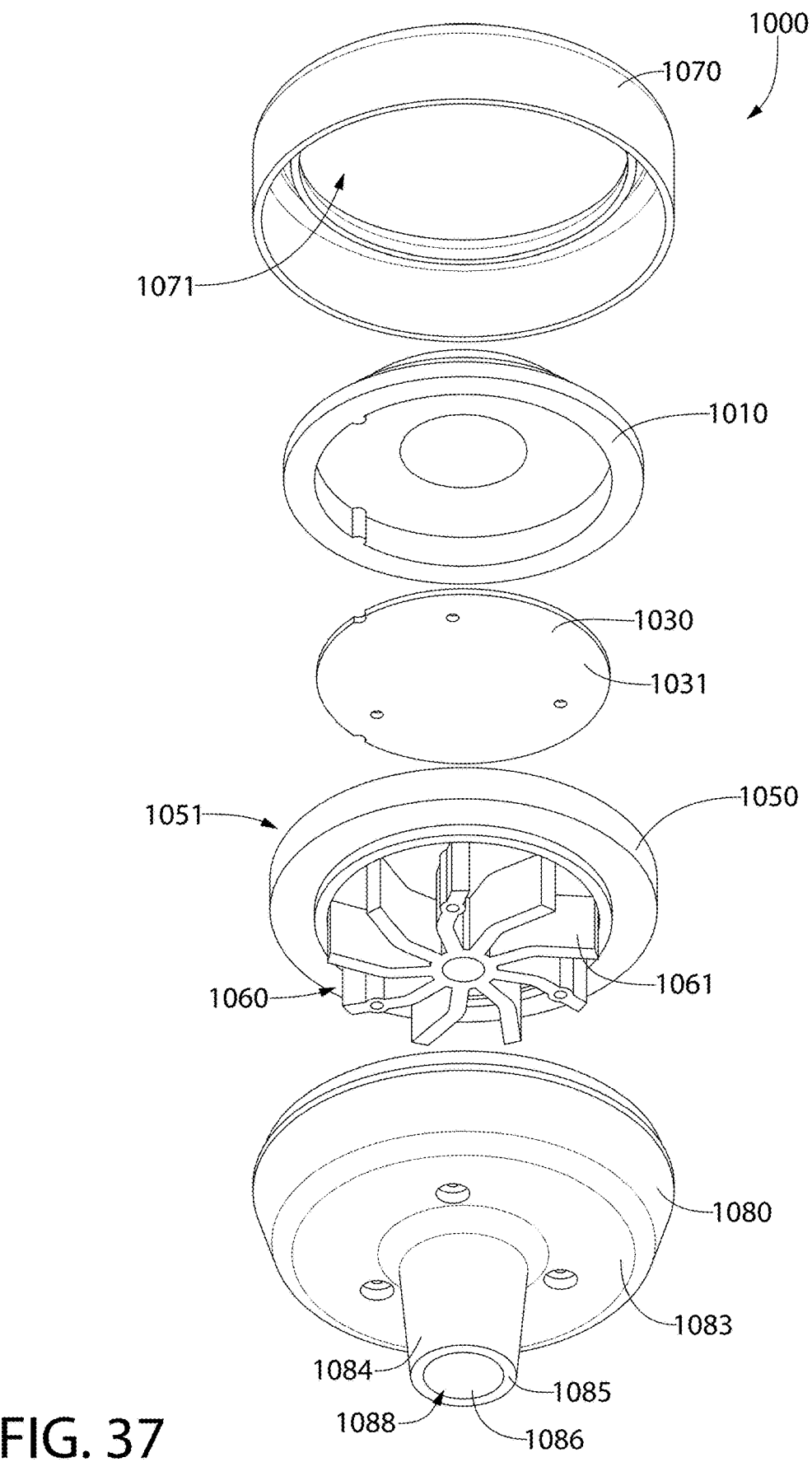
FIG. 37 is a bottom perspective exploded view of the light device of FIG. 35.

As noted above, the light device 900 is configured to be mounted directly to a boat 990, as shown in a non-limiting exemplary embodiment in FIG. 34. Thus, the light device 900 may be wired to the boat 990 so that actuating the light switch on the boat 990 will power the light device 900 on and off. The light device 900 may operate in accordance with at least two different modes in some embodiments. Upon a user actuating the light switch on the boat 990 from an off state to an on state, the light device 900 will be powered and operating in a first mode such that the third light emitters 964 will emit white light. In this first mode, the light device 900 operates as a conventional all-round light with the third light emitters 964 emitting white light in a 360 degree pattern. The third light emitters 964 may continue to emit the white light until the light switch is powered off. If the light switch is simply actuated from the on state to the off state, the third light emitters 964 will cease emitting the white light and none of the other light emitters of the light device 900 will emit light either.

However, if the light switch is actuated off and then back on within a predetermined time period, then the light device 900 will begin to operate (i.e., emit light) in accordance with a second mode of operation. In the second mode, the first and second light emitters 962, 963 will emit light in accordance with a predetermined illumination pattern. In accordance with an exemplary embodiment of the present invention, in the second mode the first and second light emitters 962, 963 emit orange-red and cyan light, respectively, in accordance with a predetermined illumination pattern. The predetermined illumination pattern may preferably be the SOS flashing pattern described above in some embodiments. In other embodiments, other flashing patterns may be used. In accordance with the preferred embodiment, in the second mode of operation, the first and second light emitters 962, 963 emit light in accordance with the SOS pattern that was described above with reference to the visual distress signal device 100 (three flashes of the plurality of first light emitters 962 followed by three flashes of the plurality of second light emitters 963 followed by three flashes of the plurality of first light emitters 962, wherein during each flash of the plurality of first light emitters 962 the plurality of first light emitters are activated for a first time period and deactivated for the first time period, and wherein during each flash of the plurality of second light emitters 963 the plurality of second light emitters 963 are activated for a second time period and deactivated for the first time period, the second time period being greater than the first time period).

The predetermined time period may be a time period that is set by the manufacturer, or it may be adjustable by the end-user. The pre-determined time period may be a two second time period, or a three second time period, or a four second time period, or a five second time period, or a six second time period, or a seven second time period, or an eight second time period, or a nine second time period, or a ten second time period, or a fifteen second time period, or a twenty second time period. In preferred embodiments, the predetermined time period is no more than five seconds, or perhaps no more than three seconds, because in an emergency a user will quickly toggle the light off and on to initiate the second mode.

If the switch is actuated off and then not actuated back on until after expiration of the predetermined time period, then the light device 900 will begin to operate in accordance with the first mode of operation. In some embodiments, if the light device 900 is in the second mode of operation and the light switch is actuated off and back on again within the predetermined time period, then the light device 900 will alter from being operated in the second mode to being operated in the first mode. Thus, turning the switch off and on within a predetermined time period will alter the mode of operation of the light device in some embodiments. In other embodiments, if the light device 900 is in either of the first or second modes of operation and the switch is actuated off and back on again within the predetermined time period, the light device 900 will operate in accordance with the second mode. That is, in some embodiments regardless of which mode the light device 900 is in before toggling the switch quickly off and back on, the light device 900 will operate in the second mode of operation. If the light device 900 is powered off and a user wants to activate the second mode, the user may need to toggle the switch on, off, and then back on in order to initiate the second mode (and the user will need to make sure that the "back on" step is achieved within the predetermined time period from when the switch is toggled off).

In the description above, the first mode of operation comprises the third light emitters 964 emitting light (preferably white light in a solid, 360 degree manner) and the second mode of operation comprises the first and second light emitters 962, 963 emitting light in accordance with an SOS or other flashing pattern. Moreover, although an SOS flashing pattern has been described, other illumination patterns may be used as understood by persons skilled in the art.

In some embodiments, the LEDs used on the visual distress signal devices and light devices 100, 900 described herein may be L1C1-RNG1000000000 and L1C1-CYN1000000000. However, the invention is not to be limited to this in all embodiments.

Referring to FIGS. 35-38, a light device 1000 will be described in accordance with still another embodiment of the present invention. The light device 1000 is a fixed mount device much like the light device 900. That is, the light device 1000 is configured to be mounted directly to a boat or vessel to take the place of the vessel's all-round lights or mooring lights or the like as discussed herein above with reference to the light device 900. However, the light device 1000 has a simplified structure and mounting configuration for mounting the light device 1000 to the vessel. The light device 1000 is simply an alternative structure for the light device 900 and thus all discussions of the modes of operation and function of the light device 900 are wholly applicable to the light device 1000.

Figure 38:
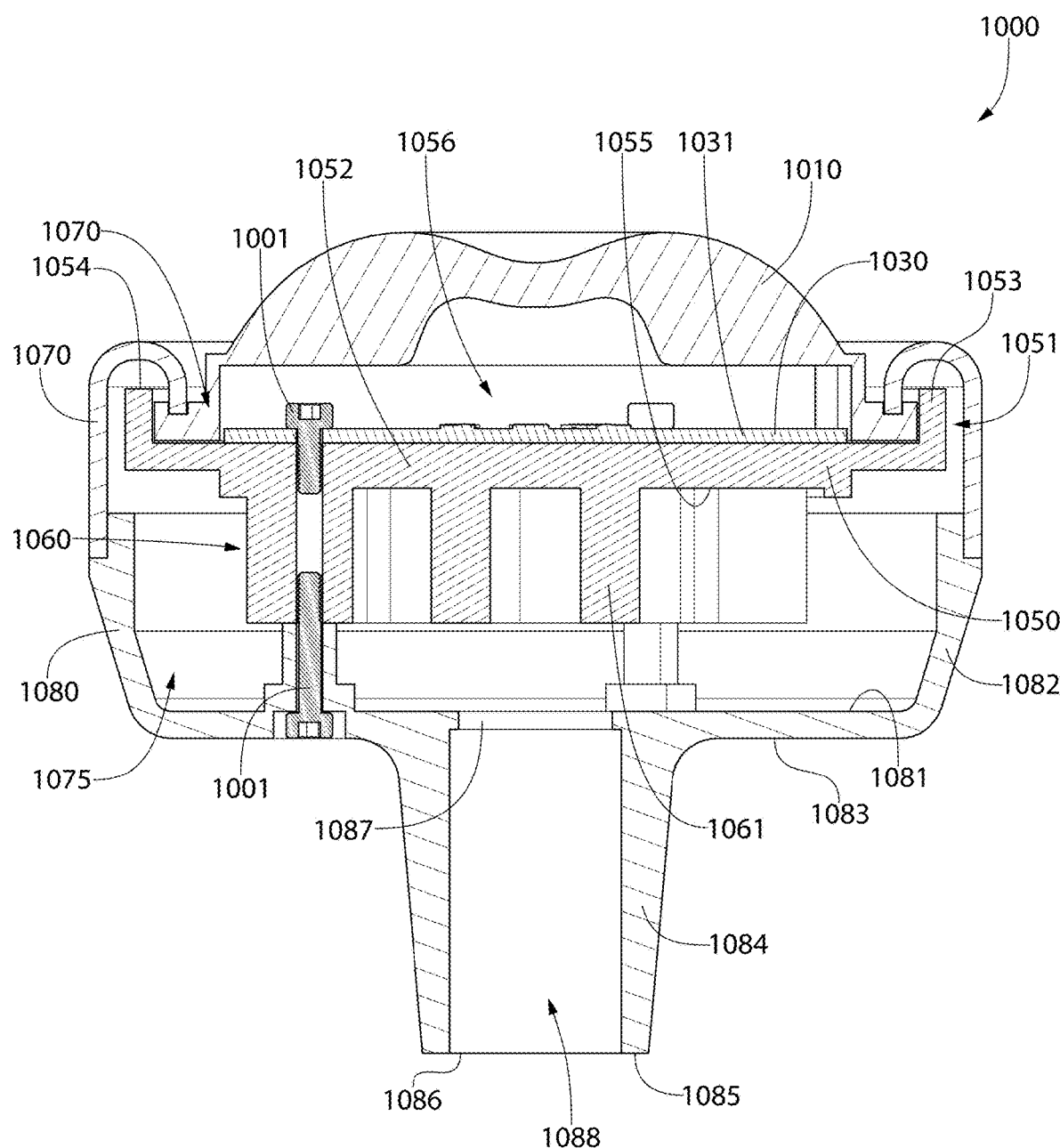
FIG. 38 is a cross-sectional view taken along line XXXVIII-XXXVIII of FIG. 35.

The light device 1000 comprises a lens member or optic 1010, a light module 1030, a heat sink assembly 1050, and a housing which is formed by a first housing part 1070 and a second housing part 1080. The first and second housing parts 1070, 1080 house the remaining parts of the light device 1000 preferably in a water-tight manner using O-rings, gaskets, or the like. The first and second housing parts 1070, 1080 may be coupled together via snap-fit connection, press-fit connection, friction fit, threaded attachment, or the like. In other embodiments, separate fasteners, such as the screws 1001 depicted in FIG. 38, may be used to couple the first and second housing parts 1070, 1080 together. In FIG. 38, the screws 1001 are used to securely coupled the light module 1030 and the heat sink assembly 1050 to one another and to the second housing part 1080, although the screws 1001 could also be used to couple the first housing part 1070 to the second housing part 1080. The first and second housing parts 1070, 1080 may be formed out of plastic in some embodiments, although the invention is not to be so limited in all embodiments.

The first housing part 1070 may be an annular ring-like member (or collar member) that presses downwardly on the lens member 1010 to hold the lens member in place when the first housing part 1070 is coupled to the second housing part 1080. The first housing part 1070 may therefore comprise a central opening 1071 through which at least a portion of the lens member 1010 protrudes when the light device 1000 is fully assembled, as best shown in FIG. 38. The first and second housing parts 1070, 1080, when coupled together, define a cavity 1075 within which a portion of the lens member 1010 and the entirety of the light module 1030 and the heat sink assembly 1050 are positioned when the light device 1000 is assembled. The lens member 1010 may have a similar, if not identical, structure to the lens member 910 described above and thus the description of the lens member 910 is applicable to the lens member 1010.

The second housing part 1080 comprises a floor 1081 and a sidewall 1082 protruding upwardly from the floor 1081 to define at least a portion of the cavity 1075. Furthermore, the second housing part 1080 has a bottom end 1083 and a cylindrical wall or tube-like wall 1084 protruding downwardly from the bottom end 1083. The cylindrical wall 1083 is cylindrical and therefore has a round cross-sectional area in the exemplified embodiment, but the invention is not to be limited to this in all embodiments and the cylindrical wall 1083 could take on other shapes. The cylindrical wall 1084 terminates in an opening 1086 at its distal end 1085. Furthermore, the cylindrical wall 1084 defines or surrounds a passageway 1088 that extends form the opening 1086 at the distal end 1085 of the cylindrical wall 1084 to an opening 1087 in the floor 1081. Thus, electrical wires that are coupled to the light module 1030 are able to pass through the passageway 1088 for electronic coupling with electronic circuitry associated with the boat or vessel.

Figure 39:
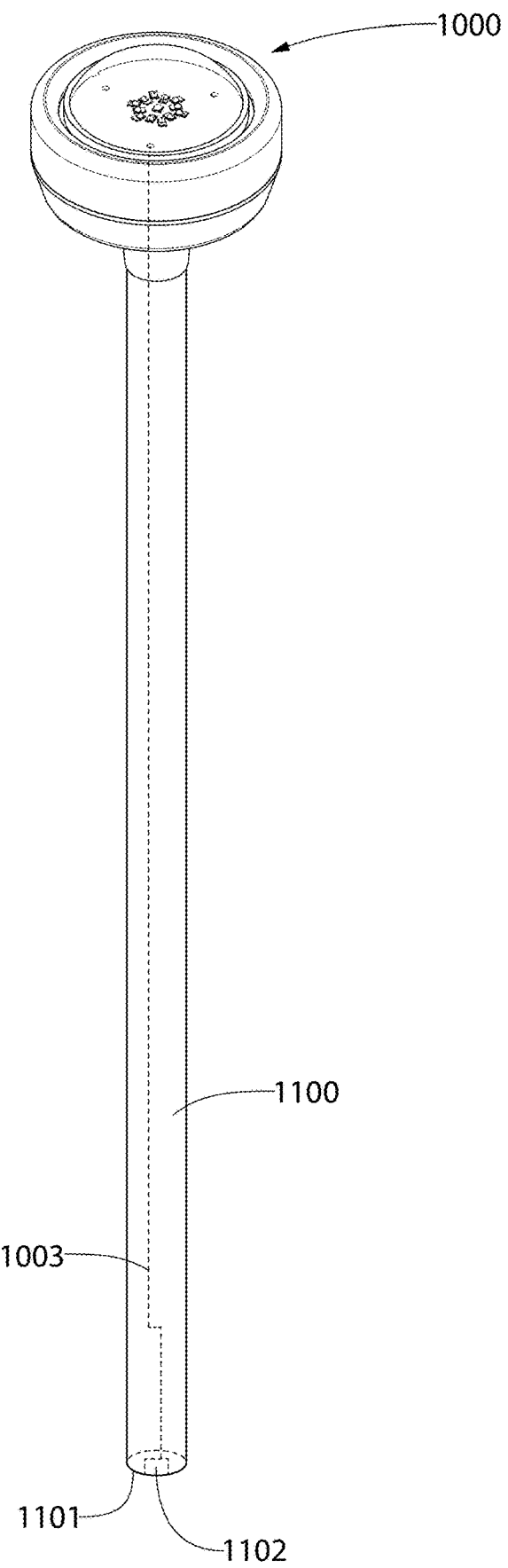
FIG. 39 is a perspective view of the light device of FIG. 35 mounted on a pole.

For example, as shown in FIG. 39, the light device 1000 may be mounted on a pole 1100. A top portion of the pole 1100 nests within the passageway 1088 of the cylindrical wall 1084 of the second housing part 1080 and a remainder of the pole 1100 extends from the distal end 1085 of the cylindrical wall 1084. The bottom end 1101 of the pole 1100 may comprise electrical contacts 1102 (shown schematically with ghost lines in FIG. 39). Electrical wires 1103 (shown schematically with ghost lines in FIG. 39) may be coupled to the light module 1030 and to the electrical contacts 1102 (although a single electrical wire 1103 is shown in FIG. 39, there could be two or more electrical wires as needed in various different embodiments and they could be coupled to different electrical contacts 1102 at the bottom end 1101 of the pole 1100). As such, when the pole 1100 is mounted to an all-round light receiving socket of a boat or vessel, the electrical contacts 1102 of the pole 1100 will electrically couple to the electronic circuitry of the boat or vessel so that toggling a switch on the boat or vessel can control activation and deactivation of the electromagnetic radiation emitting elements of the light device 1000 and the various modes associated therewith (the light device 1000 is configured to be activated in the first and second modes which were described above with reference to the light device 900).

Returning again to FIGS. 35-38, the light module 1030 comprises a board 1031, such as a printed circuit board, and a plurality of electromagnetic radiation emitting elements positioned thereon. The light module 1030 may also comprise a processor or the like as has been described herein with reference to the earlier described embodiments. In this embodiment, the plurality of electromagnetic radiation emitting elements comprises a plurality of first light emitters 1032, a plurality of second light emitters 1033, a plurality of third light emitters 1034, and at least one infrared light emitter 1035. The electromagnetic radiation emitting elements may be light emitting diodes in some embodiments, or may take other forms as has been described herein. The plurality of first light emitters 1032 may be configured to emit orange-red light, the plurality of second light emitters 1033 may be configured to emit cyan light, and the plurality of third light emitters 1034 may be configured to emit white light. Thus, the plurality of electromagnetic radiation emitting elements may be positioned and arranged in a circle in the same manner as the electromagnetic radiation emitting elements 961 of the light device 900 described above. The light unit 1000 is configured to operate in the first and second modes as described above with reference to the light unit 900 and thus this operation will not be repeated here in the interest of brevity.

The heat sink assembly 1050 is formed from a heat conductive material to conduct heat generated by the light module 1030 away from the light module 1030. The heat conductive material may be one or more metals or metal alloys in some embodiments. One particular metal used for these components may be aluminum which has a high thermal conductivity, although the invention is not to be so limited in all embodiments and other metal materials may be used including copper, aluminum alloys, or the like.

The heat sink assembly 1050 comprises a receiving portion 1051 and a heat sink portion 1060. The receiving portion 1051 of the heat sink assembly 1050 comprises a floor 1052, a sidewall 1053 extending from the floor 1052, a top end 1054 which is located at the distal end of the sidewall 1053, and a bottom end 1055. The floor 1052 and the sidewall 1053 define a recess or cavity 1056 within which the light module 1030 is positioned when the light device 1000 is assembled. That is, when the light device 1000 is assembled, the board 1031 of the light module 1030 is positioned within the cavity 1056 of the receiving portion 1051 of the heat sink assembly 1050. There are holes in the board 1031 of the light module 1030 that are aligned with holes in the floor 1052 of the receiving portion 1051 of the heat sink assembly 1050, which are also aligned with holes in the floor 1081 of the second housing part 1080 so that the fasteners 1001 can be inserted through the holes to secure the light module 1030, the heat sink assembly 1050, and the lower housing part 1080 together.

When the light module 1030 is disposed within the cavity 1056, the lower surface of the board 1031 of the light module 1030 is in surface contact with the floor 1052 of the receiving portion 1051 of the heat sink assembly 1050. Furthermore, the heat sink assembly 1050 is formed from a heat conducting material as described above. Thus, heat generated by the light module 1030 will be conducted through the bottom surface of the board 1031 of the light module 1030 to the heat sink assembly 1050, where it will be dissipated by the heat sink portion 1060 of the heat sink assembly 1050.

In that regard, the heat sink portion 1060 of the heat sink assembly 1050 comprises a plurality of ribs 1061 protruding from the bottom surface 1055 of the receiving portion 1051. In the exemplified embodiment, the ribs 1061 are arranged in a radial manner from a centerpoint, but the invention is not to be limited by the specific arrangement of the ribs 1061 in all embodiments. Moreover, in the exemplified embodiment each of the ribs 1061 is arcuate in shape, but the ribs 1061 may be linear or wavy or the like in other embodiments. In any case, the plurality of ribs 1061 extend from the bottom surface 1055 of the receiving portion 1051 in a spaced apart manner to maximize the surface area of the ribs 1061 which is exposed and capable of dissipating the heat conducting therethrough. While not shown in the drawings, there may be a filler extending through the housing that is in contact with the heat sink portion 1060 of the heat sink assembly 1050 to ensure that the heat is dissipated into the atmosphere. This can be done in various ways including having a metal filler extend through openings in the housing into contact with the heat sink assembly 1050, having the heat sink assembly 1050 extend into the cylindrical wall 1084 and out through an opening so as to be exposed to the ambient, or the like. In still other embodiments, one or both of the housing parts 1070, 1080 may be formed from a heat conducting material such as metal and the heat sink assembly 1050 may be in contact with the housing part to transfer heat to the housing part and the ambient environment.

Figure 40:
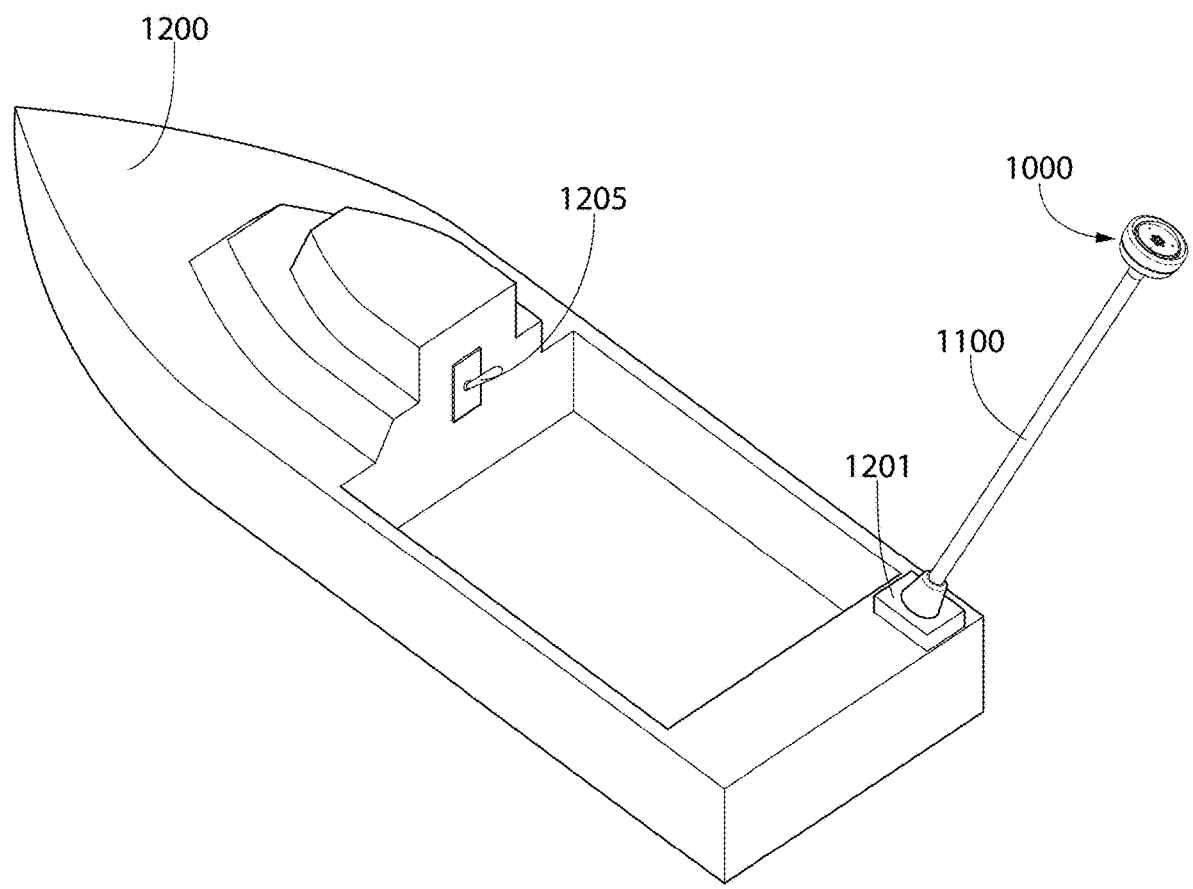
FIG. 40 is a perspective view of the light device and pole of FIG. 39 coupled to a boat.

Referring to FIGS. 39 and 40, the mounting of the light device 1000 to a boat or a vessel will be described. FIG. 40 illustrates the light device 1000 mounted on the pole 1100, which is in turn physically and electrically coupled to a boat or vessel 1200. Boats or vessels 1200 may include an all-round light receiving socket 1201 for purposes of physically and electrically coupling an all-round light to the boat or vessel 1200. All-round lights are typically mounted on poles that are in turn detachably coupled to the all-round light receiving socket 1201. Thus, any conventional all-round light can be replaced with the light device 1000 described herein. The light receiving socket 1201 may have electrical contacts that engage the electrical contacts 1102 on the bottom end 1101 of the pole 1100 when the pole 1100 is coupled to the vessel 1200. This will place the light module 1030 into electrical coupling with the electronic circuitry of the vessel 1200 so that a switch 1205 on the vessel 1200 can control operation of the light module 1030.

Thus, a user can toggle the switch from "off" to "on" to activate the light device 1000 into the first mode whereby the light emitters 1034 of the light module 1030 emit white light. The white light is emitted through the lens member or optic 1010 so as to illuminate 360 degrees around. If at any time the user becomes distressed for any reason, the user can very easily alter the light device 1000 from the first mode to the second mode. Specifically, the user simply needs to toggle the switch 1205 off and then back on within the predetermined period of time (for example, within about five seconds or any other time period provided herein) to alter the light device 1000 from the first mode to the second mode. In the second mode, the first and second light emitters 1032, 1033 will illuminate in accordance with the SOS pattern described herein and the infrared light 1035 may also illuminate in accordance with the SOS pattern described herein. In this way, the user can alert other boaters, the Coast Guard, and the like to their distress without ever having to launch a flare or locate a handheld visual distress signal device.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

The invention claimed is:

1. A visual distress signal device comprising:
a housing comprising a cavity having an open top end;
a first power source located within the cavity of the housing;
an electromagnetic radiation emitting module detachably coupled to the housing to close the open top end of the cavity of the housing in a water tight manner, the electromagnetic radiation emitting module comprising:
a heat sink assembly comprising:
a collar that engages the housing to detachably couple the electromagnetic radiation emitting module to the housing, an outer surface of the collar being exposed to an ambient environment;
a plate member having a bottom surface and a top surface that supports a plurality of electromagnetic radiation emitting elements; and
a heat transfer member in contact with the bottom surface of the plate member and with the collar to transfer heat generated by the plurality of electromagnetic radiation emitting elements from the plate member to the collar; and
a lens member covering the plurality of electromagnetic radiation emitting elements so that electromagnetic radiation generated by the electromagnetic radiation emitting elements is emitted through the lens member.

2. The visual distress signal device according to claim 1 wherein the heat transfer member of the heat sink assembly comprises:
a ring member having a top surface and a bottom surface, the top surface of the ring member in contact with the bottom surface of the plate member; and
a disc member having a top surface, a bottom surface, and a peripheral edge, the top surface of the disc member in contact with the bottom surface of the ring member and at least one of the bottom surface and the peripheral edge of the disc member in contact with the collar, the disc member covering an entirety of the open top end of the cavity of the housing; and
wherein the plate member, the ring member, and the disc member are fixedly coupled together so as to be non-movable relative to one another.

3. The visual distress signal device according to claim 2 wherein the housing comprises a distal end that defines the open top end of the cavity, the distal end comprising an annular channel within which a first gasket is disposed, and wherein the bottom surface of the disc member is in contact with and compresses the first gasket to form a first hermetic seal between the electromagnetic radiation emitting module and the housing at the open top end of the cavity.

4. The visual distress signal device according to claim 3 wherein the housing comprises a neck portion, a second gasket positioned within an annular channel formed into the neck portion, and wherein the neck portion of the housing nests within an interior of the collar and the second gasket is compressed between the collar and the housing to form a second hermetic seal between the electromagnetic radiation emitting module and the housing.

5. The visual distress signal device according to claim 1 wherein each of the plate member, the collar, and the heat transfer member is formed from a metal or a metal alloy.

6. The visual distress signal device according to claim 1 wherein the collar comprises a body portion comprising an inner surface and an outer surface, the inner surface of the body portion having threads that interact with threads on an outer surface of a neck portion of the housing to couple the collar to the housing, the collar further comprising a plurality of ribs protruding from the outer surface of the body portion in a spaced apart manner to maximize a surface area of the collar that is in contact with the ambient environment.

7. The visual distress signal device according to claim 6 wherein the collar extends from a bottom end to a top end along a collar axis, the collar further comprising a first annular flange located at the bottom end of the collar and extending in a direction away from the collar axis, and wherein when the collar is in the attached state the collar engages a gasket positioned around the neck portion of the housing to form a hermetic seal between the collar and the housing, wherein the collar comprises a second annular flange located at the top end of the collar and extending in a direction towards the collar axis, wherein the lens member comprises a flange having an upper surface comprising an annular channel within which a third gasket is disposed, and wherein the second flange of the collar engages the third gasket to form a hermetic seal between the collar and the lens.

8. The visual distress signal device according to claim 1 wherein the plurality of electromagnetic radiation emitting elements comprises a plurality of first light emitters that emit a first color of light, a plurality of second light emitters that emit a second color of light, and at least one infrared emitter that emits infrared light, wherein the plurality of first and second light emitters are positioned on the top surface of the plate member of the heat sink assembly and arranged in an alternating manner along a ring that surrounds the at least one infrared emitter.

9. The visual distress signal device according to claim 1 further comprising an electrical circuit that comprises, in operable cooperation:
the plurality of electromagnetic radiation emitting elements;
the first power source;
a switch alterable between at least an off position whereby power is not transmitted from the first power source to the electromagnetic radiation emitting elements and an on position whereby power is transmitted from the first power source to the electromagnetic radiation emitting elements to activate the electromagnetic radiation emitting elements to generate electromagnetic radiation; and
a circuit board comprising a microprocessor that controls an illumination pattern of the plurality of electromagnetic radiation emitting elements when the switch is in the on position;
wherein the illumination pattern is an SOS pattern that comprises three flashes of the plurality of first light emitters followed by three flashes of the plurality of second light emitters followed by three flashes of the plurality of first light emitters, wherein during each flash of the plurality of first light emitters the plurality of first light emitters are activated for a first time period and deactivated for the first time period, and wherein during each flash of the plurality of second light emitters the plurality of second light emitters are activated for a second time period and deactivated for the first time period, the second time period being greater than the first time period; and
wherein the illumination pattern further comprises flashing the at least one infrared light simultaneously with each flash of the plurality of first light emitters and each flash of the plurality of second light emitters.

10. The visual distress signal device according to claim 1 further comprising a switch alterable between: (1) an off position whereby power is not transmitted from the first power source to the electromagnetic radiation emitting elements so that the electromagnetic radiation emitting elements do not generate electromagnetic radiation; (2) an on position whereby power is transmitted from the first power source to the electromagnetic radiation emitting elements so that the electromagnetic radiation emitting elements generate electromagnetic radiation in accordance with an illumination pattern; and (3) a wireless communication position whereby the visual distress signal device is configured to be coupled to a mobile device so that the mobile device controls activation and deactivation of the electromagnetic radiation emitting elements.

11. The visual distress signal device according to claim 1 wherein the collar comprises an inner surface that defines an interior space, and wherein a portion of the lens member, the plate member of the heat sink assembly, the heat transfer member of the heat sink assembly, and a circuit board comprising a microprocessor that controls an illumination pattern of the plurality of electromagnetic radiation emitting elements are disposed within the interior space of the collar, and wherein the lens member, the plate member, the heat transfer member, and the circuit board are fixedly coupled together.

12. The visual distress signal device according to claim 1 wherein the heat transfer member contacts a distal end of the housing to close the open top end of the cavity in the water tight manner.

13. The visual distress signal device according to claim 1 wherein the housing comprises a neck portion having threads thereon, and wherein the collar comprises an inner surface having a plurality of sets of threads thereon, and wherein the threads of the collar engage the threads of the neck portion to detachably couple the electromagnetic radiation emitting module to the housing, wherein the collar comprises a collar axis, and wherein the plurality of sets of threads are circumferentially spaced apart from one another, the heat transfer member comprising a plurality of radial extension portions that pass through spaces between the plurality of sets of threads to insert an electronics module that comprises the plate member, the heat transfer member, and the lens member into an interior of the collar, the plurality of radial extension portions of the heat transfer member contacting the collar to transfer heat from the heat transfer member to the collar.

14. A visual distress signal device comprising:
a housing comprising a cavity having an open top end;
a first power source located within the cavity of the housing;
an electromagnetic radiation emitting module comprising:
a metal collar detachably coupled to the housing between an attached state and a detached state, an outer surface of the metal collar being exposed to an ambient environment;
a metal plate member having a top surface and a bottom surface, a plurality of electromagnetic radiation emitting elements coupled to the top surface of the metal plate member;
a lens member covering the plurality of electromagnetic radiation emitting elements so that electromagnetic radiation generated by the electromagnetic radiation emitting elements is emitted through the lens member;

a metal ring member having a top surface and a bottom surface, the top surface of the metal ring member in contact with the bottom surface of the metal plate member; and a metal disc member having a top surface, a bottom surface, and a peripheral edge, the top surface of the metal disc member in contact with the bottom surface of the metal ring member and at least one of the bottom surface and the peripheral edge of the metal disc member in contact with the metal collar so that heat generated by the plurality of electromagnetic radiation emitting elements passes from the metal plate member to the metal collar; and a circuit board comprising a microprocessor that controls an illumination pattern of the plurality of electromagnetic radiation emitting elements when activated; and wherein when the collar of the electromagnetic radiation emitting module is in the attached state, the disc member covers the open top end of the cavity and engages a gasket located along a distal end of the housing to form a first hermetic seal between the electromagnetic radiation emitting module and the housing and the collar engages a second gasket located along a neck portion of the housing to form a second hermetic seal between the electromagnetic radiation emitting module and the housing.

15. A visual distress signal device comprising:

a housing comprising a cavity;

a first power source located within the cavity of the housing;

a heat sink assembly detachably coupled to the housing between an attached state and a detached state, wherein in the attached state the heat sink assembly closes the cavity of the housing in a water tight manner, the heat sink assembly comprising:

a collar that engages the housing to detachably couple the heat sink assembly to the housing;

a plate member; and a heat transfer member in contact with the plate member and with the collar to transfer heat from the plate member to the collar;

a plurality of electromagnetic radiation emitting elements coupled to the plate member and operably coupled to the first power source;

a lens member covering the plurality of electromagnetic radiation emitting elements so that electromagnetic radiation generated by the electromagnetic radiation emitting elements is emitted through the lens member; and wherein heat generated by the plurality of electromagnetic radiation emitting elements passes from the plate member to the collar of the heat sink assembly which is exposed to an ambient environment.

* * * * *